US007073193B2

(12) United States Patent
Marsh

(10) Patent No.: US 7,073,193 B2
(45) Date of Patent: Jul. 4, 2006

(54) MEDIA CONTENT DESCRIPTIONS

(75) Inventor: David J. Marsh, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 644 days.

(21) Appl. No.: 10/125,260

(22) Filed: Apr. 16, 2002

(65) Prior Publication Data
US 2003/0195863 A1 Oct. 16, 2003

(51) Int. Cl.
*G06F 17/30* (2006.01)
(52) U.S. Cl. .................. 725/114; 725/109; 725/138; 707/100
(58) Field of Classification Search ............... 725/114, 725/138, 144; 705/14
See application file for complete search history.

(56) References Cited

U.S. PATENT DOCUMENTS

| 6,317,885 | B1 | 11/2001 | Fries |
| 6,651,253 | B1 * | 11/2003 | Dudkiewicz et al. ....... 725/114 |
| 2001/0041980 | A1 | 11/2001 | Howard et al. |
| 2002/0140719 | A1 | 10/2002 | Amir et al. |
| 2003/0135857 | A1 * | 7/2003 | Pendakur et al. ............ 725/61 |
| 2005/0192987 | A1 * | 9/2005 | Marsh |

FOREIGN PATENT DOCUMENTS

| JP | 2000067060 | 8/1998 |
| JP | 2001134582 | 11/1999 |
| WO | WO 00/40026 | 7/2000 |
| WO | WO 01/47257 | 6/2001 |
| WO | WO 02/11445 | 2/2002 |

OTHER PUBLICATIONS

De Jong, A. et al. "Die technische Fachzeitschrift fur Femsehen, Film und elektronische Medien"; Femseh-Und Kino-Technik—55, Jahrgang, Nr. Aug.-Sep./2001; 10 pages.
Mulder, Peter; "The integration of Metadata from production to consumer"; EBU Technical Review, Sep. 2000; 5 pages; Dutch Broadcast Facilities Company N.V. (NOB).
Evain, Jean-Pierre; "TV-Anytime metadata, A preliminary specification on schedule!"; EBU Technical Review, Sep. 2000; 14 pages; EBU Technical Department.
Herla, Von Siegbert; "Online-Archive—MIT Metadaten Zum Erfolg"; Dec. 15, 2000; 8 pages.
Joung, Ye Sun; "A Metadata Repository System for an Efficient Description of Visual Multimedia Documents"; Concurrent Engineering: Research and Applications; vol. 9, No. 2, Jun. 2001; 12 pages; Technomic Publishing Co., Inc.; Korea.

(Continued)

*Primary Examiner*—Charles Rones
*Assistant Examiner*—Belix M. Ortiz
(74) *Attorney, Agent, or Firm*—Lee & Hayes, PLLC

(57) ABSTRACT

A media content description system receives media content descriptions from one or more metadata providers. The media content description system associates each media content description with the metadata provider that provided the description. The media content description system may generate composite descriptions based on the received media content descriptions. The media content description system provides data associated with the media content descriptions to one or more program data providers.

44 Claims, 17 Drawing Sheets

OTHER PUBLICATIONS

Adami, N., et al.; "The ToCaI Description Scheme for Indexing and Retrieval of Multimedia Documents"; Multimedia Tools and Applications, 14, 153-173, 2001; Kluwer Academic Publishers Manufactured in The Netherlands.

Wei, Gang et al.; "TV Program Classification Based on Face and Text Processing"; 2000 IEEE; 4 pages; Computer Science Department, Wayne State University, Detroit MI; Philips Research, Briarcliff Manor, NY.

Jasinschi, R.S., et al.; "Automatic TV Program Genre Classification Based on Audio Patterns"; 2001 IEEE; 6 pages; Philips Research, Scarborough Road, Briarcliff Manor, NY, 10510, USA.

Taskiran, Cuneyt M., et al.; "Discovering Video Structure Using The Psuedo-Semantic Trace"; Proceedings of SPIE vol. 4315 (2001); 8 pages; Video and Image Processing Laboratory, School of Electrical and Computer Engineering, Purdue University, West Lafayette, IN 47907-1285.

McDonald, Kieran, et al.; "Online Television Library: Organisation and Content Browsing for General Users"; Proceedings of SPIE vol. 4315 (2001); 9 pages; Centre for Digital Video Processing, Dublin City University, Ireland.

Liu, Duen-Ren, et al.; "Classifying Video Documents by Hierarchical Structure of Video Contents"; The Computer Journal, vol. 43, No. 5, 2000; 15 pages; Institute of Information Management, National Chiao Tung University, 1001 Ta Hsueh Rd., Hsinchu, Taiwan, Rep. of China.

Truong, Ba Tu, et al.; "Automatic Genre Identification for Content-Based Video Categorization"; 2000 IEEE; 4 pages; Department of Comptuer Science, Curtin Univeristy of Technology, Perth, W. Australia; IBM T.J. Watson Research Center, Yorktown Heights, NY, USA.

* cited by examiner

Content Description Metadata Repository   412

XML File Details
    MCID(1)
        Metadata Category 1
            Category 1 Entity (Element 1, Element 2, ...)
            Category 1 Entity (Element 1, Element 2, ...)
            ...
        Metadata Category 2
            Category 2 Entity (Element 1, Element 2, ...)
            Category 2 Entity (Element 1, Element 2, ...)
            ...
        ...
        Metadata Category (N)
            Category (N) Entity (Element 1, Element 2, ...)
            Category (N) Entity (Element 1, Element 2, ...)
    MCID(2)
        Metadata Category 1
            Category 1 Entity (Element 1, Element 2, ...)
            Category 1 Entity (Element 1, Element 2, ...)
            ...
        Metadata Category 2
            Category 2 Entity (Element 1, Element 2, ...)
            Category 2 Entity (Element 1, Element 2, ...)
            ...
        ...
        Metadata Category (N)
            Category (N) Entity (Element 1, Element 2, ...)
            Category (N) Entity (Element 1, Element 2, ...)
        ...
    ...
    MCID(N)
    ...

*Figure 5*

Identifying Data
602

Alternate Content Identifiers
Title
Episode Name
Album
Version Detail
Part Detail

*Figure 7*

Associated People
604

Person

*Figure 8*

Genre Data
606

Genre Program Type
Genre Degrees
Genre Intent
Target Audience
Year Set
Era Set
Location Portrayed
From The Book
Degree of True Story
Degree of Animated 2D
Degree of Animated 3D
Degree of Puppet Characters
Degree of International Event
Degree of Sophistication
Genre Music
Genre Photo or Home Movie
Format

*Figure 9*

Content Descriptions
608

Plot One Line Abstract
Plot Long Abstract
Keywords
Content Note
Availability Date
Content Duration

*Figure 10*

Popularity
610

Critic Reviews
Popularity
Broadcast Ubiquity

*Figure 11*

Censor Ratings

612

Censor Parental Rating
Extended Censor Rating Adult Content
Extended Censor Rating Bad Language
Extended Censor Rating Violence
Extended Censor Rating Nudity
Extended Censor Rating Drug Abuse

*Figure 12*

Technical Details

614

Capture Mechanism
Image Capture Resolution
Video Capture Temporal Rate Hz
Video Captured Using Interlace
Sound Capture Sampling
Sound Capture Compression
Camera Used
Image Capture Compression
Recorded Live
Black and White
Silent
Post Production Processing
Special Electronic Processing
Aspect Ratio
Aspect Ratio Implementation
Pan and Scan Vectors
Origination Note
Stereo Sound
Surround Sound

*Figure 13*

Production Details

616

Made For
Budget
Box Office
Production Company
Distribution Company
Principal Country of Main Production Company
Capture Location
Copyright
URL Production Company

*Figure 14*

Language Data

620

Language Primary Original
Language Segment Original
Language Dub
Language Audio Track
Language Text Burnt In
Language Text Track
Language Description Track
Sign Language Track

*Figure 16*

Enhancements

618

ATVEF Data Enhancement
Educational Commands
Educational Informational Enhancements
Multiple Camera Angles
Multiple Story Lines
Phone In
URL Enhancements
URL More Info
Associated Phone Number
Associated Teletext Page Number
VCR Programming Code

*Figure 15*

Schema Implementation Details

622

XPath Content Artwork
XPath Video Trailer
XPath Chapter Thumbnails
XPath Time Interval Thumbnails
XPath Script Or Lyrics
XPath Original Storyboard

*Figure 17*

Media Person Data Repository          414

XML Person File Details
    MPI (1)
        Person Category 1
            Category 1 Entity (Element 1, Element 2, ...)
            Category 1 Entity (Element 1, Element 2, ...)
            ...
        Person Category 2
            Category 2 Entity (Element 1, Element 2, ...)
            Category 2 Entity (Element 1, Element 2, ...)
            ...
        ...
        Person Category (N)
            Category (N) Entity (Element 1, Element 2, ...)
            Category (N) Entity (Element 1, Element 2, ...)
            ...
    MPI (2)
        Person Category 1
            Category 1 Entity (Element 1, Element 2, ...)
            Category 1 Entity (Element 1, Element 2, ...)
            ...
        Person Category 2
            Category 2 Entity (Element 1, Element 2, ...)
            Category 2 Entity (Element 1, Element 2, ...)
            ...
        ...
        Person Category (N)
            Category (N) Entity (Element 1, Element 2, ...)
            Category (N) Entity (Element 1, Element 2, ...)
            ...
    ...
    MPI (N)
    ...

*Figure 18*

Person Categories  1900

Name
Gender
Marital Status
Ethnic Origin
Religion
Height
Birth Date
Birth Place
Alive
Death Date
Death Cause
Citizenship
Residence Place
Related Person
Biography One Line
Biography Long
Official Home Page URL
Fan Site URL
More Information URL
Email Address
Office Phone Number
Home Phone Number
Fax Number
XPath Person Artwork
XPath Person Video

*Figure 19*

Metadata Provider Data Repository    416

MSI (1)
    Identifying Data
    Metadata Category Trust Level 1
    Metadata Category Trust Level 2
    ...
    Metadata Category Trust Level (N)

MSI (2)
    Identifying Data
    Metadata Category Trust Level 1
    Metadata Category Trust Level 2
    ...
    Metadata Category Trust Level (N)

...

MSI (N)
    Identifying Data
    Metadata Category Trust Level 1
    Metadata Category Trust Level 2
    ...
    Metadata Category Trust Level (N)

*Figure 20*

Identifying Data   2100

Company Name
Company URL
Scheme Details URL
Email Contact 1
Email Contact 2
Email Contact 3
Address Line 1
Address Line 2
Address Town
Address State
Adderss Zip Code

*Figure 21*

Metadata Category   2200
Trust Levels

Title
Episode
Version
Album
Parts
Artists
Director
Producer
Editor
Script Writer
Lyrics Writer
Music Composer
Location
Date
Duration
Format
Genre Degrees
Genre Program Type
Genre Intent
Genre Target Audience
Genre Attributes
Review
Popularity
Broadcast Ubiquity
Censor Parental Ratings
Extended Censor Ratings
Origination
Features
Copyright
Textual Description
Links
Made For
Budget
Box Office
Production Company
Distribution Company
Language
Paths

*Figure 22*

MEDIA CONTENT DESCRIPTIONS

TECHNICAL FIELD

This invention relates to media entertainment systems and, in particular, to architectures that support media content description metadata.

BACKGROUND

Many media entertainment systems provide electronic programming guides (EPGs) that allow users to interactively select programs that they are interested in. Systems that employ EPG technology typically display programs organized according to the channel on which the program will be broadcast and the time at which the broadcast will occur. Information identifying a particular program typically includes the program title, and possibly a short description of the program.

Over time, a large amount of descriptive data may be generated that is associated with a particular piece of media content (e.g., a movie). This data may include, for example, reviews of the content by various critics, user recommendations, rating information, and genre classifications. A user may desire to make decisions about which programs to view based on descriptive data associated with programs beyond the short descriptions typically displayed in an EPG.

SUMMARY

An architecture that supports media content descriptions is described. The media content description architecture has a system to receive metadata that describes media content from one or more metadata providers. The system typically generates composite descriptions based on received metadata. The system provides media content descriptions to one or more program data providers.

BRIEF DESCRIPTION OF THE DRAWINGS

The same numbers are used throughout the drawings to reference like features and components.

FIG. 5 illustrates the structure of media content description metadata stored in an exemplary content description metadata repository.

FIG. 7 illustrates example identifying data categories.

FIG. 8 illustrates an example associated people category.

FIG. 9 illustrates example genre data categories.

FIG. 10 illustrates example content descriptions categories.

FIG. 11 illustrates example popularity categories.

FIG. 12 illustrates example censor ratings categories.

FIG. 13 illustrates example technical details categories.

FIG. 14 illustrates example production details categories.

FIG. 15 illustrates example enhancements categories.

FIG. 16 illustrates example language data categories.

FIG. 17 illustrates example schema implementation details categories.

FIG. 18 illustrates the structure of media person data stored in an exemplary media person data repository.

FIG. 19 illustrates exemplary media person data categories.

FIG. 20 illustrates the structure of metadata provider data stored in an exemplary metadata provider data repository.

FIG. 21 illustrates examples of identifying data that may be stored in association with a metadata provider.

FIG. 22 illustrates examples of metadata category trust levels that may be stored in association with a metadata provider.

DETAILED DESCRIPTION

Introduction

The following describes a media content description system. The media content description system stores metadata related to media content (e.g., a movie, a television show, or a song). The metadata that the media content description system stores is related to the content of the media, independent of when or where the media content is available. For example, the metadata stored in the media content description system may include the name of a movie, a list of actors in the movie, the name of the director of the movie, and one or more critic reviews of the movie. The metadata stored in the media content description system does not include television channels or times when a particular movie will be broadcast. The media content description system provides the stored metadata to content distribution systems, which provide the metadata, as well as the associated media content to users.

Content Description Metadata Collection

Figure 1:
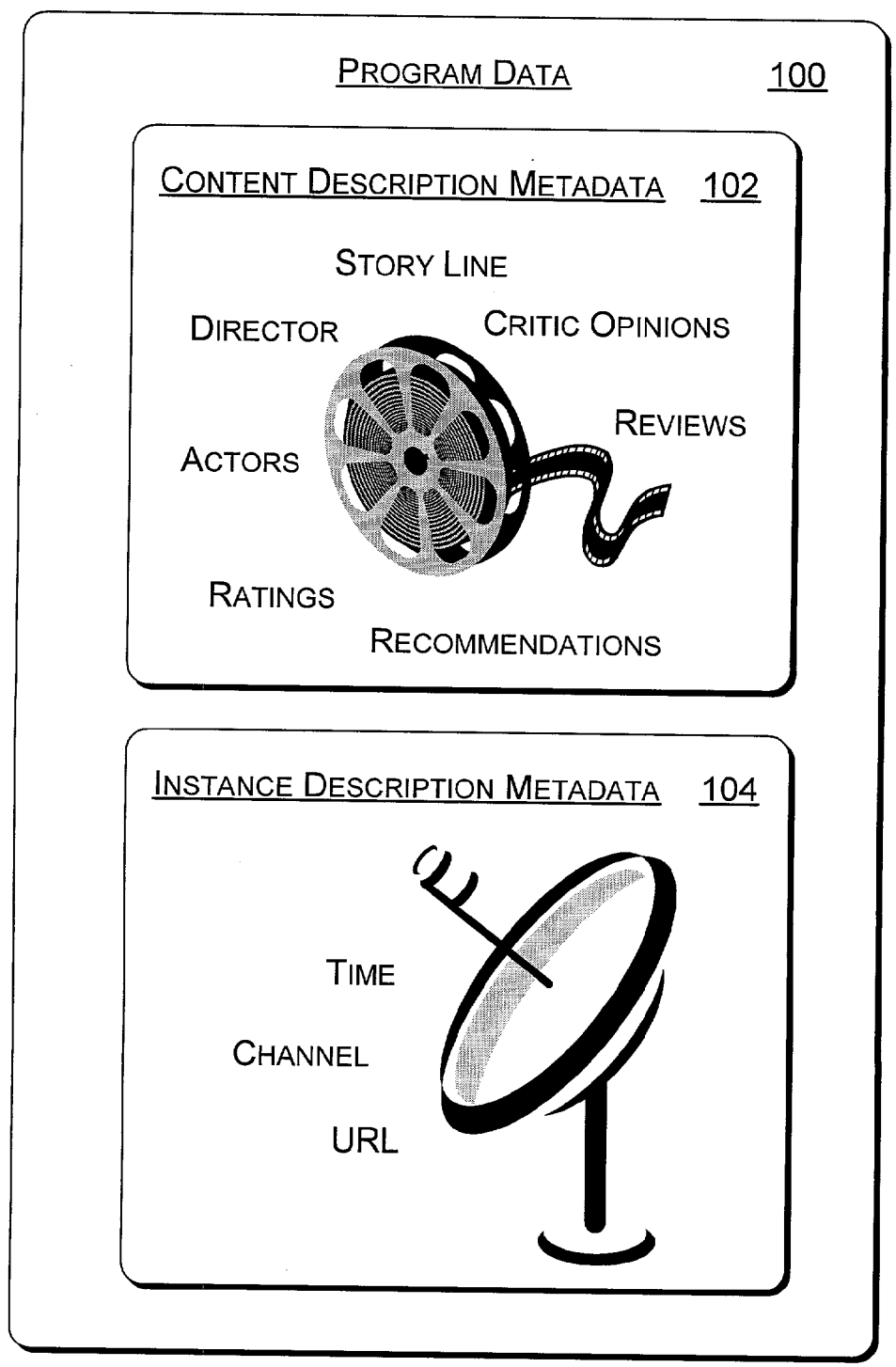
FIG. 1 illustrates two categories of program data that can be associated with media.

FIG. 1 illustrates two categories of program data 100 that can be associated with media. Media (e.g., a movie) can be associated with content description metadata 102 and instance description metadata 104. Content description metadata 102 is data pertaining to the media content, for example, the director, actors, story line, ratings, critic opinions, reviews, and recommendations pertaining to a movie. Instance description metadata 104 is data pertaining to when and where the media content is available. For example, the time and television channel on which a particular movie will be broadcast. Because content description metadata 102 is associated with the content of media, and not a particular broadcast of the media, content description metadata may be maintained and updated throughout the life of a particular media content.

Figure 2:
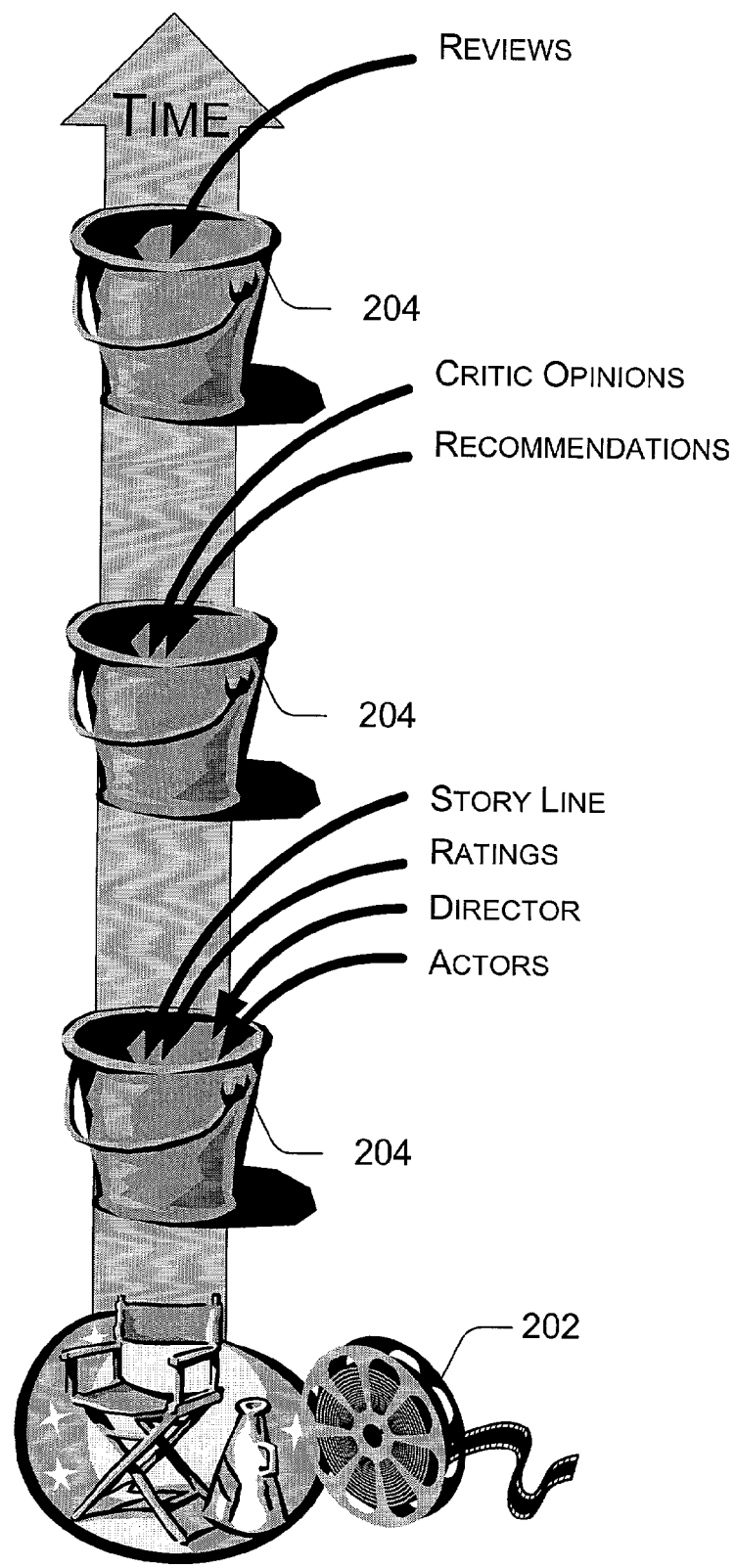
FIG. 2 is an example diagram illustrating the collection of content description metadata associated with a piece of media over time.

FIG. 2 illustrates the collection of content description metadata associated with media over time. Content description metadata is first available when the media 202 is created. For example, the name of a movie and the actors in the movie is content description metadata that is available when a movie is produced. The content description metadata can be stored in a repository 204 over the life of the media.

For example, when a movie is produced, the name of the director, the names of the actors, a description of the story line, and the rating of the movie may be stored in the repository 204 as content description metadata. Over time, more content description metadata may become available, and can be added to the repository 204. For example, after the movie is released, critic opinions and recommendations may become available. Because this is information related to the media content itself (and not just a particular broadcast or showing of the media content), this information is added to the repository 204. At a still later point in time, additional reviews of the media content may become available. These reviews may also be added to the repository 204.

Content description metadata is generated by many different sources (e.g., movie production companies, movie critics, television production companies, individual viewers, etc.). A media content description system stores content description metadata from multiple sources, and makes the content description metadata available to users.

The following discussion is directed to media-based entertainment systems, such as interactive TV networks, cable and satellite networks that utilize electronic program guides, and Web-enabled TV networks. Client devices in such systems range from full-resource clients with substantial memory and processing resources, such as TV-enabled personal computers and personal video recorders (PVRs) equipped with hard-disks, to low-resource clients with limited memory and/or processing resources, such as traditional set-top boxes. While aspects of the described systems and procedures can be used in any of these systems and for any types of client devices, they are described in the context of the following exemplary environment.

Exemplary Environment

Figure 3:
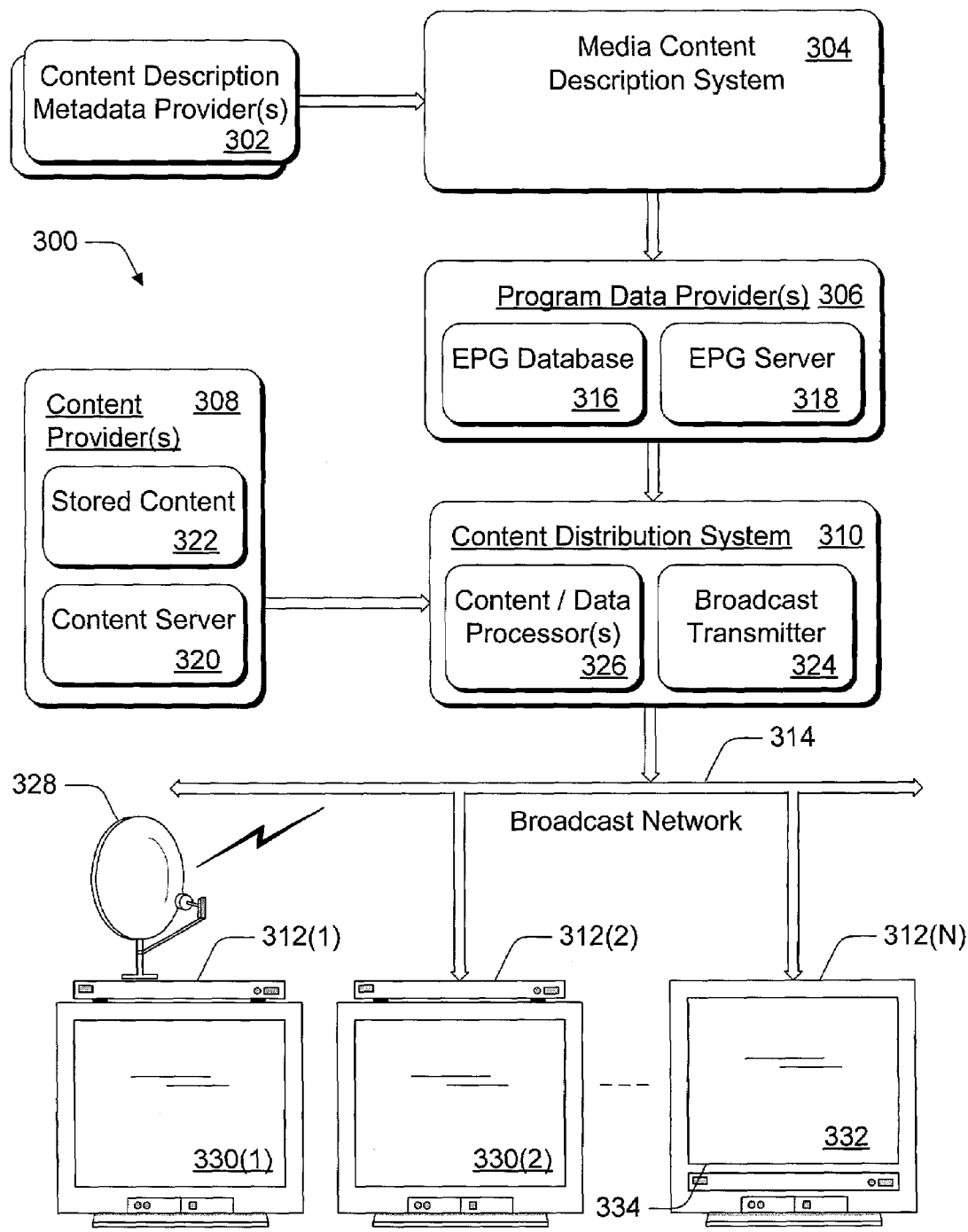
FIG. 3 is a block diagram of an exemplary media entertainment system that facilitates distribution of media and metadata associated with the media to multiple users.

FIG. 3 illustrates an exemplary environment 300 in which the methods, systems, and data structures described herein may be implemented. Exemplary environment 300 is a media entertainment system that facilitates distribution of media and metadata associated with the media to multiple users. The environment 300 includes one or more content description metadata providers 302, a media content description system 304, one or more program data providers 306, one or more content providers 308, a content distribution system 310, and multiple client devices 312(1), 312(2), . . . , 312(N) coupled to the content distribution system 310 via a broadcast network 314.

Content description metadata provider 302 provides content description metadata associated with media to media content description system 304. Example content description metadata providers are movie production companies, movie distribution companies, movie critics, and music production companies. Any person, company, system, or entity that is able to generate or supply media content description metadata may be considered a content description metadata provider 302.

Media content description system 304 stores media content description metadata associated with a plurality of metadata categories and stores metadata received from one or more metadata providers 302. In one implementation, the media content description system 304 generates composite metadata based on metadata received from a plurality of metadata providers 302.

Media content description system 304 provides the media content description metadata to program data provider 306. In one implementation, the media content description system 304 provides to program data provider 306, all of the stored metadata that is associated with a piece of media content (e.g., a movie).

In another implementation, the media content description system 304 provides only the stored metadata that is associated with the media content that was received from a particular metadata provider.

In an alternate implementation, each metadata provider is assigned one or more trust levels or rankings, which may be associated with particular metadata categories that indicate how trustworthy metadata received from that metadata provider is. In this implementation, the metadata that is provided to the program data provider may be based on the trust levels associated with the metadata providers from which the metadata was received.

In yet another implementation, media content description system 304 generates composite metadata based on metadata received from a plurality of metadata providers, and provides the composite metadata to the program data provider.

Various implementations are contemplated, in which, the media content description system 304 may provide any combination of content description metadata to program data provider 306.

Program data provider 306 includes an electronic program guide (EPG) database 316 and an EPG server 318. The EPG database 316 stores electronic files of program data, which is used to generate an electronic program guide (or, "program guide"). The program data stored by the EPG database will be referred to as EPG data and may include content description metadata 102 and instance description metadata 104. For example, the EPG database 316 may store program titles, ratings, characters, descriptions, actor names, station identifiers, channel identifiers, schedule information, and so on.

The EPG server 318 processes the EPG data prior to distribution to generate a published version of the EPG data which contains programming information for all channels for one or more days. The processing may involve any number of techniques to reduce, modify, or enhance the EPG data. Such processes might include selection of content, content compression, format modification, and the like. The EPG server 318 controls distribution of the published version of the EPG data from program data provider 306 to the content distribution system 310 using, for example, a file transfer protocol (FTP) over a TCP/IP network (e.g., Internet, UNIX, etc.).

Content provider 308 includes a content server 320 and stored content 322, such as movies, television programs, commercials, music, and similar media content. Content server 320 controls distribution of the stored content 322 from content provider 308 to the content distribution system 310. Additionally, content server 320 controls distribution of live media content (e.g., content that was not previously stored, such as live feeds) and/or media content stored at other locations to the content distribution system 310.

Content distribution system 310 contains a broadcast transmitter 324 and one or more content and program data processors 326. Broadcast transmitter 324 broadcasts signals, such as cable television signals, across broadcast network 314. Broadcast network 314 can include a cable television network, RF, microwave, satellite, and/or data network, such as the Internet, and may also include wired or wireless media using any broadcast format or broadcast protocol. Additionally, broadcast network 314 can be any type of network, using any type of network topology and any network communication protocol, and can be represented or otherwise implemented as a combination of two or more networks.

Content and program data processor 326 processes the media content and EPG data received from content provider 308 and program data provider 306 prior to transmitting the media content and EPG data across broadcast network 314. A particular content processor may encode, or otherwise process, the received content into a format that is understood by the multiple client devices 312(1), 312(2), . . . , 312(N) coupled to broadcast network 314. Although FIG. 3 shows a single program data provider 306, a single content provider 308, and a single content distribution system 310, environment 300 can include any number of program data providers and content providers coupled to any number of content distribution systems.

Content distribution system 310 is representative of a head end service that provides EPG data, as well as media content, to multiple subscribers. Each content distribution system 310 may receive a slightly different version of the EPG data that takes into account different programming preferences and lineups. The EPG server 318 creates different versions of EPG data (e.g., different versions of a program guide) that include those channels of relevance to respective head end services. Content distribution system 310 transmits the EPG data to the multiple client devices 312(1), 312(2), . . . , 312(N). In one implementation, for example, distribution system 310 utilizes a carousel file system to repeatedly broadcast the EPG data over an out-of-band channel to the client devices 312.

Client devices 312 can be implemented in multiple ways. For example, a client device 312(1) receives broadcast content from a satellite-based transmitter via a satellite dish 328. Client device 312(1) is also referred to as a set-top box or a satellite receiving device. Client device 312(1) is coupled to a television 330(1) for presenting the content received by the client device, such as audio data and video data, as well as a graphical user interface. A particular client device 312 can be coupled to any number of televisions 330 and/or similar devices that can be implemented to display or otherwise render content. Similarly, any number of client devices 312 can be coupled to a television 330.

Client device 312(2) is also coupled to receive broadcast content from broadcast network 314 and communicate the received content to associated television 330(2). Client device 312(N) is an example of a combination television 332 and integrated set-top box 334. In this example, the various components and functionality of the set-top box are incorporated into the television, rather than using two separate devices. The set-top box incorporated into the television may receive broadcast signals via a satellite dish (similar to satellite dish 328) and/or via broadcast network 314. A personal computer may also be a client device 312 capable of receiving and rendering EPG data and/or media content. In alternate implementations, client devices 312 may receive broadcast signals via the Internet or any other broadcast medium.

Each client 312 runs an electronic program guide (EPG) application that utilizes the EPG data. An EPG application enables a TV viewer to navigate through an onscreen program guide and locate television shows of interest to the viewer. With an EPG application, the TV viewer can look at schedules of current and future programming, set reminders for upcoming programs, and/or enter instructions to record one or more television shows.

Exemplary Media Content Description System

Figure 4:
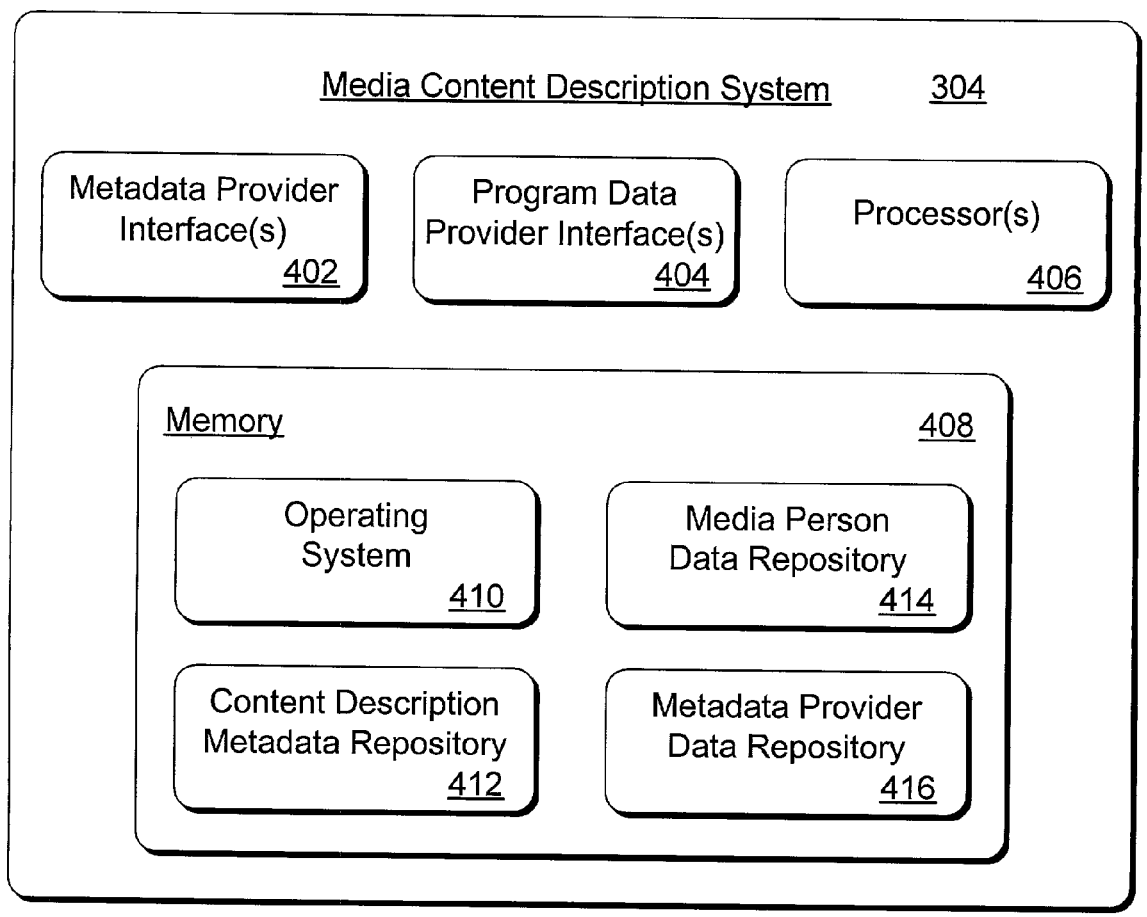
FIG. 4 is a block diagram of selected components of the media content description system shown in FIG. 3.

FIG. 4 illustrates selected components of media content description system 304 shown in FIG. 3. Media content description system 304 includes one or more metadata provider interfaces 402 that facilitate communication between media content description system 304 and one or more metadata providers 302. Media content description system 304 also includes one or more program data provider interfaces 404 that facilitate communication between media content description system 304 and one or more program data providers 306.

Media content description system 304 includes one or more processors 406 and one or more memory components 408. Examples of possible memory components include a random access memory (RAM), a disk drive, a mass storage component, and a non-volatile memory (e.g., ROM, Flash, EPROM, EEPROM, etc.). Alternative implementations of the media content description system can include a range of processing and memory capabilities, and may include more or fewer types of memory components than those described. Processor(s) 406 process various instructions to control the operation of the media content description system 304 and to communicate with other electronic and computing devices.

An operating system 410, a content description metadata repository 412, a media person data repository 414, and a metadata provider data repository 416 may be stored in memory 408 and executed on processor 406. Content description metadata repository 412 stores structured content description metadata associated with media content. Media person data repository 414 stores structured data identifying people who are associated with media content (e.g., actors, directors, etc.). Metadata provider data repository 416 stores structured data that describes relationships between content description metadata providers 302. In alternate implementations, data repositories 412, 414, and 416 may be implemented as one or more data repositories.

Exemplary Content Description Metadata Repository

Content description metadata repository 412 stores metadata associated with the content of media. The data repository may be implemented as a relational database, an object-oriented database, a set of one or more data files, one or more XML files based on an XML schema, or any other data structure method. For the purposes of this discussion, an exemplary content description metadata repository will be described as an XML file.

FIG. 5 illustrates the structure of media content description metadata stored in an exemplary content description metadata repository.

XML File Details

The XML File Details metadata entity is used to store data associated with the XML file in which the content description metadata is stored. An example XML File Details entity has the following elements:

Content Description File Version
Date Time Content Description Created
Content Description Creator Person
Content Description Creator Organization
Language Used For Content Description
Schema Version Used The Content Description File Version element stores a number that indicates the version of the file. As data is added to a media content description over time, multiple versions of the file may be stored.

The Date Time Content Description Created element stores the date and time that the file was created.

The Content Description Creator Person element stores the name of the person that created the file.

The Content Description Creator Organization element stores the name of an organization that created the file.

The Language Used For Content Description element stores a value that indicates the language in which the content description data is provided. In an exemplary system, the value that is stored in the Language Used For Content Description element is a combination of a language code and name according to ISO 639. Examples include "de_German", "es_Spanish", and "en_English". An example list of language field values is given in Table 1, below.

The Schema Version Used element stores a number that indicates the version of an XML schema associated with the XML file.

TABLE 1

Unknown
None
aa_Afar
ab_Abkhazian
af_Afrikaans
am_Amharic
ar_Arabic
as_Assamese
ay_Aymara
az_Azerbaijani
ba_Bashkir
be_Byelorussian
bg_Bulgarian
bh_Bihari
bi_Bislama
bn_BengaliBangla
bo_Tibetan
br_Breton
ca_Catalan
co_Corsican
cs_Czech
cy_Welsh
da_Danish
de_German
dz_Bhutani
el_Greek
en_English
eo_Esperanto
es_Spanish
et_Estonian
eu_Basque
fa_Persian
fi_Finnish
fj_Fiji
fo_Faroese
fr_French
fy_Frisian
ga_Irish
gd_ScotsGaelic
gl_Galician
gn_Guarani
gu_Gujarati
ha_Hausa
he_Hebrew
hi_Hindi
hr_Croatian
hu_Hungarian
hy_Armenian
ia_Interlingua
id_Indonesian
ie_Interlingue
ik_Inupiak
is_Icelandic
it_Italian
iu_Inuktitut
ja_Japanese
jw_Javanese
ka_Georgian
kk_Kazakh
kl_Greenlandic
km_Cambodian
kn_Kannada
ko_Korean
ks_Kashmiri
ku_Kurdish
ky_Kirghiz TABLE 1-continued la_Latin
ln_Lingala
lo_Laothian
lt_Lithuanian
lv_LatvianLettish
mg_Malagasy
mi_Maori
mk_Macedonian
ml_Malayalam
mn_Mongolian
mo_Moldavian
mr_Marathi
ms_Malay
mt_Maltese
my_Burmese
na_Nauru
ne_Nepali
nl_Dutch
no_Norwegian
oc_Occitan
om_AfanOromo
or_Oriya
pa_Punjabi
pl_Polish
ps_PashtoPushto
pt_Portuguese
qu_Quechua
rm_RhaetoRomance
rn_Kirundi
ro_Romanian
ru_Russian
rw_Kinyarwanda
sa_Sanskrit
sd_Sindhi
sg_Sangho
sh_SerboCroatian
si_Sinhalese
sk_Slovak
sl_Slovenian
sm_Samoan
sn_Shona
so_Somali
sq_Albanian
sr_Serbian
ss_Siswati
st_Sesotho
su_Sundanese
sv_Swedish
sw_Swahili
ta_Tamil
te_Telugu
tg_Tajik
th_Thai
ti_Tigrinya
tk_Turkmen
tl_Tagalog
tn_Setswana
to_Tonga
tr_Turkish
ts_Tsonga
tt_Tatar
tw_Twi
ug_Uighur
uk_Ukrainian
ur_Urdu
uz_Uzbek
vi_Vietnamese
vo_Volapuk
wo_Wolof
xh_Xhosa
yi_Yiddish
yo_Yoruba
za_Zhuang
zh_Chinese
zu_Zulu
Other

MCID

Each piece of media content is assigned a unique media content identifier (MCID), such as MCID(1), MCID(2), ..., and MCID(N). Based on the structure of content description metadata repository 412, the MCID metadata entity stores one instance of one element, which is the MCID. For example a particular movie would be identified by a unique MCID.

The MCID may be implemented as any type of unique identifier. In one implementation, the MCID is a concatenation of hexadecimal representations of specific metadata category values stored in the content description metadata repository. The metadata categories that are used to generate the MCID are assigned levels of significance within the MCID. An exemplary MCID is based on data stored in the Title, Episode Name, Version Detail, and Part Detail metadata categories, which are described with reference to FIG. 7. The MCID is a structured string of the form MCID_TITLE_EPISODE_VERSION_PART, where TITLE, EPISODE, VERSION, and PART are hexadecimal values generated based on values stored in the Title, Episode Name, Version Detail, and Part Detail metadata category entities, respectively.

An example MCID is: MCID_0050-004-c34d-47ef_00d4_002f-83a5_03 In this example, "0050-004-c34d-47ef" is the TITLE portion of the MCID, based on data stored in the value element of the Title metadata entity; "00d4" is the EPISODE portion of the MCID, based on data stored in the value element of the Episode Name metadata entity; "002f-83a5" is the VERSION portion of the MCID, based on data stored in the version reason element of the Version Detail metadata entity; and "03" is the PART portion of the MCID, based on data stored in the part element of the Part Detail metadata entity. The TITLE portion of the MCID (the 0050-004-c34d-47ef in the above example) is the most significant, followed by the EPISODE portion (the 00d4 part in the above example), the VERSION portion (the 002f-83a5 in the above example), and finally, the PART portion (the 03 in the above example), which is the least significant. Related media can be determined by comparing portions of the respective MCIDs. For example, for a television series, all episodes of the series are assigned MCIDs that have the same value in the TITLE portion, but different values in the EPISODE, VERSION, and PART portions.

Metadata Category 1, Metadata Category 2, ..., Metadata Category (N)

Media content description metadata stored in content description metadata repository 412 is structured according to categories of data that may be associated with media content. These categories are represented in FIG. 5 as Metadata Category 1, Metadata Category 2, ..., Metadata Category (N).

Media content description system 304 may receive content description metadata, in the same metadata category, associated with the same media content, from a plurality of metadata providers 302. These multiple values may represent different opinions as to the value of an attribute associated with the meida content. For example, two metadata providers 302 may each have different titles associated with the same media content. For instance, for the same media content, a movie, one metadata provider may associated the title, "Indiana Jones and the Temple of Doom" while another metadata provider may associate the title, "Indiana Jones: the Temple of Doom" with the same media content. To support multiple data values associated with each metadata category (e.g., multiple opinions as to the value of an attribute), the content description metadata repository 412 supports multiple entities within each metadata category. Each entity includes one or more associated elements.

In one implementation, the media content description system 304 determines the order of multiple entities within a metadata category based on category-specific rankings that are associated with content description metadata providers 302.

In an alternate implementation, the media content description system 304 generates a composite entity based on entities received from a plurality of metadata providers 302. When the media content description system 304 generates a composite entity, it is listed first among a plurality of entities, indicating that it has the highest rank.

In one implementation, the composite is generated based on trust levels associated with the metadata providers 302 that provided the metadata. Other ways of indicating relative order of entities within a metadata category may be used, including storing a rank indicator as part of the entity.

Exemplary Content Description Metadata Categories

Figure 6:
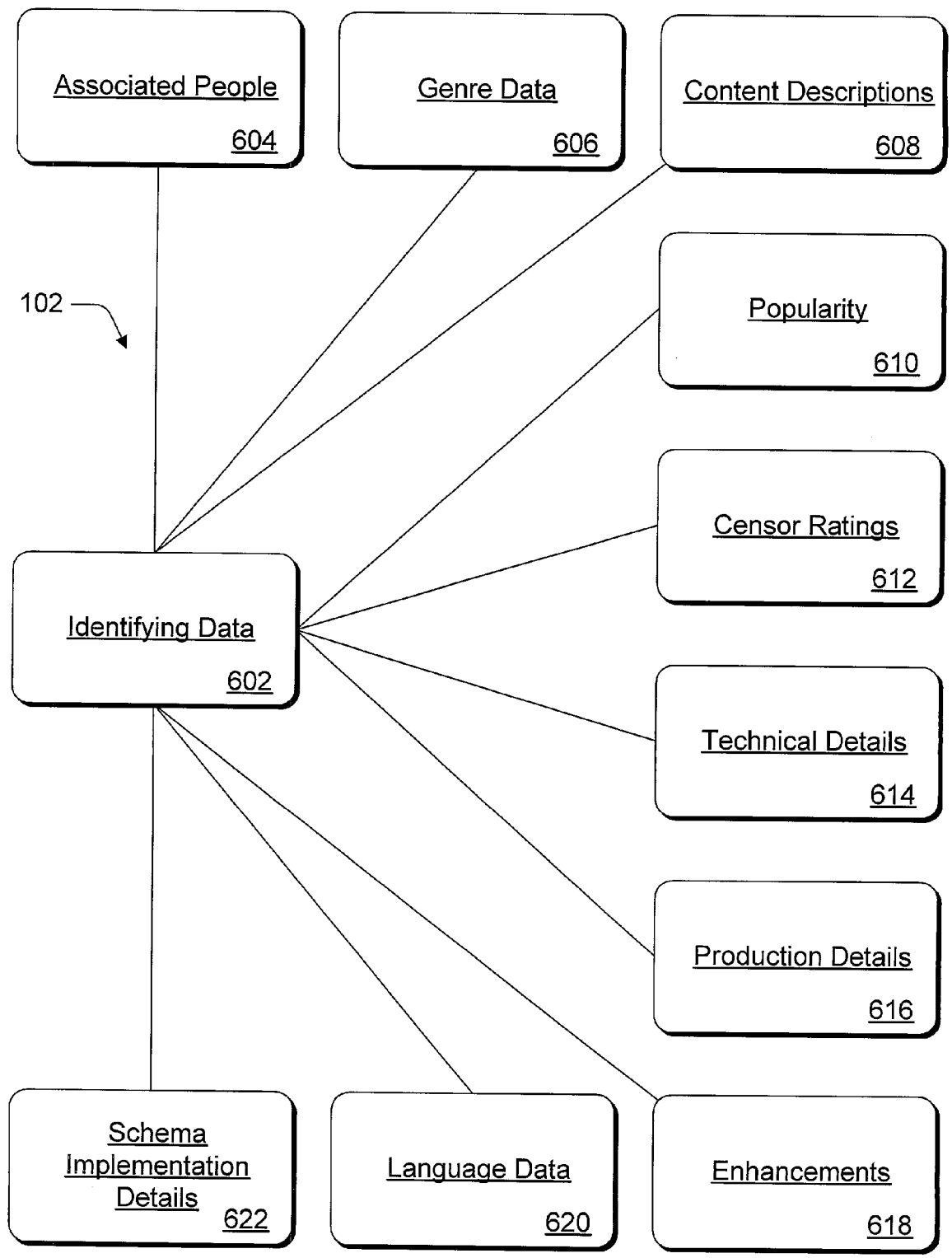
FIG. 6 illustrates related types of content description metadata categories.

FIG. 6 illustrates related types of content description metadata categories. Content description metadata 102 can include many types of related data, including identifying data 602, associated people 604, genre data 606, content descriptions 608, popularity 610, censor ratings 612, technical details 614, production details 616, enhancements 618, language data 620, and schema implementation details 622. Identifying data 602 includes any data that identifies media content, such as a movie title. Other types of metadata (e.g., 604–622) associated with the media content are related to the identifying data 602, and describe attributes of the media content.

Identifying Data 602

FIG. 7 illustrates example identifying data categories. Identifying data 602 includes metadata categories that identify the media content. Example identifying data categories include alternate content identifiers, title, episode name, album, version detail, and part detail.

Alternate Content Identifiers

The Alternate Content Identifiers metadata category is used to map content identifiers assigned by other metadata repositories to the MCID assigned by the media content description system 304. An example Alternate Content Identifiers entity has the following elements:

Value
Entry Index
Entry Tag
MSI
Date Time.

The Value element stores a content identifier assigned to the media content by another metadata repository. For example, a metadata provider 302 may assign unique identifiers to media content within a proprietary data repository.

The Entry Index and Entry Tag elements are elements in most metadata category entities and support multiple entity entries from one metadata provider, or in the case of a composite description, the Entry Index and Entry Tag elements may be used to differentiate between multiple opinions as to the value of an attribute of the meida content. For example, one metadata provider may assign multiple identifiers to the same media content. The metadata provider specifies the order of importance of the multiple entries using the Entry Index field. The metadata provider can provide information as to why each different entry exists in the Entry Tag elements of each Alternate Content Identifiers entity. Alternatively, in a composite description, alternate content identifiers received from multiple metadata providers may be distinguished based on the Entry Index and Entry Tag elements.

The MSI element stores a metadata source identifier, which is a unique identifier assigned by the media content description system 304 to identify each metadata provider 302. The MSI, along with other data related to a metadata provider 302 is stored in metadata provider data repository 416. The structure of metadata provider data repository 416 is described with reference to FIGS. 20–22.

The Date Time element stores a date/time stamp indicating when the metadata associated with the Alternate Content Identifiers entity was received from the metadata provider 302.

The above descriptions for the Entry Index, Entry Tag, MSI, and Date Time elements apply for each record described below that may contain any combination of these fields.

Title

The Title metadata category is used to store one or more titles associated with the media content. An example entity within the Title metadata category has the following elements:

Value
Entry Index
Entry Tag
MSI
Date Time
Language

The Value element stores a title associated with the media content. For example, the value element may contain, "Friends," to indicate the television series by that name, or may contain, "Indiana Jones and the Temple of Doom," to indicate the movie by that name.

The Entry Index and Entry Tag elements are described above and indicate that a metadata provider may submit multiple opinions as to the title associated with the media content, or a composite description may indicate various opinions as to the title, the opinions submitted by multiple metadata providers. For example, titles may be submitted in more than one language, or with different spellings for one or more words in the title.

The MSI element is described above and identifies the metadata provider.

The Date Time element is described above and indicates the date and time at which the data was received.

The Language element stores an identifier of the language associated with the title stored in the Value element. As described above, a standard set of language identifiers may be used. An example of such a standard set of language identifiers is shown in Table 1. Many of the metadata categories described include a Language element. Unless stated otherwise, this description also applies to the Language element associated with metadata categories described below.

Episode Name

The Episode Name metadata category is used to store data identifying an episode name associated with the media content. An example entity within an Episode Name metadata category has the following elements:

Value
Entry Index
Entry Tag
MSI
Date Time
Language

The Value element stores a name or description of the episode. For example, for metadata describing an episode of the television series, "Friends," the Value element may contain, "The one where Ross gets married," or for metadata describing an episode of the television series, "Frasier," the value element stores the actual name of the episode, for example, "Bully for Martin."

The Entry Index and Entry Tag elements are described above and indicate that a metadata provider may submit multiple opinions as to the episode name or description associated with the media content, or a composite description may indicate various opinions as to the episode name, the opinions submitted by multiple metadata providers.

The MSI element is described above and identifies the metadata provider.

The Date Time element is described above and indicates the date and time at which the data was received.

The Language element is described above and identifies the language in which the episode name or description is given.

Album

The Album metadata category is used to store the title of a music album. This metadata category is used when storing metadata associated with a music track, for example, a song. An example entity within the Album metadata category has the following elements:

Value
Entry Index
Entry Tag
MSI
Date Time
Language

The Value element stores the title of the album associated with the media content.

The Entry Index and Entry Tag elements are described above and indicate that a metadata provider may submit multiple album titles associated with the media content. For example a recording artist may produce a song for a particular album, and then at a later time, include the same song on a greatest-hits album. In this case, the same metadata provider may submit metadata about the song, and relate the song to both the original album and the greatest-hits album by submitting both album titles. In a composite description, the Entry Index and Entry Tag elements may differentiate between various opinions as to the title, the opinions submitted by multiple metadata providers The MSI element is described above and identifies the metadata provider.

The Date Time element is described above and indicates the date and time at which the data was received.

The Language element is described above and identifies the language associated with the album title.

Version Detail

The Version Detail metadata category is used to indicate why a media content version was created. For example, a colorized version of an originally black-and-white movie can be indicated using the Version Detail metadata category. An example entity within the Version Detail metadata category has the following elements:

Version Reason
Version Description
Entry Index
Entry Tag
MSI
Date Time
Language

The Version Reason element stores a value that indicates the nature of the media content version. An example selection list of values for the Version Reason element is given in Table 2.

TABLE 2

Unknown
Original
Edited_For_Language
Edited_For_Nudity
Edited_For_Adult_Content
Edited_For_Violence
Edited_For_Duration
Updated
Aspect_Ratio_Change
Resolution_Reduction
Resolution_Increase
Colorized
Language_Dub
Subtitle_Change
Other The Version Description element stores additional information about the media content version. This element can be used to provide addition information as to the reason for the creation of the version, for example, if the Version Reason element contains the value "Other," the Version Description element can be used to specify the other reason. As another example, the Version Description element may be used to indicate why the version was created, for example, as a special re-release of a movie to mark the 50$^{th}$ anniversary of the original release of the movie.

The Entry Index and Entry Tag elements are described above and indicate that a metadata provider may submit metadata associated with multiple versions of the media content, or a composite description may indicate various opinions as to a reson or description of a version if the media content, the opinions submitted by multiple metadata providers.

The MSI element is described above and identifies the metadata provider.

The Date Time element is described above and indicates the date and time at which the data was received.

The Language element is described above and identifies the language associated with the text in the Version Description element.

Part Detail

The Part Detail metadata category is used to indicate multiple parts of the media content. For example, television stations often broadcast a long movie over two nights. The two parts of the media content, each aired separately, are identified by separate entities in the Part Detail metadata category. An example entity within the Part Detail metadata category has the following elements:

Part
Total Parts
Entry Index
Entry Tag
MSI
Date Time

The Part element stores an integer indicating a part of the media content. For example, for a movie aired in two parts over two nights, the part aired on the first night is identified by the Part Detail entity in which the Part element has a value of "1". The part aired on the second night is identified by the Part Detail entity in which the Part element has a value of "2".

The Total Parts element stores an integer indicating the total number of parts associated with the piece of media content. For example, for a movie aired in two parts over two nights, the Total Parts element has a value of "2".

The Entry Index and Entry Tag elements are described above and indicate that a metadata provider may submit metadata describing media content that is divided into parts in multiple ways. For example, the same movie may be aired over two nights by one television station and aired over three nights by another television station. In this example, one set of Part Detail entities may describe the movie as having two parts, while another set of Part Detail entities may describe the movie as having three parts. In a composite description, the Entry Index and Entry Tag elements may differentiate between various opinions as to the part details, the opinions submitted by multiple metadata providers The MSI element is described above and identifies the metadata provider.

The Date Time element is described above and indicates the date and time at which the data was received.

Associated People 604

FIG. 8 illustrates an example associated people metadata category. Associated people 604 includes data that describes people who are associated with the media content. An example associated people metadata category is person.

Person

The Person metadata category is used to store data identifying persons who are associated with the media content. For example, with reference to a movie, actors, directors, screenwriters, and producers are all persons associated with the movie. An example entity within the Person metadata category has the following elements:

MPI
Name
Person Role
Character
Entry Index
Entry Tag
MSI
Date Time
Language

The MPI element stores a unique identifier associated with the person. The media content description system 304 stores the MPI (media person identifier) and other data associated with each person in the media person data repository 414, which is described with reference to FIGS. 18–19.

The Name element is used to store the name of the person.

The Person Role element is used to store an indicator that identifies how the person is associated with the media content. An example list of possible values for the Person Role element is given in Table 3.

TABLE 3

| | |
|---|---|
| Unknown | Narrator |
| General_Participant | Dancer |
| Actor | Animator |
| Actor_Group | Graphics_Artist |
| Director | Casting |
| Assistant_Director | Continuity |
| Producer | Art_Director |
| Executive_Producer | Technical_Direction |
| Editor | Production_Manager |
| Script_Writer | Production_Designer |
| Lyrics_Writer | Production_Assistant |
| Music_Composer | Set_Designer |
| Music_Artist | Set_Maker |
| Music_Artist_Keyboard | Computer_Engineer |
| Music_Artist_Drummer | Property_Logistics |

TABLE 3-continued

| | |
|---|---|
| Music_Artist_Guitarist | Stunts |
| Music_Artist_Lead_Singer | Special_Effects |
| Music_Artist_Backing_Singer | Sound_Effects |
| Music_Band | Assistant_Editor |
| Manager | Assistant_Camera_Operator |
| Music_Supervisor | Makeup |
| Sound_Engineer | Costumes |
| Video_Engineer | Title_Designer |
| Camera_Operator | Marketing |
| Photographer | Assistant |
| Cinematographer | Staff |
| Lighting | Distributor |
| Host | Publisher |
| Anchor | Aggregator |
| News_Reporter | Contestant |
| Interviewer | Subject_Of_Program |
| Performer | Other |

The Character element is used to store the name of a character played by the identified person. For example, for the television series, "Frasier," the Person entity identifying the actor, Kelsey Grammer, may have the value "Dr. Frasier Crane" in the Character element.

The Entry Index and Entry Tag elements are described above and indicate that a metadata provider may submit metadata describing a list of cast members associated with the media content. A second and less common use of the Entry Index and Entry Tag elements is to identify priorities among a plurality of associations that one person may have with the media. For example, a particular actor may play more than one character in a movie, or an actor may also be the director of a movie. In a composite description, the Entry Index and Entry Tag elements may differentiate between various opinions as to a role or character played by a person, the opinions submitted by multiple metadata providers The MSI element is described above and identifies the metadata provider.

The Date Time element is described above and indicates the date and time at which the data was received.

The Language element is described above and identifies the language associated with the character element. For example, a character may have one name in France, and the same character may have a different name in America.

Genre Data 606

FIG. 9 illustrates example genre data categories. Genre data 606 includes metadata categories that describes a genre or category in which the media content may be included. Example genre data categories include genre program type, genre degrees, genre intent, target audience, year set, era set, location portrayed, from the book, degree of true story, degree of animated 2D, degree of animated 3D, degree of puppet characters, degree of international event, degree of sophistication, music genre, genre photo or home movie, and format.

Genre Program Type

The Genre Program Type metadata category is used to store data that identifies a media type or category associated with the media content. An example entity within the Genre Program Type metadata category has the following elements:

Value
Entry Index
Entry Tag
MSI
Date Time

The Value element stores an indicator of a category or genre associated with the media content. An example list of values for populating the Value element is given in Table 4.

TABLE 4

MovieDrama
None
Unknown
General
News_And_Current_Affairs_-_General
News_And_Current_Affairs_-_Daily_News
News_And_Current_Affairs_-_Special_News_Program
News_And_Current_Affairs_-_Past_News_Roundup
News_And_Current_Affairs_-_News_And_Current_Affairs_Magazine
News_And_Current_Affairs_-_Traffic
News_And_Current_Affairs_-_Weather
News_And_Current_Affairs_-_Politics
News_And_Current_Affairs_-_Economy
News_And_Current_Affairs_-_Business
News_And_Current_Affairs_-_Financial
News_And_Current_Affairs_-_Legal_And_Investigative_Journalism
News_And_Current_Affairs_-_News_About_Education
News_And_Current_Affairs_-_Sports_News
News_And_Current_Affairs_-_Social_Report
News_And_Current_Affairs_-_Press_Roundup
News_And_Current_Affairs_-_Showbiz_And_Personality_News
News_And_Current_Affairs_-_Service_Information
News_And_Current_Affairs_-_Other
Informational_-_General
Informational_-_Money_Advice
Informational_-_Legal_Magazine
Informational_-_Health_Magazine
Informational_-_Personal_Problems_Magazine
Informational_-_Sex_Information_Magazine
Informational_-_Shopping
Informational_-_Interview
Informational_-_Lecture TABLE 4-continued

```
Informational_-_Schools_Program
Informational_-_Speech_Or_Presentation
Informational_-_Ethnic
Informational_-_Language_Learning
Informational_-_Other
Documentary_-_General
Documentary_-_Science
Documentary_-_Technology
Documentary_-_Engineering_And_Construction
Documentary_-_Transport
Documentary_-_Historical
Documentary_-_Medical
Documentary_-_Environment
Documentary_-_Space
Documentary_-_Undersea
Documentary_-_Social_Science
Documentary_-_Psychology
Documentary_-_Sex
Documentary_-_Legal
Documentary_-_Music
Documentary_-_Biography
Documentary_-_Business_And_Specific_Industries
Documentary_-_Nature
Documentary_-_Religions
Documentary_-_Culture_And_Traditions
Documentary_-_Foreign_Countries
Documentary_-_Expeditions_And_Adventure
Documentary_-_Politics
Documentary_-_Past_News_Events
Documentary_-_Showbiz
Documentary_-_Other
General_Entertainment_And_Comedy_-_General
General_Entertainment_And_Comedy_-_SitCom
General_Entertainment_And_Comedy_-_Standup_Comedy
General_Entertainment_And_Comedy_-_Comedy_Sketch_Show
General_Entertainment_And_Comedy_-_Comedy_News_Parody
General_Entertainment_And_Comedy_-_Reality_Show
General_Entertainment_And_Comedy_-_Variety_Show
General_Entertainment_And_Comedy_-_Courtroom
General_Entertainment_And_Comedy_-_Celebrity_Chat_Show
General_Entertainment_And_Comedy_-_Public_Talk_Show
General_Entertainment_And_Comedy_-_Quiz_Game_Show
General_Entertainment_And_Comedy_-_Contest_Show
General_Entertainment_And_Comedy_-_Bloopers
General_Entertainment_And_Comedy_-_Real_Life_Drama
General_Entertainment_And_Comedy_-_Surprise_Show
General_Entertainment_And_Comedy_-_Comedy_Entertainer_Show
General_Entertainment_And_Comedy_-_Musical_Entertainer_Show
General_Entertainment_And_Comedy_-_Magic
General_Entertainment_And_Comedy_-_Panel_Quiz_Show
General_Entertainment_And_Comedy_-_Other
Arts_And_Culture_-_General
Arts_And_Culture_-_Pop_Music
Arts_And_Culture_-_Classical_Music
Arts_And_Culture_-_Old_Time_Music_Hall
Arts_And_Culture_-_Paintings_And_Sculpture
Arts_And_Culture_-_Theater_And_Performing_Arts
Arts_And_Culture_-_Ballet
Arts_And_Culture_-_Opera
Arts_And_Culture_-_New_Media
Arts_And_Culture_-_Traditional
Arts_And_Culture_-_Literature_And_Poetry
Arts_And_Culture_-_Languages
Arts_And_Culture_-_Architecture
Arts_And_Culture_-_Cinema_Reviews
Arts_And_Culture_-_Tv_And_Radio_Reviews
Arts_And_Culture_-_Other
Leisure_-_General
Leisure_-_Diy_Home
Leisure_-_Diy_Car
Leisure_-_Cookery
Leisure_-_Sewing
Leisure_-_Home_Making
Leisure_-_Gardening
Leisure_-_Handicrafts
Leisure_-_Travel_And_Tourism
Leisure_-_Dining_Out
Leisure_-_Boating
Leisure_-_Motoring
```

TABLE 4-continued

Leisure_-_Motorcycling
Leisure_-_Cycling
Leisure_-_Hiking_And_Camping
Leisure_-_Outdoors
Leisure_-_Keep_Fit
Leisure_-_Fashion
Leisure_-_Computing
Leisure_-_Video_Gaming
Leisure_-_Audio_Video_Equipment
Leisure_-_Pets
Leisure_-_Antique_Collecting
Leisure_-_Painting_And_Sculpture_Learning
Leisure_-_Fishing_Learning
Leisure_-_Musical_Instruments_Learning
Leisure_-_Skiing_Learning
Leisure_-_Snowboarding_Learning
Leisure_-_Boardsailing_Learning
Leisure_-_Golf_Learning
Leisure_-_Chess_Learning
Leisure_-_Sports_Other_Learning
Leisure_-_Other
Religions_And_Philosophies_-_General
Religions_And_Philosophies_-_Christianity
Religions_And_Philosophies_-_Judaism
Religions_And_Philosophies_-_Buddhism
Religions_And_Philosophies_-_Islam
Religions_And_Philosophies_-_Hinduism
Religions_And_Philosophies_-_Agnosticism
Religions_And_Philosophies_-_Atheism
Religions_And_Philosophies_-_Humanism
Religions_And_Philosophies_-_Communism
Religions_And_Philosophies_-_Socialism
Religions_And_Philosophies_-_Capitalism
Religions_And_Philosophies_-_Libertarianism
Religions_And_Philosophies_-_Republicanism
Religions_And_Philosophies_-_Other
Events_-_General
Events_-_Nationally_Significant_Event
Events_-_Celebrity_Event
Events_-_Non_Celebrity_Event
Events_-_Military_Event
Events_-_Political_Event
Events_-_Ceremonies
Events_-_Festivals
Events_-_Other
Sport_-_General
Sport_-_Acrobatics
Sport_-_Aeronautics
Sport_-_Aikido
Sport_-_American_Football
Sport_-_Archery
Sport_-_Athletics
Sport_-_Badminton
Sport_-_Bandy
Sport_-_Baseball
Sport_-_Basketball
Sport_-_Biathlon
Sport_-_Billiards
Sport_-_Board_Sailing
Sport_-_Bobsleighing_And_Tobogganing
Sport_-_Body_Building
Sport_-_Boule_And_Bowls
Sport_-_Bowling
Sport_-_Boxing
Sport_-_Canoeing
Sport_-_Casting
Sport_-_Chess
Sport_-_Computer_Gaming
Sport_-_Cricket
Sport_-_Croquet
Sport_-_Curling
Sport_-_Cycling
Sport_-_Dance_Sport
Sport_-_Darts
Sport_-_Diving_And_Subaquatics
Sport_-_Dog_Racing
Sport_-_Equestrian_Excluding_Horse_Racing
Sport_-_Faustball
Sport_-_Fencing

TABLE 4-continued

Sport_-_Fishing
Sport_-_Flying_Disc
Sport_-_Golf
Sport_-_Gymnastics
Sport_-_Handball
Sport_-_Hockey
Sport_-_Horse_Racing
Sport_-_Ice_Hockey
Sport_-_Jai_Alai
Sport_-_Judo
Sport_-_Jujitsu
Sport_-_Karate
Sport_-_Korfball
Sport_-_Lacrosse
Sport_-_Luge
Sport_-_Maccabi
Sport_-_Marathon
Sport_-_Modern_Pentathlon
Sport_-_Motor_Boating
Sport_-_Motorcycling
Sport_-_Motor_Racing_Cars
Sport_-_Mountaineering
Sport_-_Netball
Sport_-_Orienteering_And_Hiking
Sport_-_Polo
Sport_-_Power_Lifting
Sport_-_Racquetball_And_Squash
Sport_-_Roller_Skating
Sport_-_Rowing
Sport_-_Rugby
Sport_-_Running
Sport_-_Shooting
Sport_-_Skating_Ice
Sport_-_Skibob
Sport_-_Skiing
Sport_-_Sky_Diving
Sport_-_Sleddog
Sport_-_Snooker
Sport_-_Snowboarding
Sport_-_Soccer_Football
Sport_-_Soft_Tennis
Sport_-_Softball
Sport_-_Sombo
Sport_-_Sumo_Wrestling
Sport_-_Surfing
Sport_-_Swimming_And_Diving
Sport_-_Table_Tennis
Sport_-_Taekwondo
Sport_-_Tennis
Sport_-_Track_And_Element
Sport_-_Trampoline
Sport_-_Triathlon
Sport_-_Tug_Of_War
Sport_-_Volleyball
Sport_-_Water_Polo
Sport_-_Water_Skiing
Sport_-_Weight_Lifting
Sport_-_Wrestling
Sport_-_Yachting
Sport_-_Other_Ball_Game
Sport_-_Other_Combative_Sport
Sport_-_Other_Martial_Sports
Sport_-_Other_Oriental_Sports
Sport_-_Other_Team_Sport
Sport_-_Other_Water_Sport
Sport_-_Other_Winter_Sport
Sport_-_Other
Advertising_-_General
Advertising_-_Medicine_And_Sanitary_Products
Advertising_-_Toiletries
Advertising_-_Cosmetics
Advertising_-_Alcohol_And_Tobacco
Advertising_-_Soft_Drinks
Advertising_-_Sweets_And_Puddings
Advertising_-_Foods
Advertising_-_Household_Cleaning_And_Painting
Advertising_-_Household_Furnishings
Advertising_-_Audio_Video_Equipment
Advertising_-_Computers_And_Cameras

TABLE 4-continued

Advertising_-_Cars_Bikes_And_Boats
Advertising_-_Pets
Advertising_-_Clothes_And_Shoes
Advertising_-_Entertainment
Advertising_-_Travel_And_Hotels
Advertising_-_Restaurants
Advertising_-_Shopping_Stores
Advertising_-_Financial_Services_And_RealEstate
Advertising_-_Publications
Advertising_-_Public_Utilities
Advertising_-_Company_Publicity
Advertising_-_Government_Information
Advertising_-_Political
Advertising_-_TV_Program_Trailers
Advertising_-_Direct_Sell
Advertising_-_Infomercial
Advertising_-_Other
Audio_-_General
Audio_-_Music_Track
Audio_-_Book
Audio_-_Talk
Audio_-_Music_And_Talk
Audio_-_Other
PhotoOrHomeMovie_-_General
PhotoOrHomeMovie_-_Professional_Of_Place
PhotoOrHomeMovie_-_Professional_Of_People
PhotoOrHomeMovie_-_Professional_Of_Event
PhotoOrHomeMovie_-_Professional_Of_Document
PhotoOrHomeMovie_-_Professional_Graphic
PhotoOrHomeMovie_-_Amateur_Of_Place
PhotoOrHomeMovie_-_Amateur_Of_People
PhotoOrHomeMovie_-_Amateur_Of_Event
PhotoOrHomeMovie_-_Amateur_Of_Document
PhotoOrHomeMovie_-_Amateur_Graphic
PhotoOrHomeMovie_-_Other
Other The Entry Index and Entry Tag elements are described above and indicate that a metadata provider may submit metadata that categorizes the media content multiple ways, or a composite description may indicate various opinions as to the genre program type, the opinions submitted by multiple metadata providers. For example, a weekend sports show may have three different segments, one covering football, one covering hockey, and one covering downhill skiing. The media may be categorized as Sport_—_General, Sport_—_American_Football, Sport_—_Hoc or Sport_—_Skiing.

The MSI element is described above and identifies the metadata provider.

The Date Time element is described above and indicates the date and time at which the data was received.

Genre Degrees

The Genre Degrees metadata category is used to further categorize media that is specified in the Genre Program Type metadata category as "MovieDrama". An example entity within the Genre Degrees metadata category has the following elements:

| | |
|---|---|
| Action | Legal Interest |
| Adventure | Religious Interest |
| Horror | Historical Interest |
| Comedy | War Interest |
| Death | Epic Production |
| Mystery | Fantasy Folklore |
| Police Involvement | Musical |
| Thriller | Western |
| Political Intrigue | Monsters |
| Romance | Teenage College |

-continued

| | |
|---|---|
| Erotica | Ethnic Interest |
| Science Fiction | Soap |
| Period Setting | Entry Index |
| Lives Drama | Entry Tag |
| Sports Interest | MSI |
| Animal Interest | Date Time |
| Medical Interest | |

The Action, Adventure, Horror, Comedy, Death, Mystery, Police Involvement, Thriller, Political Intrigue, Romance, Erotica, Science Fiction, Period Setting, Lives Drama, Sports Interest, Animal Interest, Medical Interest, Legal Interest, Religious Interest, Historical Interest, War Interest, Epic Production, Fantasy Folklore, Musical, Western, Monsters, Teenage College, Ethnic Interest, and Soap elements each store an integer number that indicates a percentage value that indicates how well the media content falls into the respective category. In an exemplary system, the sum of the values in these elements is 100. For example, to indicate that the movie "Ausin Powers" is mostly a comedy, but also includes elements of romance and Science Fiction, the Comedy, Romance, and Science Fiction elements may be assigned values 70, 25, and 5, respectively.

The Entry Index and Entry Tag elements are described above and indicate that a metadata provider may submit metadata that categorizes the media content multiple ways, or a composite description may indicate various opinions as to the categorization of the media content, the opinions submitted by multiple metadata providers. For example, the movie "Ausin Powers" may be additionally categorized as 90% comedy and 10% romance.

The MSI element is described above and identifies the metadata provider.

The Date Time element is described above and indicates the date and time at which the data was received.

Genre Intent

The Genre Intent metadata category is used to store data that describes the purpose of the media content (e.g., why the program was made or what the program is supposed to do). An example entity within the Genre Intent metadata category has the following elements:

Education
Entertainment
News
Information
Enrich Or Involve
Sell
Entry Index
Entry Tag
MSI
Date Time The Education, Entertainment, News, Information, Enrich Or Involve, and Sell elements each store an integer number that indicates a percentage value to which the purpose of the media falls into the respective category. In an exemplary system, the sum of the values in these elements is 100. For example, a television sitcom may be associated with a value of 100 in the Entertainment element, while a television infomercial may have a value of 80 in the Sell element and a value of 20 in the Information element.

The Entry Index and Entry Tag elements are described above and indicate that a metadata provider may submit metadata that categorizes the intent of the media content multiple ways, or a composite description may indicate various opinions as to the intent of the media content, the opinions submitted by multiple metadata providers. For example, a second categorization of the television infomercial mentioned above may have a value of 100 in the Sell element and the other element values set to 0.

The MSI element is described above and identifies the metadata provider.

The Date Time element is described above and indicates the date and time at which the data was received.

Target Audience

The Target Audience metadata category is used to store data that describes characteristics of audiences targeted by the media content. An example entity within the Target Audience metadata category has the following elements:

Gender
Age
Marital Status
Household Annual Income
Education
Ethnic Origin
Religion
Occupation
Entry Index
Entry Tag
MSI
Date Time The Gender element stores an indicator of the gender that the media content targets. Example values for populating the Gender element may include: Unknown, All, Male, Female, Male_Homosexual, Female_Homosexual, and Other.

The Age element stores an indicator of the age or age group that the media content targets. Example values for populating the Age element may include: Unknown, All, 0–5, 6–12, 13–19, 20–34, 35–54, and 55+.

The Marital Status element stores an indicator of the marital status of members of the audience targeted by the media content. Example values for populating the Marital Status element may include: Unknown, All, Single, Married_No_Children, Married_With_Children, and Single_With_Children.

The Household Annual Income element stores an indicator of the average household income of members of the audience targeted by the media content. Example values for populating the Household Annual Income element may include: Unknown, All, 0–34K$, 35–69K$, 70–139K$, and 140+K$.

The Education element stores an indicator of the average level of education of members of the audience targeted by the media content. Example values for populating the Education element may include: Unknown, All, Low, Average, and High.

The Ethnic Origin element stores an indicator of the ethnic origin of members of the audience targeted by the media content. Table 5 is a list of example values for populating the Ethnic Origin element.

TABLE 5

Unknown
All
Western_European
Eastern_European
Latino
African
Indian_Asian
Far_Eastern
Arabic
Original_Peoples
Other The Religion element stores an indicator of the religion of members of the audience targeted by the media content. Table 6 is a list of example values for populating the Religion element.

TABLE 6

Unknown
All
Christian
Jewish
Buddhist
Islamic
Hindu
Agnostic
Atheist
Other

The Occupation element stores an indicator of the occupation of members of the audience targeted by the media content. Table 7 is a list of example values for populating the Occupation element.

TABLE 7

Unknown
All
Not_Employed
Manual_Worker
Office_Worker
Crafts_Or_Skill_Worker
Profession_Worker
Technologist
Manager
Other The Entry Index and Entry Tag elements are described above and indicate that a metadata provider may submit metadata that categorizes multiple target audiences, or a composite description may indicate various opinions as to the target audience, the opinions submitted by multiple metadata providers. For example, the media content may be targeted at individuals in a plurality of occupations, genders, or income levels.

The MSI element is described above and identifies the metadata provider.

The Date Time element is described above and indicates the date and time at which the data was received.

Year Set

The Year Set metadata category is used to store data indicating a year portrayed within the media content. An example entity within the Year Set metadata category has the following elements:

Value
Entry Index
Entry Tag
MSI
Date Time

The Value element stores a number that indicates a year portrayed in the media content. For example, a value of "1942" may be associated with a movie set in 1942.

The Entry Index and Entry Tag elements are described above and indicate that a metadata provider may submit metadata that indicates a plurality of years portrayed within the media content, or a composite description may indicate various opinions as to a year portrayed, the opinions submitted by multiple metadata providers. For example, a movie that spans five years of an individual's life may have five Year Set Entries entities, one for each year portrayed.

The MSI element is described above and identifies the metadata provider.

The Date Time element is described above and indicates the date and time at which the data was received.

Era Set

The Era Set metadata category is used to store data associated with an era portrayed within the media content. An example entity within an Era Set Entries metadata category has the following elements:

Value
Entry Index
Entry Tag
MSI
Date Time

The Value element stores an indicator of an era portrayed in the media content. Table 8 is a list of example ranges of values for populating the Value element.

TABLE 8

Unknown
None
Before_100BC
100BC–500AD
500–1500
1500–1800
1800–1900
1900–1960
1960–2000
Today_Approx
Up_To_100_Years_In_The_Future
More_Than_100_Years_In_The_Future The Entry Index and Entry Tag elements are described above and indicate that a metadata provider may submit metadata that indicates a plurality of eras portrayed within the media content, or a composite description may indicate various opinions as to the era in which the media content is set, the opinions submitted by multiple metadata providers. For example, a movie about time travel may have several Era Set entities, each with a Value element representing a different era portrayed in the movie.

The MSI element is described above and identifies the metadata provider.

The Date Time element is described above and indicates the date and time at which the data was received.

Location Portrayed

The Location Portrayed metadata category is used to store data indicating a location portrayed in the media content. An example entity within the Location Portrayed metadata category has the following elements:

Astronomical Location
Country
State
City
Location Portrayed Detail
Entry Index
Entry Tag
MSI
Date Time
Language The Astronomical Location element stores a name or description of an astronomical location (e.g., Earth, the moon, Mars, another galaxy far away, etc.) portrayed in the media content.

The Country element stores a value that indicates a country portrayed in the media content. A list of possible values for populating the Country element is given below, in Table 9.

The State element stores a value that indicates a state portrayed in the media content. The value may be the name of a state, such as "Washington", or an abbreviation associated with the state, such as "WA".

The City element stores the name of a city portrayed in the media content.

The Location Portrayed Detail element is used to store additional details that describe a location portrayed in the media content. For example, the Location Portrayed Detail element may contain the value, "Alcatraz Island in the middle of San Francisco Bay," in a Location Portrayed element associated with the movie, "Escape from Alcatraz".

The Entry Index and Entry Tag elements are described above and indicate that a metadata provider may submit data describing multiple locations portrayed in the media content, or a composite description may indicate various opinions as to the location portrayed, the opinions submitted by multiple metadata providers.

The MSI element is described above and identifies the metadata provider.

The Date Time element is described above and indicates the date and time at which the data was received.

The Language element is described above and identifies the language associated with the value of the Location Portrayed Detail element.

TABLE 9

Unknown
None
All
Not_Applicable
AD_Andorra,_Principality_of
AE_United_Arab_Emirates TABLE 9-continued AF__Afghanistan,__Islamic__State__of
AG__Antigua__and__Barbuda
AI__Anguilla
AL__Albania
AM__Armenia
AN__Netherlands__Antilles
AO__Angola
AQ__Antarctica
AR__Argentina
AS__American__Samoa
AT__Austria
AU__Australia
AW__Aruba
AZ__Azerbaidjan
BA__Bosnia-Herzegovina
BB__Barbados
BD__Bangladesh
BE__Belgium
BF__Burkina__Faso
BG__Bulgaria
BH__Bahrain
BI__Burundi
BJ__Benin
BM__Bermuda
BN__Brunei__Darussalam
BO__Bolivia
BR__Brazil
BS__Bahamas
BT__Bhutan
BV__Bouvet__Island
BW__Botswana
BY__Belarus
BZ__Belize
CA__Canada
CC__Cocos__(Keeling)__Islands
CF__Central__African__Republic
CD__Congo,__The__Democratic__Republic__of__the
CG__Congo
CH__Switzerland
CI__Ivory__Coast__(Cote__D'Ivoire)
CK__Cook__Islands
CL__Chile
CM__Cameroon
CN__China
CO__Colombia
CR__Costa__Rica
CS__Former__Czechoslovakia
CU__Cuba
CV__Cape__Verde
CX__Christmas__Island
CY__Cyprus
CZ__Czech__Republic
DE__Germany
DJ__Djibouti
DK__Denmark
DM__Dominica
DO__Dominican__Republic
DZ__Algeria
EC__Ecuador
EE__Estonia
EG__Egypt
EH__Western__Sahara
ER__Eritrea
ES__Spain
ET__Ethiopia
FI__Finland
FJ__Fiji
FK__Falkland__Islands
FM__Micronesia
FO__Faroe__Islands
FR__France
FX__France__(European__Territory)
GA__Gabon
GD__Grenada
GE__Georgia
GF__French__Guyana
GH__Ghana
GI__Gibraltar
GL__Greenland
GM__Gambia
GN__Guinea
GP__Guadeloupe__(French)
GQ__Equatorial__Guinea
GR__Greece
GS__S.Georgia__and__S.Sandwich__Isls.
GT__Guatemala
GU__Guam__(USA)
GW__Guinea__Bissau
GY__Guyana
HK__Hong__Kong
HM__Heard__and__McDonald__Islands
HN__Honduras
HR__Croatia
HT__Haiti
HU__Hungary
ID__Indonesia
IE__Ireland
IL__Israel
IN__India
IO__British__Indian__Ocean__Territory
IQ__Iraq
IR__Iran
IS__Iceland
IT__Italy
JM__Jamaica
JO__Jordan
JP__Japan
KE__Kenya
KG__Kyrgyz__Republic__(Kyrgyzstan)
KH__Cambodia,__Kingdom__of
KI__Kiribati
KM__Comoros
KN__Saint__Kitts__and__Nevis__Anguilla
KP__North__Korea
KR__South__Korea
KW__Kuwait
KY__Cayman__Islands
KZ__Kazakhstan
LA__Laos
LB__Lebanon
LC__Saint__Lucia
LI__Liechtenstein
LK__Sri__Lanka
LR__Liberia
LS__Lesotho
LT__Lithuania
LU__Luxembourg
LV__Latvia
LY__Libya
MA__Morocco
MC__Monaco
MD__Moldavia
MG__Madagascar
MH__Marshall__Islands
MK__Macedonia
ML__Mali
MM__Myanmar
MN__Mongolia
MO__Macau
MP__Northern__Mariana__Islands
MQ__Martinique__(French)
MR__Mauritania
MS__Montserrat
MT__Malta
MU__Mauritius
MV__Maldives
MW__Malawi
MX__Mexico
MY__Malaysia
MZ__Mozambique
NA__Namibia
NC__New__Caledonia__(French)
NE__Niger
NF__Norfolk__Island
NG__Nigeria
NI__Nicaragua
NL__Netherlands
NO__Norway TABLE 9-continued NP_Nepal
NR_Nauru
NT_Neutral_Zone
NU_Niue
NZ_New_Zealand
OM_Oman
PA_Panama
PE_Peru
PF_Polynesia_(French)
PG_Papua_New_Guinea
PH_Philippines
PK_Pakistan
PL_Poland
PM_Saint_Pierre_and_Miquelon
PN_Pitcairn_Island
PR_Puerto_Rico
PT_Portugal
PW_Palau
PY_Paraguay
QA_Qatar
RE_Reunion_(French)
RO_Romania
RU_Russian_Federation
RW_Rwanda
SA_Saudi_Arabia
SB_Solomon_Islands
SC_Seychelles
SD_Sudan
SE_Sweden
SG_Singapore
SH_Saint_Helena
SI_Slovenia
SJ_Svalbard_and_Jan_Mayen_Islands
SK_Slovak_Republic
SL_Sierra_Leone
SM_San_Marino
SN_Senegal
SO_Somalia
SR_Suriname
ST_Saint_Tome_(Sao_Tome)_and_Principe
SU_Former_USSR
SV_El_Salvador
SY_Syria
SZ_Swaziland
TC_Turks_and_Caicos_Islands
TD_Chad
TF_French_Southern_Territories
TG_Togo
TH_Thailand
TJ_Tadjikistan
TK_Tokelau
TM_Turkmenistan
TN_Tunisia
TO_Tonga
TP_East_Timor
TR_Turkey
TT_Trinidad_and_Tobago
TV_Tuvalu
TW_Taiwan
TZ_Tanzania
UA_Ukraine
UG_Uganda
UK_United_Kingdom
UM_USA_Minor_Outlying_Islands
US_United_States
UY_Uruguay
UZ_Uzbekistan
VA_Holy_See_(Vatican_City_State)
VC_Saint_Vincent_and_Grenadines
VE_Venezuela
VG_Virgin_Islands_(British)
VI_Virgin_Islands_(USA)
VN_Vietnam
VU_Vanuatu
WF_Wallis_and_Futuna_Islands
WS_Samoa
YE_Yemen
YT_Mayotte
YU_Yugoslavia TABLE 9-continued ZA_South_Africa
ZM_Zambia
ZR_Zaire
ZW_Zimbabwe From The Book The From The Book metadata category is used to store data that identifies a book that was the source of inspiration for the media content. For example, the movie, "A Walk to Remember," is based on a book by the same name, by author, Nicholas Sparks. An example entity within the From The Book metadata category has the following elements:

Book Title
Book Author
Entry Index
Entry Tag
MSI
Date Time

The Book Title element stores the title of the book on which the media content is based.

The Book Author element stores the name of the author of the book identified in the Book Title element.

The Entry Index and Entry Tag elements are described above and indicate that a metadata provider may submit data identifying multiple books associated with the media content, or a composite description may indicate various opinions as to a book associated with the media content, the opinions submitted by multiple metadata providers. For example, a movie may be based on a combination of a first book and a second book that is a sequel to the first book.

The MSI element is described above and identifies the metadata provider.

The Date Time element is described above and indicates the date and time at which the data was received.

Degree of True Story

The Degree Of True Story metadata category is used to store data that identifies whether the media content portrays actual events. An example entity within the Degree Of True Story metadata category has the following elements:

Value
Entry Index
Entry Tag
MSI
Date Time

The Value element stores an integer number between 0 and 100 that indicates the percentage to which the media content portrays actual events. For example, when associated with media content that is a documentary, the Value element may store the number 100, indicating that the events portrayed are 100 percent true and actual. When associated with media content may be categorized as historical fiction, meaning that the story is fictional, but based on actual historical events, the Value element may store the number 50, indicating that the events portrayed are only 50 percent true and actual.

The Entry Index and Entry Tag elements are described above and indicate that a metadata provider may submit multiple opinions as to the degree of actuality associated with the media content, or a composite description may indicate various opinions as to the degree of actuality, the opinions submitted by multiple metadata providers.

The MSI element is described above and identifies the metadata provider.

The Date Time element is described above and indicates the date and time at which the data was received.

Degree of Animated 2D

The Degree Of Animated 2D metadata category is used to store data that indicates the amount of two-dimensional animation contained within the media content. An example entity within the Degree Of Animated 2D metadata category has the following elements:

Value
Entry Index
Entry Tag
MSI
Date Time

The Value element stores an integer number between 0 and 100 that indicates the percentage to which the media content is animated in two dimensions. For example, when associated with the animated movie, "The Lion King", the Value element may store the number 100, indicating that the movie is 100 percent two-dimensional animation. When associated with the movie, "Mary Poppins", which is a live action film with small elements of two-dimensional animation, the Value element may store the number 10, indicating that the media content is 10 percent two-dimensional animation.

The Entry Index and Entry Tag elements are described above and indicate that a metadata provider may submit multiple opinions as to the degree of two-dimensional animation associated with the media content, or a composite description may indicate various opinions as to the degree of two-dimensional animation, the opinions submitted by multiple metadata providers.

The MSI element is described above and identifies the metadata provider.

The Date Time element is described above and indicates the date and time at which the data was received.

Degree of Animated 3D

The Degree Of Animated 3D metadata category is used to store data that indicates the amount of three-dimensional animation contained within the media content. An example entity within the Degree Of Animated 3D metadata category has the following elements:

Value
Entry Index
Entry Tag
MSI
Date Time

The Value element stores an integer number between 0 and 100 that indicates the percentage to which the media content is animated in three dimensions. For example, when associated with the animated movie, "Toy Story", the Value element may store the number 100, indicating that the movie is 100 percent three-dimensional animation.

The Entry Index and Entry Tag elements are described above and indicate that a metadata provider may submit multiple opinions as to the degree of three-dimensional animation associated with the media content, or a composite description may indicate various opinions as to the degree of three-dimensional animation, the opinions submitted by multiple metadata providers.

The MSI element is described above and identifies the metadata provider.

The Date Time element is described above and indicates the date and time at which the data was received.

Degree of Puppet Characters

The Degree Of Puppet Characters metadata category is used to store data that indicates the amount of puppet characters within the media content. An example entity within the Degree Of Puppet Characters metadata category has the following elements:

Value
Entry Index
Entry Tag
MSI
Date Time

The Value element stores an integer number between 0 and 100 that indicates the percentage to which the characters in the media content are puppets. For example, when associated with the television series, "Sesame Street", the Value element may store the number 90, indicating that 90 percent of the characters are puppets.

The Entry Index and Entry Tag elements are described above and indicate that a metadata provider may submit multiple opinions as to the degree of puppet characters associated with the media content, or a composite description may indicate various opinions as to the degree of puppet characters, the opinions submitted by multiple metadata providers.

The MSI element is described above and identifies the metadata provider.

The Date Time element is described above and indicates the date and time at which the data was received.

Degree of International Event

The Degree Of International Event metadata category is used to store data identifying the degree to which the media content pertains to an international event. An example entity within the Degree Of International Event metadata category has the following elements:

Value
Entry Index
Entry Tag
MSI
Date Time

The Value element stores an integer number between 0 and 100 that indicates the percentage to which the media content pertains to an international event. For example, a high percentage of International Event may be associated with media coverage of the Olymics is a high percentage of International Event.

The Entry Index and Entry Tag elements are described above and indicate that a metadata provider may submit multiple opinions as to the degree to which the media content pertains to an international event, or a composite description may indicate various opinions as to the degree to which the media content pertains to an international event, the opinions submitted by multiple metadata providers.

The MSI element is described above and identifies the metadata provider.

The Date Time element is described above and indicates the date and time at which the data was received.

Degree of Sophistication

The Degree Of Sophistication metadata category is used to store data how sophisticated the media content is. An example entity within the Degree Of Sophistication metadata category has the following elements:

Value
Entry Index
Entry Tag
MSI
Date Time

The Value element stores an integer number between 0 and 100 that indicates the level to which the media content is sophisticated. For example, a high degree of sophistication may be associated with an opera, while a low degree of sophistication may be associated with a program such as "Gladiators."

The Entry Index and Entry Tag elements are described above and indicate that a metadata provider may submit multiple opinions as to the degree of sophistication associated with the media content, or a composite description may indicate various opinions as to the degree of sophistication, the opinions submitted by multiple metadata providers.

The MSI element is described above and identifies the metadata provider.

The Date Time element is described above and indicates the date and time at which the data was received.

Genre Music

The Genre Music metadata category is used to store data that identifies a category associated with media content that is related to music. An example entity within the Genre Music metadata category has the following elements:

Value
Entry Index
Entry Tag
MSI
Date Time

The Value element stores the name of a music category or genre that applies to the media content. Example music categories are listed in Table 10, below.

The Entry Index and Entry Tag elements are described above and indicate that a metadata provider may submit multiple opinions as to the music genre associated with the media content, or a composite description may indicate various opinions as to the music genre, the opinions submitted by multiple metadata providers.

The MSI element is described above and identifies the metadata provider.

The Date Time element is described above and indicates the date and time at which the data was received.

TABLE 10

Unknown
None
Not_Applicable
Various
A-Capella
Acid
Acid_Jazz
Acid_Punk
Acoustic
African
Afropop
Alternative
AlternRock
Ambient
Atonal
Avantgarde
Ballad
Barbershop_Quartet
Baroque
Bass
Bebop
Bhangra
Big_Band
Bluegrass
Blues
Booty_Bass
Bop
Brazilian
BritPop
Cabaret
Cajun
Celtic
Chamber_Music
Chanson TABLE 10-continued Chant
Chicago_Blues
Childrens
Chinese
Choral
Chorus
Christian_Rap
Christian_Rock
Classic_Rock
Classical
Classical_Light
Club
Comedy
Computer_Music
Contemporary_Christian
Contemporary_Classical
Country
Country_And_Western
Creole
Crossover
Cult
Dance
Dance_Hall
DarkWave
Death_Metal
Delta_Blues
Disco
Dissonant
Dixieland
Dream
Drum_Solo
Dub
Duet
Early_Music
Easy_Listening
Electronic
Ethnic
Euro-House
Euro-Techno
Eurodance
Experimental
Fast_Fusion
Flamenco
Folk
Folklore
Folk-Rock
Free_Jazz
Freestyle
Fun
Funk
Fusion
Game
Gangsta
Garage
Glam_Rock
Glee_Club
Glide
Gospel
Gothic_Rock
Gothic
Gregorian_Chant
Grunge
Hard_Bop
Hard_Rock
Hardcore
Hip-Hop
House
Humour
Hymns
Illbient
Improvisatory
Indian_Classical
Indie
Industrial
Instrumental
Instrumental_Pop
Instrumental_Rock
Japanese
Jazz TABLE 10-continued Jazz-Funk
Jazz_Modern
Jazz_Traditional
Jungle
Just_Dance
Karaoke_Backing
Kids
Latin
Latin_Jazz
Listen
Lo-Fi
Lounge
March
Marching_Band
Meditative
Metal
Microtonal
Minimalism
Modal
Modern_Classical
Modern_Rock
Motown
Musical
Muzak
National_Folk
Native_American
New_Age
New_Music
New_Wave
Noise
Nostalgia
Novelty
Old_Dance
Old_School
Oldies
Opera
Operetta
Polka
Pop
Pop-Folk
Pop-Funk
Porn_Groove
Power_Ballad
Pranks
Primus
Progressive_Rock
Psychadelic
Psychedelic_Rock
Punk
R_And_B
Ragtime
Rap
Rave
Reggae
Religious
Renaissance
Retro
Revival
Rhythm_And_Blues
Rhythmic_Soul
Riot_Girl
Rock
Rock_And_Roll
Rockabilly
Romantic_Classical
Sacred
Samba
Satire
Shoegazers
ShowTunes
Sing-Along
Ska
Slow_Jam
Slow_Rock
Smooch
Soft_Rock
Sonata
Soul
Sound_Clip TABLE 10-continued SoundTrack
Southern_Rock
Space
Speech
Spirituals
StraightEdge
Surf_Rock
Swing
Symphonic
Symphonic_Rock
Symphony
Talking_Blues
Talking_Book
Tango
Techno
Techno-Industrial
Teeny-Bop
Tejano
Tex-Mex
Tin_Pan_Alley
Top_40
Trailer
Trance
Tribal
Trip-Hop
Twee_Pop
Underground
Vaudeville
Vocal
Wild
Womens_Music
World_Beat
World_Fusion
World_Pop
Zydeco
Other Genre Photo or Home Movie The Genre Photo Or Home Movie metadata category is used to store data that identifies a genre or category that may be associated with the media content. An example entity within the Genre Photo Or Home Movie metadata category has the following elements:

Value
Entry Index
Entry Tag
MSI
Date Time

The Value element stores the name of a category or genre that applies to media content that includes photos or home movies. Example photo or home movie categories are listed in Table 11, below.

The Entry Index and Entry Tag elements are described above and indicate that a metadata provider may submit multiple opinions as to the genre or category associated with the photo or home movie media content, or a composite description may indicate various opinions as to the genre or category, the opinions submitted by multiple metadata providers.

The MSI element is described above and identifies the metadata provider.

The Date Time element is described above and indicates the date and time at which the data was received.

TABLE 11

Unknown
None
Not_Applicable
Various
Vacation

TABLE 11-continued

Kids_Event
At_Home
Purchased
Famous_Art
From_Relatives
From_Friends
Other

Format

The Format metadata category is used to store data that identifies a format associated with the media content. Format can be thought of as a broad assessment of genre. In one implementation, the format metadata can be used by an EPG application to determine, for example, colors to display in association with information about the media content in an EPG grid. An example entity within the Format metadata category has the following elements:

Value
Entry Index
Entry Tag
MSI
Date Time

The Value element stores an identifier of a format associated with the media content. Example format identifiers are listed in Table 12, below.

The Entry Index and Entry Tag elements are described above and indicate that a metadata provider may submit more than one opinion as to the format associated with the media content, or a composite description may indicate various opinions as to the format, the opinions submitted by multiple metadata providers.

The MSI element is described above and identifies the metadata provider.

The Date Time element is described above and indicates the date and time at which the data was received.

TABLE 12

Unknown
None
Video_-_Unspecified_Type
Video_-_Movie_Cinema_Released
Video_-_Drama_Mini_Series_Or_TV_Movie
Video_-_SitCom
Video_-_Soap
Video_-_Sports
Video_-_Games_Or_Reality
Video_-_Talk_Show_Or_Non_SitCom_Comedy
Video_-_News_Or_Current_Affairs
Video_-_Documentary
Video_-_Kids_Or_Other_Cartoon
Video_-_How-To_Or_Educational
Video_-_Religious_Local_Access_Or_Paid
Video_-_Specials
Video_-_Other
Video_-_Amateur
Audio_-_Unspecified_Type
Audio_-_Song_Track
Audio_-_Talking_Book
Audio_-_Amateur_Recording
Audio_-_Other
Photo_-_Unspecified_Type
Photo_-_Amateur
Photo_-_Professional
Photo_-_Other
Advert
Collection_-_Unspecified_Type
Collection_-_Video
Collection_-_Audio TABLE 12-continued Collection_-_Photo
Collection_-_Other Content Descriptions 608

FIG. 10 illustrates example content description categories. Content descriptions 608 includes metadata categories that describe the media content. Example content description categories include plot one line abstract, plot long abstract, keywords, content note, availability date, and content duration.

Plot One Line Abstract

The Plot One Line Abstract metadata category is used to store a short description of the plot associated with the media content. An example entity within the Plot One Line Abstract metadata category has the following elements:

Value
Entry Index
Entry Tag
Date Time
Language

The Value element stores a one-line textual description of the plot of the media content. For example, for the Frasier episode titled, "My Coffee with Niles", the Value element may contain, "After a year in Seattle, Niles poses Frasier with a deceptively simple question: "Are you happy?" at one of their regular meetings at Cafe Nervosa."

The Entry Index and Entry Tag elements are described above and indicate that a metadata provider may submit more than one short plot description associated with the media content, or a composite description may indicate various descriptions submitted by multiple metadata providers.

The MSI element is described above and identifies the metadata provider.

The Date Time element is described above and indicates the date and time at which the data was received.

The Language element is described above and identifies the language in which the plot is described in the Value element.

Plot Long Abstract

The Plot Long Abstract metadata category is used to store a longer description of the plot associated with the media content. An example entity within the Plot Long Abstract metadata category has the following elements:

Value
Entry Index
Entry Tag
MSI
Date Time
Language

The Value element stores a textual description of the plot of the media content. For example, for the Frasier episode titled, "My Coffee with Niles", the Value element may contain, "Frasier meets Niles for a coffee at Cafe Nervosa, but they can't find a table inside the busy cafe so decide to take a table outside. Niles then poses a deceptively simple question "Are you happy?" after Frasier reminds Niles that it is a year since he moved to Seattle. However, the discussion gets repeatedly interrupted by various friends, family members, and other discussions. Finally, as the waitress who has been increasingly aggravated by Frasier's quest for the perfect cup of coffee, asks "Now are you finally happy", and Frasier says that he is."

The Entry Index and Entry Tag elements are described above and indicate that a metadata provider may submit more than one plot description associated with the media content, or a composite description may indicate various descriptions submitted by multiple metadata providers.

The MSI element is described above and identifies the metadata provider.

The Date Time element is described above and indicates the date and time at which the data was received.

The Language element is described above and identifies the language in which the plot is described in the Value element.

Keywords

The Keywords metadata category is used to store keywords associated with the media content. An example entity within the Keywords metadata category has the following elements:

Value
Entry Index
Entry Tag
MSI
Date Time
Language

The Value element stores a keyword or phrase associated with the media content. For example, for the Frasier episode titled, "My Coffee with Niles", keywords may include: coffee, happy, and "one year".

The Entry Index and Entry Tag elements are described above and indicate that a metadata provider may submit more than one keyword or phrase associated with the media content, or a composite description may indicate various keywords submitted by multiple metadata providers.

The MSI element is described above and identifies the metadata provider.

The Date Time element is described above and indicates the date and time at which the data was received.

The Language element is described above and identifies the language in which the plot is described in the Value element.

Content Note

The Content Note metadata category is used to store any other text associated with the media content. The structure and type of text is deliberately not specified in order to provide extensibility. An example entity within the Content Note metadata category has the following elements:

Value
Entry Index
Entry Tag
MSI
Date Time
Language

The Value element stores any text associated with the piece of media content that the user of the schema wants.

The Entry Index and Entry Tag elements are described above and indicate that a metadata provider may submit more than one content note associated with the media content, or a composite description may indicate various content notes submitted by multiple metadata providers.

The MSI element is described above and identifies the metadata provider.

The Date Time element is described above and indicates the date and time at which the data was received.

The Language element is described above and identifies the language in which the content note in the Value element is written.

Availability Date

The Availability Date metadata category is used to store data that indicates when the media content was or will be made available. An example entity within the Availability Date metadata category has the following elements:

Value
Entry Index
Entry Tag
MSI
Date Time

The Value element stores a character string that indicates when the media content was or will be made available. The availability date may be a specific date, such as Feb. 10, 2001, or it may be a general time period, such as Fall 1997. The availability date may also be a future date to indicate media content that is not yet available.

The Entry Index and Entry Tag elements are described above and indicate that a metadata provider may submit multiple opinions as to the availability date associated with the media content, or a composite description may indicate various opinions as to the availability date, the opinions submitted by multiple metadata providers. For example, metadata providers may have differing opinions about when the piece of media content was actually created, or the media content may be available on different dates in different geographic areas. The Entry Index element provides a way of indicating the various opinions.

The MSI element is described above and identifies the metadata provider.

The Date Time element is described above and indicates the date and time at which the data was received.

Content Duration

The Content Duration metadata category is used to store data associated with the length of the media content. An example entity within the Content Duration metadata category has the following elements:

Value
Entry Index
Entry Tag
MSI
Date Time

The Value element stores an indication of the duration of the media content. For example, a two-hour movie has a duration of two hours, or 120 minutes.

The Entry Index and Entry Tag elements are described above and indicate that a metadata provider may submit multiple opinions as to the duration of the media content, or a composite description may indicate various opinions as to the duration, the opinions submitted by multiple metadata providers. For example, metadata providers may have differing opinions about the duration of the content based on whether or not the preamble at the front end of a movie is counted.

The MSI element is described above and identifies the metadata provider.

The Date Time element is described above and indicates the date and time at which the data was received.

Popularity 610

FIG. 11 illustrates example popularity categories. Popularity 610 includes metadata categories that indicate how popular the media content is. Example popularity categories include critic reviews, popularity, and broadcast ubiquity.

Critic Reviews

The Critic Reviews metadata category is used to store data associated with a review of the media content by a critic. An example entity within the Critic Reviews metadata category has the following elements:

| | |
|---|---|
| Star Rating | Fifth Axis Meaning |
| First Axis Meaning | Review Text |
| Second Axis Rating | Reviewer |
| Second Axis Meaning | Entry Index |
| Third Axis Rating | Entry Tag |
| Third Axis Meaning | MSI |
| Fourth Axis Rating | Date Time |
| Fourth Axis Meaning | Language |
| Fifth Axis Rating | |

The Star Rating, Second Axis Rating, Third Axis Rating, Fourth Axis Rating, and Fifth Axis Rating elements each store an indicator of a rating of the media content, for example according to a rating scale. Example values may include: Unknown, None, and any integer from 1 to 10.

The First Axis Meaning, Second Axis Rating, Third Axis Rating, Fourth Axis Rating, and Fifth Axis Rating elements store indicators of the type of ratings given in the Star Rating, Second Axis Rating, Third Axis Rating, Fourth Axis Rating, and Fifth Axis Rating elements, respectively. For example, the Star Rating element may have a value of 5 and the Second Axis Rating may have a value of 10. Additionally, the First Axis Meaning element may have a value of "Overall" and the Second Axis Meaning element may have a value of "Comedy Content". This indicates that the Star Rating of 5 is an overall rating and the First Axis Rating of 10 is a rating of the comedy within the media content.

The Review Text element stores text associated with the review that is generated by a reviewer of the media content.

The Reviewer element stores the name of the media content reviewer (i.e., the person who wrote the review).

The Entry Index and Entry Tag elements are described above and indicate that a metadata provider may submit more than one review of the media content, or a composite description may indicate various reviews submitted by multiple metadata providers.

The MSI element is described above and identifies the metadata provider.

The Date Time element is described above and indicates the date and time at which the data was received.

The Language element is described above and identifies the language in which the text in the Review Text element is written.

Popularity

The Popularity metadata category is used to store data that describes how popular the media content is. An example entity within the Popularity metadata category has the following elements:

Popularity Rating
Country
Year
Entry Index
Entry Tag
MSI
Date Time

The Popularity Rating element stores an indicator of the level of popularity of the media content. Example values may include: Unknown, None, and any integer from 1 to 10.

The Country element stores a value that indicates the country associated with the popularity rating given in the Popularity Rating element. A list of possible values for populating the Country element is given in Table 9.

The Year element stores the year associated with the popularity rating given in the Popularity Rating element.

The Entry Index and Entry Tag elements are described above and indicate that a metadata provider may submit more than one opinion as to the popularity of the media content, or a composite description may indicate various opinions as to the popularity, the opinions submitted by multiple metadata providers.

The MSI element is described above and identifies the metadata provider.

The Date Time element is described above and indicates the date and time at which the data was received.

Broadcast Ubiquity

The Broadcast Ubiquity metadata category is used to store a number indicating how often a particular piece of content is broadcast. Some programs are repeated over and over (e.g., episodes of "Friends" and "The Simpsons"), whereas some programs (e.g., a documentary about a particular tribe of Indians) might only get broadcast once. An example entity within the Broadcast Ubiquity metadata category has the following elements:

Ubiquity Rating
Country
Year
Entry Index
Entry Tag
MSI
Date Time

The Ubiquity Rating element stores information about how often a particular program is broadcast. This information is useful to a user when looking through an electronic program guide to assess how important it is for the user to view a particular instance of a program. A fully automated Personal Video Recorder system may use this information to make decisions when resolving record conflicts. Example values may include: Unknown, None, and any integer from 1 to 10.

The Country element stores a value that indicates the country associated with the ubiquity rating given in the Ubiquity Rating element. A list of possible values for populating the Country element is given in Table 9.

The Year element stores the year associated with the ubiquity rating given in the Ubiquity Rating element.

The Entry Index and Entry Tag elements are described above and indicate that a metadata provider may submit more than one opinion as to the ubiquity rating of the media content, or a composite description may indicate various opinions as to the broadcast ubiquity, the opinions submitted by multiple metadata providers.

The MSI element is described above and identifies the metadata provider.

The Date Time element is described above and indicates the date and time at which the data was received.

Censor Ratings 612

FIG. 12 illustrates example censor ratings categories. Censor ratings 612 includes metadata categories that indicate censorship ratings associated with the media content. Example censor ratings categories include censor parental rating, extended censor rating adult content, extended censor rating bad language, extended censor rating violence, extended censor rating nudity, and extended censor rating drug abuse.

Censor Parental Rating

The Censor Parental Rating metadata category is used to store data identifying whether the media contains content that may be inappropriate for some individuals, such as children under a particular age. An example entity within the Censor Parental Rating metadata category has the following elements:

Censor Category
Advisory Comment
Entry Index
Entry Tag
MSI
Date Time
Language

The Censor Category element stores an indicator of whether the media contains content that may be inappropriate for some individuals. Example values for the Censor Category element are given in Table 13.

TABLE 13

Unknown
None
Suitable_For_Everyone_(U,G,TVY)
Unsuitable_For_Children_Under_10_(PG,TVY7,TVPG)
Unsuitable_For_Children_Under_13_(PG13,TV14)
Unsuitable_For_Children_Under_17_(R)
Unsuitable_For_Many_Adults_(TVMA,18,X,XXX)
Not_Rated The Advisory Comment element stores text that describes attributes of the media content that may be objectionable or inappropriate for some individuals. For example, when a rating authority rates a movie in a particular category, they may also indicate the reason for their decision, for example, excessive violence or bad language. In an increasing trend, this information is now also appearing in radio and television advertisments for movies.

The Entry Index and Entry Tag elements are described above and indicate that a metadata provider may submit more than one censor parental rating of the media content, or a composite description may indicate various opinions as to the censor parental rating, the opinions submitted by multiple metadata providers. For example, different censor ratings may be applied to the same media content across different countries.

The MSI element is described above and identifies the metadata provider.

The Date Time element is described above and indicates the date and time at which the data was received.

The Language element is described above and identifies the language in which the text in the Advisory Comment element is written.

Extended Censor Rating Adult Content

The Extended Censor Rating Adult Content metadata category is used to store data that indicates the degree to which the media content contains adult content. An example entity within the Extended Censor Rating Adult Content metadata category has the following elements:
Value
Entry Index
Entry Tag
MSI
Date Time The Value element stores an indicator of the degree of adult content found in the media content. Example indicators may include: Unknown, None, Brief, Significant, and Extreme.

The Entry Index and Entry Tag elements are described above and indicate that a metadata provider may submit more than one opinion as to the degree of adult content found in the media content, or a composite description may indicate various opinions as to the degree of adult content, the opinions submitted by multiple metadata providers. For example, different extended censor ratings may be applied to the same media content across different countries.

The MSI element is described above and identifies the metadata provider.

The Date Time element is described above and indicates the date and time at which the data was received.

Extended Censor Rating Bad Language

The Extended Censor Rating Bad Language metadata category is used to store data that indicates the degree to which the media content contains bad language. An example entity within the Extended Censor Rating Bad Language metadata category has the following elements:
Value
Entry Index
Entry Tag
MSI
Date Time The Value element stores an indicator of the degree of bad language found in the media content. Example indicators may include: Unknown, None, Brief, Significant, and Extreme.

The Entry Index and Entry Tag elements are described above and indicate that a metadata provider may submit more than one opinion as to the degree of bad language found in the media content, or a composite description may indicate various opinions as to the degree of bad language, the opinions submitted by multiple metadata providers. For example, different extended censor ratings may be applied to the same media content across different countries.

The MSI element is described above and identifies the metadata provider.

The Date Time element is described above and indicates the date and time at which the data was received.

Extended Censor Rating Violence

The Extended Censor Rating Violence metadata category is used to store data that indicates the degree to which the media content contains violence. An example entity within the Extended Censor Rating Violence metadata category has the following elements:
Value
Entry Index
Entry Tag
MSI
Date Time The Value element stores an indicator of the degree of violence found in the media content. Example indicators may include: Unknown, None, Brief, Significant, and Extreme.

The Entry Index and Entry Tag elements are described above and indicate that a metadata provider may submit more than one opinion as to the degree of violence found in the media content, or a composite description may indicate various opinions as to the degree of violence, the opinions submitted by multiple metadata providers. For example, different extended censor ratings may be applied to the same media content across different countries.

The MSI element is described above and identifies the metadata provider.

The Date Time element is described above and indicates the date and time at which the data was received.

Extended Censor Rating Nudity

The Extended Censor Rating Nudity metadata category is used to store data that indicates the degree to which the media content contains nudity. An example entity within the Extended Censor Rating Nudity metadata category has the following elements:

Value
Entry Index
Entry Tag
MSI
Date Time

The Value element stores an indicator of the degree of nudity found in the media content. Example indicators may include: Unknown, None, Brief, Significant, and Extreme.

The Entry Index and Entry Tag elements are described above and indicate that a metadata provider may submit more than one opinion as to the degree of nudity found in the media content, or a composite description may indicate various opinions as to the degree of nudity, the opinions submitted by multiple metadata providers. For example, different extended censor ratings may be applied to the same media content across different countries.

The MSI element is described above and identifies the metadata provider.

The Date Time element is described above and indicates the date and time at which the data was received.

Extended Censor Rating Drug Abuse

The Extended Censor Rating Drug Abuse metadata category is used to store data that indicates the degree to which the media content portrays drug abuse. An example entity within the Extended Censor Rating Drug Abuse metadata category has the following elements:
Value
Entry Index
Entry Tag
MSI
Date Time The Value element stores an indicator of the degree of drug abuse portrayed in the media content. Example indicators may include: Unknown, None, Brief, Significant, and Extreme.

The Entry Index and Entry Tag elements are described above and indicate that a metadata provider may submit more than one opinion as to the degree of drug abuse found in the media content, or a composite description may indicate various opinions as to the degree of drug abuse, the opinions submitted by multiple metadata providers. For example, different extended censor ratings may be applied to the same media content across different countries.

The MSI element is described above and identifies the metadata provider.

The Date Time element is described above and indicates the date and time at which the data was received.

Technical Details 614

FIG. 13 illustrates example technical details categories. Technical details 614 includes metadata categories that indicate technical details associated with the media content or the production or capture of the media content. Example technical details categories include capture mechanism, image capture resolution, video capture temporal rate Hz, video captured using interlace, sound capture sampling, sound capture compression, camera used, image capture compression, recorded live, black and white, silent, post production processing, special electronic processing, aspect ratio, aspect ratio implementation, pan and scan vectors, origination note, stereo sound, and surround sound.

Capture Mechanism

The Capture Mechanism metadata category is used to store data that identifies how the media content was captured. An example entity within the Capture Mechanism metadata category has the following elements:
Value
Entry Index
Entry Tag
MSI
Date Time The Value element stores an indicator of the mechanism used to capture the media content. Example capture mechanism indicators are given in Table 14.

TABLE 14

Unknown
Film_Bigger_Than_35mm
35mm_Film
16mm_Film
Video_Camera
Analog_Audio
Digital_Audio
Other The Entry Index and Entry Tag elements are described above and indicate that a metadata provider may submit more than one opinion as to the mechanism used to capture the media content. This may indicate that portions of the media content were captured using different capture mechanisms. In a composite description the Entry Index and Entry Tag elements may indicate various opinions as to the capture mechanism, the opinions submitted by multiple metadata providers The MSI element is described above and identifies the metadata provider.

The Date Time element is described above and indicates the date and time at which the data was received.

Image Capture Resolution

The Image Capture Resolution metadata category is used to store data that indicates the resolution of the originally captured media content image. An example entity within the Image Capture Resolution metadata category has the following elements:
Horizontal
Vertical
Entry Index
Entry Tag
MSI
Date Time The Horizontal element stores a positive integer that represents the horizontal resolution of the originally captured media content image.

The Vertical element stores a positive integer that represents the vertical resolution of the originally captured media content image.

The Entry Index and Entry Tag elements are described above and indicate that a metadata provider may submit more than one opinion as to the capture resolution of the media content, or a composite description may indicate various opinions as to the capture resolution, the opinions submitted by multiple metadata providers. For example, if some areas of a camera's sensor are marked off, metadata providers may have different opinions of what capture resolution is associated with the media content.

The MSI element is described above and identifies the metadata provider.

The Date Time element is described above and indicates the date and time at which the data was received.

Video Capture Temporal Rate Hz

The Video Capture Temporal Rate Hz metadata category is used to store data that indicates how often the original scene was captured by the camera. For example, a film camera runs at a rate of 24 captures per second, whereas a video camera captures at a rate of 60 samples per second. An example entity within the Video Capture Temporal Rate Hz metadata category has the following elements:
Value
Entry Index
Entry Tag
MSI
Date Time The Value element stores the frequency at which the camera captured the scene, such as how many times a second it took a picture of the actors to form the video signal.

The Entry Index and Entry Tag elements are described above and indicate that a metadata provider may submit more than one opinion as to the temporal rate at which the video was captured, or a composite description may indicate various opinions as to the temporal rate, the opinions submitted by multiple metadata providers.

The MSI element is described above and identifies the metadata provider.

The Date Time element is described above and indicates the date and time at which the data was received.

Video Captured Using Interlace

The Video Captured Using Interlace metadata category is used to store data that indicates whether the media content was captured using interlace. Interlace is a scanning technique used by some cameras in which the camera only captures half the resolution of the scene at each temporal sample point, but does it at a temporal rate that is typically twice what it could handle if it was capturing the full resolution at each temporal sample point. Capturing with interlace has many negative implications through the video delivery chain. Information about whether the original scene was captured using interlace or whether it was changed to interlace later is helpful in reducing the negative effects of interlace. An example entity within the Video Captured Using Interlace metadata category has the following elements:
Value
Entry Index
Entry Tag
MSI
Date Time The Value element stores an indicator of whether or not the media content was captured using interlace. Example values may include: Unknown, True, and False.

The Entry Index and Entry Tag elements are described above and indicate that a metadata provider may submit more than one opinion as to whether the media content was captured using interlace, or a composite description may indicate various opinions as to whether or not the media content was captured using interlace, the opinions submitted by multiple metadata providers. This allows for differing opinions among metadata providers as to whether or not the media content was captured using interlace.

The MSI element is described above and identifies the metadata provider.

The Date Time element is described above and indicates the date and time at which the data was received.

Sound Capture Sampling

The Sound Capture Sampling metadata category is used to store data that indicates technical details describing how sound was captured in association with the media content. An example entity within the Sound Capture Sampling metadata category has the following elements:
Sample Rate KHz
Bits Per Sample
Number Of Channels
Entry Index
Entry Tag
MSI
Date Time The Sample Rate KHz element stores the fequency at which the analog audio waveform was sampled to make the digital respresentation.

The Bits Per Sample element specifys the number of bits used in the analog to digital converter used to convert the analog waveform into the digital representation.

The Number Of Channels element specifies the number of audio channels that were captured. Stereo sound is 2 channels whereas surround sound is typically 6 channels or more.

The Entry Index and Entry Tag elements are described above and indicate that a metadata provider may submit more than one opinion relating to sound capture sampling, or a composite description may indicate various opinions relating to sound capture sampling, the opinions submitted by multiple metadata providers.

The MSI element is described above and identifies the metadata provider.

The Date Time element is described above and indicates the date and time at which the data was received.

Sound Capture Compression

The Sound Capture Compression metadata category is used to store data that indicates the type of compression utilized when capturing the sound associated with the media content. An example entity within the Sound Capture Compression metadata category has the following elements:
Type
Ratio
Entry Index
Entry Tag
MSI
Date Time The Type element stores an indicator of the type of compression used.

Example values may include: Unknown, None, MP3, WindowsMedia, Real, and Other.

The Ratio element stores a number that indicates the level of compression.

The Entry Index and Entry Tag elements are described above and indicate that a metadata provider may submit more than one opinion as to the sound compression type associated with the capture of the media content, or a composite description may indicate various opinions as to the sound compression type, the opinions submitted by multiple metadata providers.

The MSI element is described above and identifies the metadata provider.

The Date Time element is described above and indicates the date and time at which the data was received.

Camera Used

The Camera Used metadata category is used to store data that indicates the type of camera used to capture the media content. An example entity within the Camera Used metadata category has the following elements:
Value
Entry Index
Entry Tag
MSI
Date Time The Value element stores a name or description of the camera used to capture the media content.

The Entry Index and Entry Tag elements are described above and indicate that a metadata provider may submit data that indicates that more than one type of camera was used to capture the media content or the metadata provider may submit multiple opionions as to the type of camera used. In a composite description, the Entry Index and Entry Tag elements may differentiate between various opinions as to the camera used, the opinions submitted by multiple metadata providers.

The MSI element is described above and identifies the metadata provider.

The Date Time element is described above and indicates the date and time at which the data was received.

Image Capture Compression

The Image Capture Compression metadata category is used to store data that indicates how one or more images associated with the media content were compressed upon capture. An example entity within the Image Capture Compression metadata category has the following elements:
Type
Ratio
Entry Index
Entry Tag
MSI
Date Time The Type element stores an indicator of the type of image compression used. Example types of image compression are given in Table 15.

TABLE 15

| Unknown |
| None |
| JPEG |
| JPEG2000 |
| DV |
| MPEG1 |
| MPEG2 |
| MPEG4 |
| WindowsMedia |
| Real |
| Other |

The Ratio element stores a number that indicates the level of compression.

The Entry Index and Entry Tag elements are described above and indicate that a metadata provider may submit more than one opinion as to the image compression type associated with the capture of the media content, or a composite description may indicate various opinions as to the image compression type, the opinions submitted by multiple metadata providers.

The MSI element is described above and identifies the metadata provider.

The Date Time element is described above and indicates the date and time at which the data was received.

Recorded Live

The Recorded Live metadata category is used to store an indicator of whether or not the media content was recorded live. Media content that was recoded live may include a music album that consists of a recording generated at a concert. An example entity within the Recorded Live metadata category has the following elements:
Value
Entry Index
Entry Tag
MSI
Date Time The Value element stores an indicator of whether or not the media content was recorded live. Example values may include: Unknown, True, and False.

The Entry Index and Entry Tag elements are described above and indicate that a metadata provider may submit more than one opinion as to whether the media content was recorded live, or a composite description may indicate various opinions as to the whether the media content was recorded live, the opinions submitted by multiple metadata providers.

The MSI element is described above and identifies the metadata provider.

The Date Time element is described above and indicates the date and time at which the data was received.

Black And White

The Black And White metadata category is used to store an indicator of whether or not the media content is black and white. An example entity within the Black And White metadata category has the following elements:
Value
Entry Index
Entry Tag
MSI
Date Time The Value element stores an indicator of whether or not the media content is black and white. Example values may include: Unknown, True, and False.

The Entry Index and Entry Tag elements are described above and indicate that a metadata provider may submit more than one opinion as to whether the media content is black and white, or a composite description may indicate various opinions as to whether the media content is black and white, the opinions submitted by multiple metadata providers.

The MSI element is described above and identifies the metadata provider.

The Date Time element is described above and indicates the date and time at which the data was received.

Silent

The Silent metadata category is used to store an indicator of whether the media content is silent, such as a silent movie. An example entity within the Silent metadata category has the following elements:
Value
Entry Index
Entry Tag
MSI
Date Time The Value element stores an indicator of whether or not the media content is silent. Example values may include: Unknown, True, and False.

The Entry Index and Entry Tag elements are described above and indicate that a metadata provider may submit more than one opinion as to whether the media content is silent, or a composite description may indicate various opinions as to whether the media content is silent, the opinions submitted by multiple metadata providers.

The MSI element is described above and identifies the metadata provider.

The Date Time element is described above and indicates the date and time at which the data was received.

Post Production Processing

The Post Production Processing metadata category is used to store data that indicates the degree to which post production processing was performed on the media content. An example entity within the Post Production Processing metadata category has the following elements:
Value
Entry Index
Entry Tag
MSI
Date Time The Value element stores an indicator of the degree to which post production processing was performed on the media content. Example values are given in Table 16.

TABLE 16

Unknown
Live
Recorded_Live
Some_Post_Production
Extensive_Post_Production
Other

The Entry Index and Entry Tag elements are described above and indicate that a metadata provider may submit more than one opinion as to the degree of post production processing performed on the media content, or a composite description may indicate various opinions as to the degree of post production processing, the opinions submitted by multiple metadata providers.

The MSI element is described above and identifies the metadata provider.

The Date Time element is described above and indicates the date and time at which the data was received.

Special Electronic Processing

The Special Electronic Processing metadata category is used to store data that indicates a type of special electronic processing that was performed on the media content. An example entity within the Special Electronic Processing metadata category has the following elements:

Value
Entry Index
Entry Tag
MSI
Date Time

The Value element stores an indicator of a type of special electronic processing that was performed on the media content. Example types of special electronic processing are listed in Table 17.

TABLE 17

Unknown
None
Digitally_Remastered
Noise_Filtered
Upconverted
Other

The Entry Index and Entry Tag elements are described above and indicate that a metadata provider may submit more than one indicator of special electronic processing performed on the media content, or a composite description may indicate various opinions as to the special electronic processing performed, the opinions submitted by multiple metadata providers.

The MSI element is described above and identifies the metadata provider.

The Date Time element is described above and indicates the date and time at which the data was received.

Aspect Ratio

The Aspect Ratio metadata category is used to store data that indicates the ratio of the height compared with the width of the video. Content made for television is typically 3 units high for every 4 units wide, whereas movies typically have a much wider aspect ratio. An example entity within the Aspect Ratio metadata category has the following elements:

Value
Entry Index
Entry Tag
MSI
Date Time

The Value element stores the ratio of the width of the video content (measured in pixels) compared to the height of the video content (also measured in pixels).

The Entry Index and Entry Tag elements are described above and indicate that a metadata provider may submit more than one opinion of what the aspect ratio of the media content is, or a composite description may indicate various opinions as to the aspect ratio, the opinions submitted by multiple metadata providers.

The MSI element is described above and identifies the metadata provider.

The Date Time element is described above and indicates the date and time at which the data was received.

Aspect Ratio Implementation

The Aspect Ratio Implementation metadata category is used to store data that indicates how the actual aspect ratio was conveyed in the video transport mechanism. Sometimes it is necessary to compress the number of pixels in a particular dimension in order for the media content to fit within the rigid specifications of a transport mechanism, such as a television broadcast system or a DVD. An example entity within the Aspect Ratio Implementation metadata category has the following elements:

Value
Entry Index
Entry Tag
MSI
Date Time

The Value element stores an indicator of the aspect ratio implementation used. Example values are given in Table 18.

TABLE 18

Unknown
None
Native
Letterboxed_In_1.33
Letterboxed_In_1.78
Anamorphically_Squeezed
Horizontally_Oversampled
Other The Entry Index and Entry Tag elements are described above and indicate that a metadata provider may submit more than one opinion of what aspect ratio implementation was used, or a composite description may indicate various opinions as to the aspect ratio implementation, the opinions submitted by multiple metadata providers.

The MSI element is described above and identifies the metadata provider.

The Date Time element is described above and indicates the date and time at which the data was received.

Pan And Scan Vectors

The Pan And Scan Vectors metadata category is used to store data that indicates whether the media content has pan and scan vectors available with the content. Pan and scan vectors provide a mechanism for selecting a 4:3 aspect ratio image from a much wider film image. For example, a movie with a wide aspect ratio does not fit the aspect ratio available on a standard television. In a simple case if the action is more on the left of the film frame then the vectors would indicate that the 4:3 image is to be extracted from the left of the film frame. As the action appears more on the right side of the film frame, the vectors would indicate that the 4:3 television frame should be extracted from the right of the film frame. An example entity within the Pan And Scan Vectors metadata category has the following elements:
Value
Entry Index
Entry Tag
MSI
Date Time The Value element stores an indicator of whether or not the media content has pan and scan vectors available. Example values may include: Unknown, True, and False.

The Entry Index and Entry Tag elements are described above and indicate that a metadata provider may submit more than one opinion as to whether the media content has pan and scan vectors available, or a composite description may indicate various opinions as to the availability of pan and scan vectors, the opinions submitted by multiple metadata providers.

The MSI element is described above and identifies the metadata provider.

The Date Time element is described above and indicates the date and time at which the data was received.

Origination Note

The Origination Note metadata category is used to store any additional information about the technical details of the media origination process. This category is deliberately unstructured to allow for extensibility. An example entity within the Origination Note metadata category has the following elements:
Value
Entry Index
Entry Tag
MSI
Date Time
Language The Value element stores any additional information about the media origination process.

The Entry Index and Entry Tag elements are described above and indicate that a metadata provider may submit more than one origination note associated with the media content, or a composite description may indicate various origination notes submitted by multiple metadata providers.

The MSI element is described above and identifies the metadata provider.

The Date Time element is described above and indicates the date and time at which the data was received.

The Language element is described above and identifies the language in which the text in the Value element is written.

Stereo Sound

The Stereo Sound metadata category is used to store data indicating whether the media content includes stereo sound. An example entity within the Stereo Sound metadata category has the following elements:
Value
Entry Index
Entry Tag
MSI
Date Time The Value element stores an indicator of whether or not the media content includes stereo sound. Example values may include: Unknown, True, and False.

The Entry Index and Entry Tag elements are described above and indicate that a metadata provider may submit more than one opinion as to whether the media content includes stereo sound, or a composite description may indicate various opinions as to the inclusion of stereo sound, the opinions submitted by multiple metadata providers.

The MSI element is described above and identifies the metadata provider.

The Date Time element is described above and indicates the date and time at which the data was received.

Surround Sound

The Surround Sound metadata category is used to store data indicating whether the media content is encoded to support surround sound. An example entity within the Surround Sound metadata category has the following elements:
Encoding Method
Number Of Channels
Mix Notes
Entry Index
Entry Tag
MSI
Date Time
Language The Encoding Method element stores a value that indicates the method used to encode the media content to support surround sound. Example indicators of surround sound encoding methods are given in Table 19.

TABLE 19

Unknown
None
Dolby_Surround
Dolby_Pro-Logic
Dolby_Pro-Logic_with_THX
AC-3_-_Dolby_Digital_AC-3
DTS_-_Digital_Theatre_Sound
SDDS_-_Sony_Dynamic_Digital_Sound
MLP_-_Meridian_Lossless_Packing
Other The Number Of Channels element specifies the number of channels used to create the surround sound effect. Some systems use 6 channels whereas others use 8 channels.

The Mix Notes element specifies the technical details as to how the surround sound effect was mixed together to achieve the desired result for the listener.

The Entry Index and Entry Tag elements are described above and indicate that a metadata provider may submit data indicating that more than one surround sound encoding method was used in association with the media content, or a composite description may indicate various opinions as to the surround sound encoding method, the opinions submitted by multiple metadata providers.

The MSI element is described above and identifies the metadata provider.

The Date Time element is described above and indicates the date and time at which the data was received.

The Language element is described above and identifies the language in which the text in the Mix Notes element is written.

Production Details 616

FIG. 14 illustrates example production details categories. Production details 616 includes metadata categories related to the production of the media content. Example production details categories include made for, budget, box office, production company, distribution company, principal country of main production company, capture location, copyright, and URL production company.

Made For

The Made For metadata category is used to store data that identifies the purpose for which the media content was created. An example entity within the Made For metadata category has the following elements:

Value
Entry Index
Entry Tag
MSI
Date Time

The Value element stores an indicator of the purpose for which the media content was created. Example values may include: Unknown, TV, Cinema, Internet, Amateur_Use, Military, and Other.

The Entry Index and Entry Tag elements are described above and indicate that a metadata provider may submit data indicating more than one purpose for creation associated with the media content, or a composite description may indicate various opinions as to who or what the media content was made for, the opinions submitted by multiple metadata providers.

The MSI element is described above and identifies the metadata provider.

The Date Time element is described above and indicates the date and time at which the data was received.

Budget

The Budget metadata category is used to store data that indicates the media content creation budget. An example entity within the Budget metadata category has the following elements:

Value
Entry Index
Entry Tag
MSI
Date Time

The Value element stores an indicator of the budget used in creating the media content. Example values may include: Unknown, Amateur, Low, Medium, and High.

The Entry Index and Entry Tag elements are described above and indicate that a metadata provider may submit data indicating that more than one opinion as to the budget associated with the media content, or a composite description may indicate various opinions as to the budget, the opinions submitted by multiple metadata providers.

The MSI element is described above and identifies the metadata provider.

The Date Time element is described above and indicates the date and time at which the data was received.

Box Office

The Box Office metadata category is used to store data indicating the box office income generated by the media content. An example entity within the Box Office metadata category has the following elements:

USAOpeningWeekendCinemaMillionDollars
USATotalGrossCinemaMillionDollars
WorldwideTotalGrossCinemaMillionDollars
Comment
Entry Index
Entry Tag
MSI
Date Time The USAOpeningWeekendCinemaMillionDollars element stores an integer number indicating how many millions of dollars the media content generated during the first weekend it was available in theaters in the United States.

The USATotalGrossCinemaMillionDollars element stores an integer number indicating how many millions of dollars the media content generated while it was available in theaters in the United States.

The WorldwideTotalGrossCinemaMillionDollars element stores an integer number indicating how many millions of dollars the media content generated while it was available in theaters throughout the world.

The Comment element may be used to store any additional details as to how the figure was arrived at. For example, the figure may only included specific geographic areas.

The Entry Index and Entry Tag elements are described above and indicate that a metadata provider may submit multiple opinions as to the box office monetary success of the media content, or a composite description may indicate various opinions as to the box office success, the opinions submitted by multiple metadata providers.

The MSI element is described above and identifies the metadata provider.

The Date Time element is described above and indicates the date and time at which the data was received.

Production Company

The Production Company metadata category is used to store data that identifies a production company that produced the media content. An example entity within the Production Company metadata category has the following elements:

Value
Entry Index
Entry Tag
MSI
Date Time

The Value element stores the name of a production company associated with the media content.

The Entry Index and Entry Tag elements are described above and indicate that a metadata provider may submit data identifying a plurality of production companies associated with the media content, or a composite description may indicate various opinions as to the production company, the opinions submitted by multiple metadata providers.

The MSI element is described above and identifies the metadata provider.

The Date Time element is described above and indicates the date and time at which the data was received.

Distribution Company

The Distribution Company metadata category is used to store data that identifies a distribution company that is associated with the media content. An example entity within the Distribution Company metadata category has the following elements:

Company Name
Geographic Area
Distribution Medium
Entry Index
Entry Tag
MSI
Date Time The Company Name element stores the name of a distribution company associated with the media content.

The Geographic Area element stores text that identifies the geographic area that the particular distribution company is responsible for.

The Distribution Medium element stores text that identifies the medium through which the distribution company distributes the media content. For example, distribution mediums may include: CD, DVD, video cassette, broadcast rights, pay per view, and internet streaming rights.

The Entry Index and Entry Tag elements are described above and indicate that a metadata provider may submit data indicating more than one distribution company associated with the media content, or a composite description may indicate various opinions as to the distribution company, the opinions submitted by multiple metadata providers.

The MSI element is described above and identifies the metadata provider.

The Date Time element is described above and indicates the date and time at which the data was received.

Principal Country of Main Production Company

The Principal Country Of Main Production Company metadata category is used to store data identifying the principal country with which the main production company associates. An example entity within the Principal Country Of Main Production Company metadata category has the following elements:
Value
Entry Index
Entry Tag
MSI
Date Time The Value element stores a value that indicates the country with which the main production company is associated. A list of possible values for indicating the country is given in Table 9.

The Entry Index and Entry Tag elements are described above and indicate that a metadata provider may submit data indicating that the main production company is associated with more than one country, or a composite description may indicate various opinions as to the country associated with the main production company, the opinions submitted by multiple metadata providers.

The MSI element is described above and identifies the metadata provider.

The Date Time element is described above and indicates the date and time at which the data was received.

Capture Location

The Capture Location metadata category is used to store data identifying where the media content was captured. An example entity within the Capture Location metadata category has the following elements:
Country
State
City
Capture Location Detail
Entry Index
Entry Tag
MSI
Date Time
Language The Country element stores a value that indicates the country in which the media content was captured. A list of possible values for populating the Country element is given in Table 9.

The State element stores a value that indicates the state in which the media content was captured. The value may be the name of a state, such as "Washington", or an abbreviation associated with the state, such as "WA".

The City element stores the name of the city in which the media content was captured.

The Capture Location Detail element is used to store additional details that describe the location where the media content was captured. If the movie was filmed on location, the Capture Location Detail element may contain the value, "Alcatraz Island in the middle of San Francisco Bay," in a Capture Location element associated with the movie, "Escape from Alcatraz".

The Entry Index and Entry Tag elements are described above and indicate that a metadata provider may submit data indicating more than one location at which the media content was captured, or a composite description may indicate various opinions as to the capture location, the opinions submitted by multiple metadata providers.

The MSI element is described above and identifies the metadata provider.

The Date Time element is described above and indicates the date and time at which the data was received.

The Language element is described above and identifies the language in which the text in the Capture Location Detail element is written.

Copyright

The Copyright metadata category is used to store data indicating copyright information associated with the media content. An example entity within the Copyright metadata category has the following elements:
Owner
Year
Entry Index
Entry Tag
MSI
Date Time The Owner element stores the name of the copyright owner.

The Year element stores the number representing the year associated with the copyright.

The Entry Index and Entry Tag elements are described above and indicate that a metadata provider may submit data indicating more than one copyright associated with the media content, or a composite description may indicate various opinions as to the copyright details, the opinions submitted by multiple metadata providers.

The MSI element is described above and identifies the metadata provider.

The Date Time element is described above and indicates the date and time at which the data was received.

URL Production Company

The URL Production Company metadata category is used to store the address of a website associated with a production company that is associated with the media content. An example entity within the URL Production Company metadata category has the following elements:
Value
Entry Index
Entry Tag
MSI
Date Time The Value element stores the production company's website address.

The Entry Index and Entry Tag elements are described above and indicate that a metadata provider may submit data identifying more than one website associated with a production company that is associated with the media content, or a composite description may indicate various opinions as to the URL, the opinions submitted by multiple metadata providers.

The MSI element is described above and identifies the metadata provider.

The Date Time element is described above and indicates the date and time at which the data was received.

Enhancements 618

FIG. 15 illustrates example enhancements categories. Enhancements 618 includes metadata categories describing post-production enhancements to the media content. Example enhancements metadata categories include ATVEF data enhancement, educational commands, educational informational enhancements, multiple camera angles, multiple story lines, phone in, URL enhancements, URL more info, associated phone number, associated teletext page number, and VCR programming code.

ATVEF Data Enhancement

The ATVEF Data Enhancement metadata category is used to store data indicating whether ATVEF data enhancement has been applied to the media content. ATVEF is an acroym for the Advanced Television Enhancement Forum. The ATVEF enhancement mechanism allows video content to be annotated with extra information. For example, an interactive button may be embedded, that when selected, causes additional information about an actress to be displayed on the screen. Another enhancement may provide a mechanism that allows a viewer to purchase the same dress that an actress is wearing. An example entity within the ATVEF Data Enhancement metadata category has the following elements:

Value
Entry Index
Entry Tag
MSI
Date Time

The Value element stores an indicator of whether or not ATVEF data enhancement has been applied to the media content. Example values may include: Unknown, True, and False.

The Entry Index and Entry Tag elements are described above and indicate that a metadata provider may submit more than one opinion as to whether or not ATVEF data enhancement has been applied to the media content, or a composite description may indicate various opinions as to whether or not ATVEF data enhancement has been applied, the opinions submitted by multiple metadata providers.

The MSI element is described above and identifies the metadata provider.

The Date Time element is described above and indicates the date and time at which the data was received.

Educational Commands

The Educational Commands metadata category is used to store data indicating whether educational commands have been added to the media content. Educational commands are implemented similarly to ATVEF enhancements and are used to add educational information to video content. An example entity within the Educational Commands metadata category has the following elements:

Value
Entry Index
Entry Tag
MSI
Date Time

The Value element stores an indicator of whether educational commands have been added to the media content. Example values may include: Unknown, True, and False.

The Entry Index and Entry Tag elements are described above and indicate that a metadata provider may submit more than one opinion as to whether educational commands have been added to the media content, or a composite description may indicate various opinions as to whether educational commands have been added, the opinions submitted by multiple metadata providers.

The MSI element is described above and identifies the metadata provider.

The Date Time element is described above and indicates the date and time at which the data was received.

Educational Informational Enhancements

The Educational Informational Enhancements metadata category is used to store data indicating whether educational informational enhancements have been added to the media content. As with ATVEF enhancements and educational commands, educational informational enhancements are textual enhancements to video content. An example entity within the Educational Informational Enhancements metadata category has the following elements:

Value
Entry Index
Entry Tag
MSI
Date Time

The Value element stores an indicator of whether educational informational enhancements have been added to the media content. Example values may include: Unknown, True, and False.

The Entry Index and Entry Tag elements are described above and indicate that a metadata provider may submit more than one opinion as to whether educational informational enhancements have been added to the media content, or a composite description may indicate various opinions as to whether educational informational enhancements have been added, the opinions submitted by multiple metadata providers.

The MSI element is described above and identifies the metadata provider.

The Date Time element is described above and indicates the date and time at which the data was received.

Multiple Camera Angles

The Multiple Camera Angles metadata category is used to store data indicating whether the media content includes multiple camera angles. An example entity within the Multiple Camera Angles metadata category has the following elements:

Value
Entry Index
Entry Tag
MSI
Date Time

The Value element stores an indicator of whether the media content includes multiple camera angles. Example values may include: Unknown, True, and False.

The Entry Index and Entry Tag elements are described above and indicate that a metadata provider may submit more than one opinion as to whether the media content contains multiple camera angles, or a composite description may indicate various opinions regarding multiple camera angles, the opinions submitted by multiple metadata providers.

The MSI element is described above and identifies the metadata provider.

The Date Time element is described above and indicates the date and time at which the data was received.

Multiple Story Lines

The Multiple Story Lines metadata category is used to store data indicating whether the media content includes multiple story lines. An example entity within the Multiple Story Lines metadata category has the following elements:

Value
Entry Index
Entry Tag
MSI
Date Time

The Value element stores an indicator of whether the media content includes multiple story lines. Example values may include: Unknown, True, and False.

The Entry Index and Entry Tag elements are described above and indicate that a metadata provider may submit more than one opinion as to whether the media content includes multiple story lines, or a composite description may indicate various opinions regarding multiple story lines, the opinions submitted by multiple metadata providers.

The MSI element is described above and identifies the metadata provider.

The Date Time element is described above and indicates the date and time at which the data was received.

Phone In

The Phone In metadata category is used to store data that indicates whether the audience is invited to phone in to the TV station to participate in the program. Viewers may be able to phone in to place a vote or they may be invited to give their opinion about something, live on air. An example entity within the Phone In metadata category has the following elements:

Value
Entry Index
Entry Tag
MSI
Date Time

The Value element stores an indicator of whether the audience is invited to phone in to the TV station during the program. Example values may include: Unknown, True, and False.

The Entry Index and Entry Tag elements are described above and provide a mechanism for a metadata provider to submit multiple opinions as to the whether or not audience phone in is supported, or a composite description may indicate various opinions as to phone in support, the opinions submitted by multiple metadata providers.

The MSI element is described above and identifies the metadata provider.

The Date Time element is described above and indicates the date and time at which the data was received.

URL Enhancements

The URL Enhancements metadata category is used to store web links assoiciated with the media content. If the user goes to the indicated web site then they will find information that is relevant to the piece of media content, such as a television program. An example entity within the URL Enhancements metadata category has the following elements:

Value
Entry Index
Entry Tag
MSI
Date Time

The Value element stores URLs that are associated with the media content.

The Entry Index and Entry Tag elements are described above and indicate that a metadata provider may submit more than one associated URL, or a composite description may indicate various URLs submitted by multiple metadata providers.

The MSI element is described above and identifies the metadata provider.

The Date Time element is described above and indicates the date and time at which the data was received.

URL More Info

The URL More Info metadata category is used to store additional URLs that are associated with the media content. An example entity within the URL More Info metadata category has the following elements:

Value
Entry Index
Entry Tag
MSI
Date Time

The Value element stores an additional assocaiated URL.

The Entry Index and Entry Tag elements are described above and indicate that a metadata provider may submit more than one additional associated URL, or a composite description may indicate various URLs submitted by multiple metadata providers.

The MSI element is described above and identifies the metadata provider.

The Date Time element is described above and indicates the date and time at which the data was received.

Associated Phone Number

The Associated Phone Number metadata category is used to store a phone number associated with the media content. An example entity within the Associated Phone Number metadata category has the following elements:

Value
Entry Index
Entry Tag
MSI
Date Time

The Value element stores a phone number associated with the media content. For example, a televised telethon may have one or more phone numbers that views can call to pledge money in response to the telethon.

The Entry Index and Entry Tag elements are described above and indicate that a metadata provider may submit more than one phone number associated with the media content, or a composite description may indicate various phone numbers submitted by multiple metadata providers.

The MSI element is described above and identifies the metadata provider.

The Date Time element is described above and indicates the date and time at which the data was received.

Associated Teletext Page Number

The Associated Teletext Page Number metadata category is used to store the page number of a teletext page associated with the media content. An example entity within the Associated Teletext Page Number metadata category has the following elements:

Value
Entry Index
Entry Tag
MSI
Date Time

The Value element stores an integer that corresponds to a teletext page number associated with the media content.

The Entry Index and Entry Tag elements are described above and indicate that a metadata provider may submit more than one teletext page associated with the media content, or a composite description may indicate various teletext page numbers submitted by multiple metadata providers.

The MSI element is described above and identifies the metadata provider.

The Date Time element is described above and indicates the date and time at which the data was received.

VCR Programming Code

The VCR Programming Code metadata category is used to store data indicating a code that may be used to program a VCR to record the media content. An example entity within the VCR Programming Code metadata category has the following elements:

Value
Entry Index
Entry Tag

MSI

Date Time

The Value element stores a VCR programming code associated with the media content.

The Entry Index and Entry Tag elements are described above and indicate that a metadata provider may submit more than one VCR programming code associated with the media content, or a composite description may indicate various VCR programming codes submitted by multiple metadata providers.

The MSI element is described above and identifies the metadata provider.

The Date Time element is described above and indicates the date and time at which the data was received.

Language Data 620

FIG. 16 illustrates example language data categories. Language data 620 includes metadata categories indicating languages associated with the media content. Example language data categories include language primary original, language segment original, language dub, language audio track, language text burnt in, language text track, language description track, and sign language track.

Language Primary Original

The Language Primary Original metadata category is used to store data that indicates the primary language of the media content in its original form. An example entity within the Language Primary Original metadata category has the following elements:

Value

Entry Index

Entry Tag

MSI

Date Time

The Value element stores an indicator of the primary original language associated with the media content. Example values for populating the element are given in Table 1.

The Entry Index and Entry Tag elements are described above and indicate that a metadata provider may submit data indicating more than one primary original language associated with the media content, or a composite description may indicate various opinions as to the primary original language, the opinions submitted by multiple metadata providers.

The MSI element is described above and identifies the metadata provider.

The Date Time element is described above and indicates the date and time at which the data was received.

Language Segment Original

The Language Segment Original metadata category is used to store data that indicates another language that appears in at least a segment of the media content. An example entity within the Language Segment Original metadata category has the following elements:

Value

Entry Index

Entry Tag

MSI

Date Time

The Value element stores an indicator of the additional language that appears in at least a segment of the media content. Example values for populating the element are given in Table 1.

The Entry Index and Entry Tag elements are described above and indicate that a metadata provider may submit data indicating that more than one additional language may appear in segments of the media content, or a composite description may indicate various opinions as to an original segment language, the opinions submitted by multiple metadata providers.

The MSI element is described above and identifies the metadata provider.

The Date Time element is described above and indicates the date and time at which the data was received.

Language Dub

The Language Dub metadata category is used to store data indicating a language in which the media content is dubbed. An example entity within the Language Dub metadata category has the following elements:

Dubbed

Language Dubbed To

Dubbing Method

Entry Index

Entry Tag

MSI

Date Time

The Value element stores an indicator of whether or not the media content is dubbed. Example values may include: Unknown, True, and False.

The Language Dubbed To element stores an indicator of the dubbed language. Example values for populating the element are given in Table 1.

The Dubbing Method element stores an indicator of the method used to dub the media content. Example values for populating this element may include: Unknown, Original_Language_Silent, Original_Language_In_Background, and Other.

The Entry Index and Entry Tag elements are described above and indicate that a metadata provider may submit data indicating that the media content is dubbed in more than one language, or a composite description may indicate various opinions as to the dubbed language, the opinions submitted by multiple metadata providers.

The MSI element is described above and identifies the metadata provider.

The Date Time element is described above and indicates the date and time at which the data was received.

Language Audio Track

The Language Audio Track metadata category is used to indicate the language in which the audio track associated with the media content was recorded. An example entity within the Language Audio Track metadata category has the following elements:

Value

Entry Index

Entry Tag

MSI

Date Time

The Value element stores an indicator of the audio track language associated with the media content. Example values for populating the element are given in Table 1.

The Entry Index and Entry Tag elements are described above and indicate that a metadata provider may submit data indicating that audio tracks in more than one language are associated with the media content, or a composite description may indicate various opinions as to the language of an audio track, the opinions submitted by multiple metadata providers.

The MSI element is described above and identifies the metadata provider.

The Date Time element is described above and indicates the date and time at which the data was received.

Language Text Burnt In

The Language Text Burnt In metadata category is used to indicate the language of subtitle text that is part of the video signal and therefore can not be removed because the text obscures part of the video area. An example entity within the Language Text Burnt In metadata category has the following elements:

Burnt In Text
Text Language
Entry Index
Entry Tag
MSI
Date Time

The Value element stores an indicator of whether or not the media content contains burnt-in text. Example values may include: Unknown, True, and False.

The Text Language element stores an indicator of the language of the burnt-in text. Example values for populating the element are given in Table 1.

The Entry Index and Entry Tag elements are described above and allow for more than one opinion of whether or not the media content contains burnt-in text, or more than one opinion of the language of the burnt-in text. In a composite description, the Entry Index and Entry Tag elements may differentiate between various opinions as to whether there is burnt-in text or as to what language is associated with the burnt-in text, the opinions submitted by multiple metadata providers The MSI element is described above and identifies the metadata provider.

The Date Time element is described above and indicates the date and time at which the data was received.

Language Text Track

The Language Text Track metadata category is used to store data that indicates the language of a text track that is associated with the media content. An example entity within the Language Text Track metadata category has the following elements:

Value
Entry Index
Entry Tag
MSI
Date Time

The Value element stores an indicator of the text track language associated with the media content. Example values for populating the element are given in Table 1.

The Entry Index and Entry Tag elements are described above and indicate that a metadata provider may submit data indicating that text tracks in more than one language are associated with the media content, or a composite description may indicate various text track languages submitted by multiple metadata providers.

The MSI element is described above and identifies the metadata provider.

The Date Time element is described above and indicates the date and time at which the data was received.

Language Description Track

The Language Description Track metadata category is used to store data that indicates the language of a description track associated with the media content. In a description track, a narrator describes the visual scenes of media content. Description tracks are provided to enhance the viewing experience for the visually impaired. An example entity within the Language Description Track metadata category has the following elements:

Value
Entry Index
Entry Tag
MSI
Date Time

The Value element stores an indicator of the description track language associated with the media content. Example values for populating the element are given in Table 1.

The Entry Index and Entry Tag elements are described above and indicate that a metadata provider may submit data indicating that description tracks in more than one language are associated with the media content, or a composite description may indicate various opinions as to the description track language, the opinions submitted by multiple metadata providers.

The MSI element is described above and identifies the metadata provider.

The Date Time element is described above and indicates the date and time at which the data was received.

Sign Language Track

The Sign Language Track is used to store data identifying sign language characteristics associated with the media content. An example entity within the Sign Language Track metadata category has the following elements:

Signing Method
Spoken Language
Entry Index
Entry Tag
MSI
Date Time

The Signing Method element stores an indicator of the sign language method that is associated with the media content. Example values for indicating the sign language method are given in Table 20.

TABLE 20

Unknown
None
ASL_American_Sign_Language
PSE_Pidgin_Signed_English
SEE_Signing_Exact_English
Australian_Signing
French_Signing
Japanese_Signing
Chinese_Signing
American_Indian_Signing
Spanish_Signing
Slovak_Signing
German_Signing
Brazilian_Signing
Other The Spoken Language element stores and indicator of the spoken language that is associated with the signing. A sign language technique can be used to convey different spoken languages in different countries. Example values for populating the Spoken Language element are given in Table 1.

The Entry Index and Entry Tag elements are described above and indicate that a metadata provider may submit data indicating that more than one sign language track is associated with the media content, or a composite description may indicate various opinions as to the sign language track details, the opinions submitted by multiple metadata providers.

The MSI element is described above and identifies the metadata provider.

The Date Time element is described above and indicates the date and time at which the data was received.

Schema Implementation Details 622

FIG. 17 illustrates example schema implementation details categories. Schema implementation details 622 includes metadata categories that identify where additional files of data associated with the media content are stored. Example schema implementation details metadata categories include XPath content artwork, XPath video trailer, XPath chapter thumbnails, XPath time interval thumbnails, XPath script or lyrics, and XPath original storyboard.

XPath Content Artwork

The XPath Content Artwork metadata category is used to store file paths that indicate where artwork associated with the media content is stored. An example entity within the XPath Content Artwork metadata category has the following elements (additional picture sizes may be supported in alternate implementations):

Size_48×64
Size_96×128
Size_192×256
Size_720×960
Entry Index
Entry Tag
MSI
Date Time The Size_48×64 element stores a file path that identifies the storage location of artwork associated with the media content that is 48×64 pixels in resolution.

The Size_96×128 element stores a file path that identifies the storage location of artwork associated with the media content that is 96×128 pixels in resolution.

The Size_192×256 element stores a file path that identifies the storage location of artwork associated with the media content that is 192×256 pixels in resolution.

The Size_720×960 element stores a file path that identifies the storage location of artwork associated with the media content that is 720×960 pixels in resolution.

The Entry Index and Entry Tag elements are described above and indicate that a metadata provider may submit data indicating a plurality of artwork associated with the media content, or a composite description may indicate various opinions as to paths associated with artwork, the opinions submitted by multiple metadata providers.

The MSI element is described above and identifies the metadata provider.

The Date Time element is described above and indicates the date and time at which the data was received.

XPath Video Trailer

The XPath Video Trailer metadata category is used to store the path to a video trailer associated with the media content. An example entity within the XPath Video Trailer metadata category has the following elements:

File Path
Resolution Width
Resolution Height
Bitrate KBaud
Entry Index
Entry Tag
MSI
Date Time The File Path element stores a file path that identifies the storage location of a video trailer associated with the media content.

The Resolution Width element stores an indicator of the resolution width of the video trailer stored at the location indicated by the File Path element.

The Resolution Height element stores an indicator of the resolution height of the video trailer stored at the location indicated by the File Path element.

The Bitrate KBaud element stores an indicator of the bitrate of the video trailer stored at the location indicated by the File Path element.

The Entry Index and Entry Tag elements are described above and indicate that a metadata provider may submit data indicating that more than video trailer associated with the media content, or a composite description may indicate various opinions as to a path associated with a video trailer, the opinions submitted by multiple metadata providers.

The MSI element is described above and identifies the metadata provider.

The Date Time element is described above and indicates the date and time at which the data was received.

XPath Chapter Thumbnails

The XPath Chapter Thumbnails metadata category is used to store a file path that indicates where a set of chapter thumbnails associated with the media content is stored. Thumbnails are small pictures obtained from video frame captures. In this case they are used to provide a pictorial representation as to what the particular chapter of the video is about. An example entity within the XPath Chapter Thumbnails metadata category has the following elements:

Value
Entry Index
Entry Tag
MSI
Date Time

The Value element stores a file path that identifies the storage location of a set of chapter thumbnails associated with the media content.

The Entry Index and Entry Tag elements are described above and indicate that a metadata provider may submit data indicating that more than one set of chapter thumbnails associated with the media content, or a composite description may indicate various opinions as to a path associated with chapter thumbnails, the opinions submitted by multiple metadata providers.

The MSI element is described above and identifies the metadata provider.

The Date Time element is described above and indicates the date and time at which the data was received.

XPath Time Interval Thumbnails

The XPath Time Interval Thumbnails metadata category is used to store a file path that indicates where a set of time interval thumbnails associated with the media content is stored. Thumbnails are small pictures obtained from video frame captures. In this case they are captures taken at regular time intervals thus providing a way of navigating to a desired portion of a video without having to scan through the video itself. An example entity within the XPath Time Interval Thumbnails metadata category has the following elements:

Value
Entry Index
Entry Tag
MSI
Date Time

The Value element stores a file path that identifies the storage location of a set of time interval thumbnails associated with the media content.

The Entry Index and Entry Tag elements are described above and indicate that a metadata provider may submit data indicating that more than one set of time interval thumbnails associated with the media content, or a composite description may indicate various opinions as to a path associated with a set of time interval thumbnails, the opinions submitted by multiple metadata providers.

The MSI element is described above and identifies the metadata provider.

The Date Time element is described above and indicates the date and time at which the data was received.

XPath Script Or Lyrics

The XPath Script Or Lyrics metadata category is used to store a file path that indicates where a script or lyrics associated with the media content is stored. An example entity within the XPath Script Or Lyrics metadata category has the following elements:

Value
Entry Index
Entry Tag
MSI
Date Time

The Value element stores a file path that identifies the storage location of a file containing a script or lyrics associated with the media content.

The Entry Index and Entry Tag elements are described above and indicate that a metadata provider may submit paths to more than one file of script or lyrics associated with the media content, or a composite description may indicate various opinions as to a path associated with a script or lyrics, the opinions submitted by multiple metadata providers.

The MSI element is described above and identifies the metadata provider.

The Date Time element is described above and indicates the date and time at which the data was received.

XPath Original Storyboard

The XPath Original Storyboard metadata category is used to store a file path that indicates where an original storyboard associated with the media content is stored. An example entity within the XPath Original Storyboard metadata entity has the following elements:

Value
Entry Index
Entry Tag
MSI
Date Time

The Value element stores a file path that identifies the storage location of a file containing an original storyboard associated with the media content.

The Entry Index and Entry Tag elements are described above and indicate that a metadata provider may submit paths to more than one file containing an original storyboard associated with the media content, or a composite description may indicate various opinions as to a path associated with an original storyboard, the opinions submitted by multiple metadata providers.

The MSI element is described above and identifies the metadata provider.

The Date Time element is described above and indicates the date and time at which the data was received.

Exemplary Media Person Data Repository

Media person data repository 414 stores data that describes persons who are associated with the media content. The data repository may be implemented as a relational database, an object-oriented database, a set of one or more data files, one or more XML files based on an XML schema, or any other data structure method. For the purposes of this discussion, an exemplary media person data repository will be described as an XML file.

FIG. 18 illustrates the structure of media person data stored in an exemplary media person data repository 414.

XML Person File Details

The XML Person File Details entity is used to store data associated with the XML file in which the media person data is stored. An example XML Person File Details entity has the following elements:

Person Description File Version
Date Time Person Description Created
Person Description Creator Person
Person Description Creator Organization
Language Used For Person Description
Schema Version Used The Person Description File Version element stores a number that indicates the version of the file. As data is added to a person description file over time, multiple versions of the file may be stored.

The Date Time Person Description Created element stores the date and time that the file was created.

The Person Description Creator Person element stores the name of the person that created the file.

The Person Description Creator Organization element stores the name of an organization that created the file.

The Language Used For Person Description element stores a value that indicates the language in which the media person description data is provided. As described with reference to the Language Used For Content Description element of the XML File Details entity in the content description metadata repository 412 (see discussion relating to FIG. 5), in an exemplary system, the value that is stored in the Language Used For Person Description element is a combination of a language code and name according to ISO 639. An example list of language field values is given in Table 1.

The Schema Version Used element stores a number that indicates the version of an XML Schema associated with the XML file.

MPI

Each person that may be associated with media content is assigned a unique media person identifier (MPI), such as MPI (1), MPI (2), . . . , and MPI (N), that is associated with descriptive data related to the person received from one or more metadata providers 302. The MPI entity stores one instance of one element, which is the MPI.

Person Category 1, Person Category 2, . . . , Person Category (N)

Media person data is structured according to categories of data that may be associated with a person who is associated with media content. These categories are represented in FIG. 18 as Person Category 1, Person Category 2, . . . , Person Category (N).

Media content description system 304 may receive media person data associated with a person from a plurality of metadata providers 302. To support multiple data values associated with each person category, the media person data repository 414 supports multiple entities within each person category. Each entity includes one or more associated elements.

Exemplary Media Person Data Categories

FIG. 19 illustrates exemplary media person data categories. Media person data may include name, gender, marital status, ethnic origin, religion, height, birth date, birth place, alive, death date, death cause, citizenship, residence place, related person, biography one line, biography long, official home page URL, fan site URL, more information URL, email address, office phone number, home phone number, fax number, XPath person artwork, and XPath person video.

Name

The Name person category is used to store the names associated with a person. An example entity in the Name person category has the following elements:

| | |
|---|---|
| Given Name | Postscript |
| Family Name | Name Type |
| First Middle Name | Entry Index |
| Second Middle Name | Entry Tag |
| Third Middle Name | MSI |
| Nick Name Or Known As | Date Time |
| Prefix | Language |

The Given Name element stores the person's first name.

The Family Name element stores the person's last name.

The First Middle Name element stores the person's first middle name.

The Second Middle Name and Third Middle Name elements store additional middle names associated with the person.

The Nick Name Or Known As element stores a nickname or alias associated with the person.

The Prefix element stores a prefix to the person's name, such as "Dr."

The Postscript element stores a postscript to the person's name, such as "Jr."

The Name Type element stores an indicator of the type of name described. Example name types may include: Unknown, Current_Name, Birth_Name, Maiden_Name, Previous_Name, Alternate_Name, and Other.

As in entities of the content description metadata repository categories, the Entry Index and Entry Tag elements are elements in several person category entities and support multiple entity entries from one metadata provider, or in a composite description, opinions from multiple metadata providers. The metadata provider specifies the order of importance of the multiple entries using the Entry Index field. The metadata provider can provide information as to why each different entry exists in the Entry Tag elements of each Name entity.

The MSI element stores a metadata source identifier. This is a unique identifier assigned by the media content description system 304 to identify each metadata provider 302. The MSI, along with other data related to a metadata provider 302 is stored in metadata provider data repository 416. The structure of metadata provider data repository 416 is described with reference to FIGS. 20–22.

The Date Time element stores a date/time stamp indicating when the data associated with the Name entity was received from the metadata provider 302.

The above descriptions for the Entry Index, Entry Tag, MSI, and Date Time elements apply for each record described below that may contain any combination of these fields.

Gender

The Gender person category is used to store the gender of the person. An example entity within the Gender person category has the following elements:

Value
Entry Index
Entry Tag
MSI
Date Time

The Value element stores an indicator of the person's gender. Example values may include: Unknown, All, Male, Female, Male_Homosexual, Female_Homosexual, and Other.

The Entry Index and Entry Tag elements are described above and indicate that a metadata provider may submit multiple opinions as to the gender of the person, or a composite description may indicate various opinions as to the gender, the opinions submitted by multiple metadata providers.

The MSI element is described above and identifies the metadata provider.

The Date Time element is described above and indicates the date and time at which the data was received.

Marital Status

The Marital Status person category is used to store data identifying the marital status of the person. An example entity within the Marital Status person category has the following elements:

Value
Entry Index
Entry Tag
MSI
Date Time

The Value element stores an indicator of the person's marital status. Example values may include: Unknown, All, Single, Married_No_Children, Married_With_Children, and Single_With_Children.

The Entry Index and Entry Tag elements are described above and indicate that a metadata provider may submit multiple opinions as to the marital status of the person, or a composite description may indicate various opinions as to the marital status, the opinions submitted by multiple metadata providers.

The MSI element is described above and identifies the metadata provider.

The Date Time element is described above and indicates the date and time at which the data was received.

Ethnic Origin

The Ethnic Origin person category is used to store data identifying the ethnicity of the person. An example entity within the Ethnic Origin person category has the following elements:

Value
Entry Index
Entry Tag
MSI
Date Time

The Value element stores an indicator of the person's ethnic origin. Example values may include: Unknown, All, Western_European, Eastern_European, Latino, African, Indian_Asian, Far_Eastern, Arabic, Original_Peoples, and Other.

The Entry Index and Entry Tag elements are described above and indicate that a metadata provider may submit multiple opinions as to the ethnicity of the person, or a composite description may indicate various opinions as to the ethnic origin, the opinions submitted by multiple metadata providers.

The MSI element is described above and identifies the metadata provider.

The Date Time element is described above and indicates the date and time at which the data was received.

Religion

The Religion person category is used to store data identifying the religion of the person. An example entity within the Religion person category has the following elements:

Value

Entry Index

Entry Tag

MSI

Date Time

The Value element stores an indicator of a religion with which the person associates. Example values for populating this element may include: Unknown, All, Christian, Jewish, Buddhist, Islamic, Hindu, Agnostic, Atheist, and Other.

The Entry Index and Entry Tag elements are described above and indicate that a metadata provider may submit multiple opinions as to the religion associated with the person, or a composite description may indicate various opinions as to the religion, the opinions submitted by multiple metadata providers.

The MSI element is described above and identifies the metadata provider.

The Date Time element is described above and indicates the date and time at which the data was received.

Height

The Height person category is used to store data that indicates how tall the person is. An example entity within the Height person category has the following elements:

Value

Entry Index

Entry Tag

MSI

Date Time

The Value element stores the height of the person.

The Entry Index and Entry Tag elements are described above and indicate that a metadata provider may submit multiple opinions as to the height of the person, or a composite description may indicate various opinions as to the height, the opinions submitted by multiple metadata providers.

The MSI element is described above and identifies the metadata provider.

The Date Time element is described above and indicates the date and time at which the data was received.

Birth Date

The Birth Date person category is used to store data indicating when the person was born. An example entity within the Birth Date person category has the following elements:

Year

Specific Date

Entry Index

Entry Tag

MSI

Date Time

The Year element stores the year in which the person was born.

The Specific Date element stores the calendar date on which the person was born.

The Entry Index and Entry Tag elements are described above and indicate that a metadata provider may submit multiple opinions as to the birth date associated with the person, or a composite description may indicate various opinions as to the birth date, the opinions submitted by multiple metadata providers.

The MSI element is described above and identifies the metadata provider.

The Date Time element is described above and indicates the date and time at which the data was received.

Birth Place

The Birth Place person category is used to store data indicating where the person was born. An example entity within the Birth Place person category has the following elements:

Country

Place Details

Entry Index

Entry Tag

MSI

Date Time

The Country element stores an indicator that identifies the country in which the person was born. Example values are given in Table 9.

The Place Details element stores additional text describing the location where the person was born. Examples may include the name of the city or town, or the name of the hospital in which the person was born.

The Entry Index and Entry Tag elements are described above and indicate that a metadata provider may submit multiple opinions as to the birth place of the person, or a composite description may indicate various opinions as to the birth place, the opinions submitted by multiple metadata providers.

The MSI element is described above and identifies the metadata provider.

The Date Time element is described above and indicates the date and time at which the data was received.

Alive

The Alive person category is used to store an indicator of whether or not the person is still living. An example entity within the Alive person category has the following elements:

Value

Entry Index

Entry Tag

MSI

Date Time

The Value element stores an indicator of whether the person is still living. Example values may include: Unknown, True, and False.

The Entry Index and Entry Tag elements are described above and indicate that a metadata provider may submit multiple opinions as to whether or not the person is living, or a composite description may indicate various opinions as to whether the person is alive, the opinions submitted by multiple metadata providers.

The MSI element is described above and identifies the metadata provider.

The Date Time element is described above and indicates the date and time at which the data was received.

Death Date

The Death Date person category is used to store data identifying when the person died (if the Alive metadata category indicates that the person is not alive). An example entity within the Death Date person category has the following elements:

Value

Entry Index

Entry Tag

MSI

Date Time

The Value element stores the date on which the person died.

The Entry Index and Entry Tag elements are described above and indicate that a metadata provider may submit multiple opinions as to the date of death associated with the person, or a composite description may indicate various opinions as to the date of death, the opinions submitted by multiple metadata providers.

The MSI element is described above and identifies the metadata provider.

The Date Time element is described above and indicates the date and time at which the data was received.

Death Cause

The Death Cause person category is used to store data identifying what caused the person's death (if the Alive metadata category indicates that the person is not alive). An example entity within the Death Cause person category has the following elements:

Value
Entry Index
Entry Tag
MSI
Date Time

The Value element stores text that describes the cause of the person's death.

The Entry Index and Entry Tag elements are described above and indicate that a metadata provider may submit multiple opinions as to the cause of death associated with the person, or a composite description may indicate various opinions as to the cause of death, the opinions submitted by multiple metadata providers.

The MSI element is described above and identifies the metadata provider.

The Date Time element is described above and indicates the date and time at which the data was received.

Citizenship

The Citizenship person category is used to store data that identifies a country in which the person is a citizen. An example entity within the Citizenship person category has the following elements:

Value
Entry Index
Entry Tag
MSI
Date Time

The Value element stores in indicator identifying a country in which the person is a citizen. Example values are given in Table 9.

The Entry Index and Entry Tag elements are described above and indicate that a metadata provider may submit multiple countries of citizenship associated with the person, or a composite description may indicate various opinions as to the citizenship, the opinions submitted by multiple metadata providers.

The MSI element is described above and identifies the metadata provider.

The Date Time element is described above and indicates the date and time at which the data was received.

Residence Place

The Residence Place person category is used to store data identifying where the person lives. An example entity within the Residence Place person category has the following elements:

Country
State
City
Residence Detail
Entry Index
Entry Tag
MSI
Date Time

The Country element stores in indicator identifying a country in which the person resides. Example values are given in Table 9.

The State element stores a value that indicates a state in which the person resides.

The City element stores the name of a city in which the person resides.

The Residence Detail element is used to store additional details that describe the person's residence.

The Entry Index and Entry Tag elements are described above and indicate that a metadata provider may submit multiple places of residence associated with the person, or a composite description may indicate various opinions as to the place of residence, the opinions submitted by multiple metadata providers.

The MSI element is described above and identifies the metadata provider.

The Date Time element is described above and indicates the date and time at which the data was received.

Related Person

The Related Person person category is used to store data identifying another individual who is in some way related to the person. An example entity within the Related Person person category has the following elements:

Related MPI
Related Name
Relationship
Entry Index
Entry Tag
MSI
Date Time

The Related MPI element stores the media person identifier (MPI) assigned to another person who is in some way related to the person.

The Related Name element stores the name of the related person.

The Relationship element stores an indicator that identifies how the related person is related to the person. Example values are given in Table 21.

TABLE 21

Unknown
Spouse_Of_Biographee
Romantically_Linked
Previously_Romantic_With
Ex_Spouse_Of_Biographee
Sibling
Child_Of_Biographee
Parent_Of_Biographee
Same_Family_As_Biographee
Worked_With
Group_That_Had_Biographee
Other The Entry Index and Entry Tag elements are described above and indicate that a metadata provider may submit multiple relationships between the person and a related person, or a composite description may indicate various opinions as to a relationship, the opinions submitted by multiple metadata providers.

The MSI element is described above and identifies the metadata provider.

The Date Time element is described above and indicates the date and time at which the data was received.

Biography One Line

The Biography One Line person category is used to store a one line biographical description of the person. An example entity within the Biography One Line person category has the following elements:

Value
Entry Index
Entry Tag
MSI
Date Time
Language

The Value element stores a short biography of the person.

The Entry Index and Entry Tag elements are described above and indicate that a metadata provider may submit multiple one-line biographies of the person, or a composite description may indicate various biographies submitted by multiple metadata providers.

The MSI element is described above and identifies the metadata provider.

The Date Time element is described above and indicates the date and time at which the data was received.

The Language element stores an identifier of the language in which the one-line biography is written. A standard set of language identifiers may be used. An example of such a standard set of language identifiers is shown in Table 1.

Biography Long

The Biography Long person category is used to store a longer biographical description of the person. An example entity within the Biography Long person category has the following elements:

Value
Entry Index
Entry Tag
MSI
Date Time
Language

The Value element stores a long biography of the person.

The Entry Index and Entry Tag elements are described above and indicate that a metadata provider may submit multiple biographies of the person, or a composite description may indicate various biographies submitted by multiple metadata providers.

The MSI element is described above and identifies the metadata provider.

The Date Time element is described above and indicates the date and time at which the data was received.

The Language element stores an identifier of the language in which the biography is written. A standard set of language identifiers may be used. An example of such a standard set of language identifiers is shown in Table 1.

Official Home Page URL

The Official Home Page URL person category is used to store an address of a web site that is officially associated with the person. An example entity within the Official Home Page URL person category has the following elements:

Value
Entry Index
Entry Tag
MSI
Date Time

The Value element stores a URL that is associated with a web site that is officially associated with the person.

The Entry Index and Entry Tag elements are described above and indicate that a metadata provider may submit multiple URLs of home pages associated with the person, or a composite description may indicate various opinions as to the official home page, the opinions submitted by multiple metadata providers.

The MSI element is described above and identifies the metadata provider.

The Date Time element is described above and indicates the date and time at which the data was received.

Fan Site URL

The Fan Site URL person category is used to store an address of a web site that is associated with fans of the person. An example entity within the Fan Site URL person category has the following elements:

Value
Entry Index
Entry Tag
MSI
Date Time

The Value element stores a URL that is associated with a web site that is associated with fans of the person.

The Entry Index and Entry Tag elements are described above and indicate that a metadata provider may submit multiple fan site web addresses associated with the person, or a composite description may indicate various URLs submitted by multiple metadata providers.

The MSI element is described above and identifies the metadata provider.

The Date Time element is described above and indicates the date and time at which the data was received.

More Information URL

The More Information URL person category is used to store an address of a web site that provides additional information about the person. An example entity within the More Information URL person category has the following elements:

Value
Entry Index
Entry Tag
MSI
Date Time

The Value element stores a URL that is associated with a web site that provides additional information about the person.

The Entry Index and Entry Tag elements are described above and indicate that a metadata provider may submit multiple addresses to informational web sites associated with the person, or a composite description may indicate various URLs submitted by multiple metadata providers.

The MSI element is described above and identifies the metadata provider.

The Date Time element is described above and indicates the date and time at which the data was received.

Email Address

The Email Address person category is used to store an email address associated with the person. An example entity within the Email Address person category has the following elements:

Value
Entry Index
Entry Tag
MSI
Date Time

The Value element stores an email address that is associated with the person.

The Entry Index and Entry Tag elements are described above and indicate that a metadata provider may submit multiple email addresses associated with the person, or a composite description may indicate various email addresses submitted by multiple metadata providers.

The MSI element is described above and identifies the metadata provider.

The Date Time element is described above and indicates the date and time at which the data was received.

Office Phone Number

The Office Phone Number person category is used to store a work phone number associated with the person. An example entity within the Office Phone Number person category has the following elements:
Value
Entry Index
Entry Tag
MSI
Date Time The Value element stores an office phone number that is associated with the person.

The Entry Index and Entry Tag elements are described above and indicate that a metadata provider may submit multiple work phone numbers associated with the person, or a composite description may indicate various phone numbers submitted by multiple metadata providers.

The MSI element is described above and identifies the metadata provider.

The Date Time element is described above and indicates the date and time at which the data was received.

Home Phone Number

The Home Phone Number person category is used to store a home phone number associated with the person. An example entity within the Home Phone Number person category has the following elements:
Value
Entry Index
Entry Tag
MSI
Date Time The Value element stores a home phone number that is associated with the person.

The Entry Index and Entry Tag elements are described above and indicate that a metadata provider may submit multiple home phone numbers associated with the person, or a composite description may indicate various phone numbers submitted by multiple metadata providers.

The MSI element is described above and identifies the metadata provider.

The Date Time element is described above and indicates the date and time at which the data was received.

Fax Number

The Fax Number person category is used to store a fax number associated with the person. An example entity within the Fax Number person category has the following elements:
Value
Entry Index
Entry Tag
MSI
Date Time The Value element stores a fax number that is associated with the person.

The Entry Index and Entry Tag elements are described above and indicate that a metadata provider may submit multiple fax numbers associated with the person, or a composite description may indicate various fax numbers submitted by multiple metadata providers.

The MSI element is described above and identifies the metadata provider.

The Date Time element is described above and indicates the date and time at which the data was received.

XPath Person Artwork

The XPath Person Artwork person category is used to store file paths where artwork associated with the person is stored. An example entity within the XPath Person Artwork person category has the following elements:
Size_48×64
Size_96×128
Size_192×256
Size_720×960
Entry Index
Entry Tag
MSI
Date Time The Size_48×64 element stores a file path that identifies the storage location of artwork associated with the person that is 48×64 pixels in resolution. The Size_96×128 element stores a file path that identifies the storage location of artwork associated with the person that is 96×128 pixels in resolution. The Size_192×256 element stores a file path that identifies the storage location of artwork associated with the person that is 192×256 pixels in resolution.

The Size_720×960 element stores a file path that identifies the storage location of artwork associated with the person that is 720×960 pixels in resolution.

The Entry Index and Entry Tag elements are described above and indicate that a metadata provider may submit data indicating a plurality of artwork associated with the person, or a composite description may indicate various paths submitted by multiple metadata providers.

The MSI element is described above and identifies the metadata provider.

The Date Time element is described above and indicates the date and time at which the data was received.

XPath Person Video

The XPath Person Video person category is used to store a file path where a video associated with the person is stored. An example entity within the XPath Person Video person category has the following elements:
File Path
Resolution Width
Resolution Height
Bitrate KBaud
Entry Index
Entry Tag
MSI
Date Time The File Path element stores a file path that identifies the storage location of a video associated with the media content.

The Resolution Width element stores an indicator of the resolution width of the video stored at the location indicated by the File Path element.

The Resolution Height element stores an indicator of the resolution height of the video stored at the location indicated by the File Path element.

The Bitrate KBaud element stores an indicator of the bitrate of the video stored at the location indicated by the File Path element.

The Entry Index and Entry Tag elements are described above and indicate that a metadata provider may submit data indicating more than one video associated with the person, or a composite description may indicate various paths to videos associated with the person, the paths submitted by multiple metadata providers.

The MSI element is described above and identifies the metadata provider.

The Date Time element is described above and indicates the date and time at which the data was received.

Exemplary Metadata Provider Data Repository

Metadata provider data repository 416 stores data related to content description metadata providers 302. The data repository may be implemented as a relational database, an object-oriented database, a set of one or more data files, one or more XML files based on an XML schema, or any other data structure method. For the purposes of this discussion, an exemplary metadata provider data repository will be described as an XML file.

FIG. 20 illustrates the structure of metadata provider data stored in an exemplary metadata provider data repository 416. For each metadata provider 302, metadata provider data repository 416 stores an MSI, identifying data, and one or more metadata category trust levels.

MSI

Each media description metadata provider 302 is assigned a unique metadata source identifier (MSI), such as MSI (1), MSI (2), . . . , and MSI (N). Example media description metadata providers 302 may include companies that have a content identifier scheme, companies that provide attributes and genre categorizations associated with media content, and companies and individuals who provide critic reviews. The MPI entity stores one instance of one element, which is the MPI.

Identifying Data

As shown in FIG. 20, metadata provider data repository 416 stores identifying data that is associated with each metadata provider 302. FIG. 21 illustrates examples of identifying data that may be stored in association with a metadata provider 302. Identifying data may include company name, company URL, Scheme Details URL, Email Contact 1, Email Contact 2, Email Contact 3, Address Line 1, Address Line 2, Address Town, Address State, and Address Zip Code.

Company name is the name of the metadata provider 302.

Company URL is a website address associate with the metadata provider.

Scheme details URL is an address associated with a website that details a content identifier scheme used by the metadata provider.

Email contact 1, email contact 2, and email contact 3 are email addresses associated with the metadata provider.

Address line 1, address line 2, address town, address state, and address zip code are the parts of the metadata provider mailing address.

Metadata Category Trust Level 1–Metadata Category Trust Level (N)

As shown in FIG. 20, metadata provider data repository 416 stores metadata category trust levels that are associated with each metadata provider 302. The trust level for a metadata category that is associated with a provider indicates the level to which metadata in that category received from that provider is to be trusted as accurate. For example, a metadata provider may be highly trusted to provide accurate critic reviews of media content, but have a very low trust level associated with metadata describing technical details associated with media content. In an exemplary embodiment, the trust level is stored as an integer value between 0 and 100, with 0 being the lowest trust level and 100 being the highest trust level.

In an alternate embodiment, each metadata provider is assigned stack level ratings for metadata categories. For each metadata category, the providers are assigned an ordered rank. For example, if there are five metadata providers, then for each metadata category, each metadata provider is assigned a stack level rank between 1 and 5, where 1 is the highest rank.

Alternate implementations are contemplated, and may include other methods for ranking or ordering data received from metadata providers 302.

FIG. 22 illustrates examples of metadata category trust levels that may be stored in association with a metadata provider 302. Metadata category trust levels may include trust levels associated with title, episode, version, parts, artists, director, producer, editor, script writer, lyrics writer, music composer, location date, duration, format, genre degrees, genre program type, genre intent, genre target audience, genre attributes, review, censor parental ratings, extended censor ratings, origination, features, copyright, textual description, and links.

In this implementation, a metadata category trust level may apply to a plurality of metadata categories. In an alternate implementation, a metadata provider 302 may be assigned trust levels such that each trust level corresponds to a metadata category. Additionally, alternate implementations are contemplated that relate provider trust levels with different groupings of metadata categories. In yet another implementation, a provider may be assigned a single trust level that doesn't vary across metadata categories.

Title is the trust level associated with metadata in the title metadata category (see FIG. 7) received from the metadata provider.

Episode is the trust level associated with metadata in the episode name metadata category (see FIG. 7) received from the metadata provider.

Version is the trust level associated with metadata in the version detail metadata category (see FIG. 7) received from the metadata provider.

Album is the trust level associated with metadata in the album metadata category (see FIG. 7) received from the metadata provider.

Parts is the trust level associated with metadata in the part detail metadata category (see FIG. 7) received from the metadata provider.

Artists is the trust level associated with metadata in the person metadata category (see FIG. 8) received from the metadata provider. The artists trust level applies to those person metadata category entities in which the Person Role element is one of: General_Participant, Actor, Actor_Group, Music_Artist, Music_Artist_Keyboard, Music_Artist_Drummer, Music_Artist_Guitarist, Music_Artist_Lead_Singer, Music_Artist_Backing_Singer, Music_Band, Host, Anchor, News_Reporter, Interviewer, Performer, Narrator, Dancer, Animator, Graphics_Artist, Contestant, or Subject_Of_Program.

Director is the trust level associated with metadata in the person metadata category (see FIG. 8) received from the metadata provider. The director trust level applies to those person metadata category entities in which the Person Role element is one of: Director, Assistant_Director, Art_Director, or Technical_Direction.

Producer is the trust level associated with metadata in the person metadata category (see FIG. 8) received from the metadata. The producer trust level applies to those person metadata category entities in which the Person Role element is one of: Producer, Executive_Producer, Production_Manager, Production_Designer, and Production_Assistant.

Editor is the trust level associated with metadata in the person metadata category (see FIG. 8) received from the metadata provider. The editor trust level applies to those person metadata category entities in which the Person Role element is Editor or Assistant_Editor Script writer is the trust level associated with metadata in the person metadata category (see FIG. 8) received from the metadata provider. The script writer trust level applies to those person metadata category entities in which the Person Role element is Script_Writer.

Lyrics is the trust level associated with metadata in the person metadata category (see FIG. 8) received from the metadata provider. The lyrics trust level applies to those person metadata category entities in which the Person Role element is Lyrics_Writer.

Music composer is the trust level associated with metadata in the person metadata category (see FIG. 8) received from the metadata provider. The music composer trust level applies to those person metadata category entities in which the Person Role element is Music_Composer.

In alternate embodiments, trust levels may also be associated with metadata that describes other persons associated with the media content.

Location is the ranking associated with metadata in the capture location metadata category (see FIG. 14) received from the metadata provider.

Date is the trust level associated with metadata in the availability date metadata category (see FIG. 10) received from the metadata provider.

Duration is the trust level associated with metadata in the content duration metadata category (see FIG. 10) received from the metadata provider.

Format is the trust level associated with metadata in the format metadata category (see FIG. 9) received from the metadata provider.

Genre degrees is the trust level associated with metadata in the genre degrees metadata category (see FIG. 9) received from the metadata provider.

Genre program type is the trust level associated with metadata in the genre program type metadata category (see FIG. 9) received from the metadata provider.

Genre intent is the trust level associated with metadata in the genre intent metadata category (see FIG. 9) received from the metadata provider.

Genre target audience is the trust level associated with metadata in the target audience metadata category (see FIG. 9) received from the metadata provider.

Genre attributes is the trust level associated with metadata in the year set, era set, location portrayed, from the book, degree of true story, degree of animated 2D, degree of animated 3D, degree of puppet characters, degree of international event, degree of sophistication, genre music, and genre photo or home movie metadata categories (see FIG. 9) received from the metadata provider.

Review is the trust level associated with metadata in the critic reviews metadata category (see FIG. 11) received from the metadata provider.

Popularity is the trust level associated with metadata in the popularity metadata category (see FIG. 11) received from the metadata provider.

Broadcast Ubiquity is the trust level associated with metadata in the broadcast ubiquity metadata category (see FIG. 11) received from the metadata provider.

Censor parental ratings is the trust level associated with metadata in the censor parental rating metadata category (see FIG. 12) received from the metadata provider.

Extended censor ratings is the trust level associated with metadata in the extended censor rating adult content, extended censor rating bad language, extended censor rating violence, extended censor rating nudity, and extended censor rating drug abuse metadata categories (see FIG. 12) received from the metadata provider.

Origination is the trust level associated with metadata in the Technical Details metadata categories 614, listed in FIG. 13, received from the metadata provider.

Features is the trust level associated with metadata in the ATVEF Data Enhancements, Educational Commands, Educational Informational Enhancements, Multiple Camera Angles, Multiple Story Lines, Phone In, Associated Phone Number, and VCR Programming Code metadata categories (see FIG. 15) received from the metadata provider.

Copyright is the trust level associated with metadata in the copyright metadata category (see FIG. 14) received from the metadata provider.

Textual description is the trust level associated with metadata in the plot one line abstract, plot long abstract, keywords, and content note metadata categories (see FIG. 10) received from the metadata provider.

Links is the trust level associated with metadata in the URL Enhancements, URL More Info, and Associated Teletext Page Number metadata categories (see FIG. 15) received from the metadata provider.

Made For is the trust level associated with metadata in the Made For metadata category (see FIG. 14) received from the metadata provider.

Budget is the trust level associated with metadata in the Budget metadata category (see FIG. 14) received from the metadata provider.

Box Office is the trust level associated with metadata in the Box Office metadata category (see FIG. 14) received from the metadata provider.

Production Company is the trust level associated with metadata in the Production Company, Principal Country Of Main Production Company, and URL Production Company metadata categories (see FIG. 14) received from the metadata provider.

Distribution Company, is the trust level associated with metadata in the Distribution Company metadata category (see FIG. 14) received from the metadata provider.

Language is the trust level associated with metadata in the Language Data metadata categories 620, listed in FIG. 16, received from the metadata provider.

Paths is the trust level associated with metadata in the Schema Implementation Details metadata categories 622, listed in FIG. 17, received from the metadata provider.

Methods For Storing Media Content Description Metadata

Figure 23:
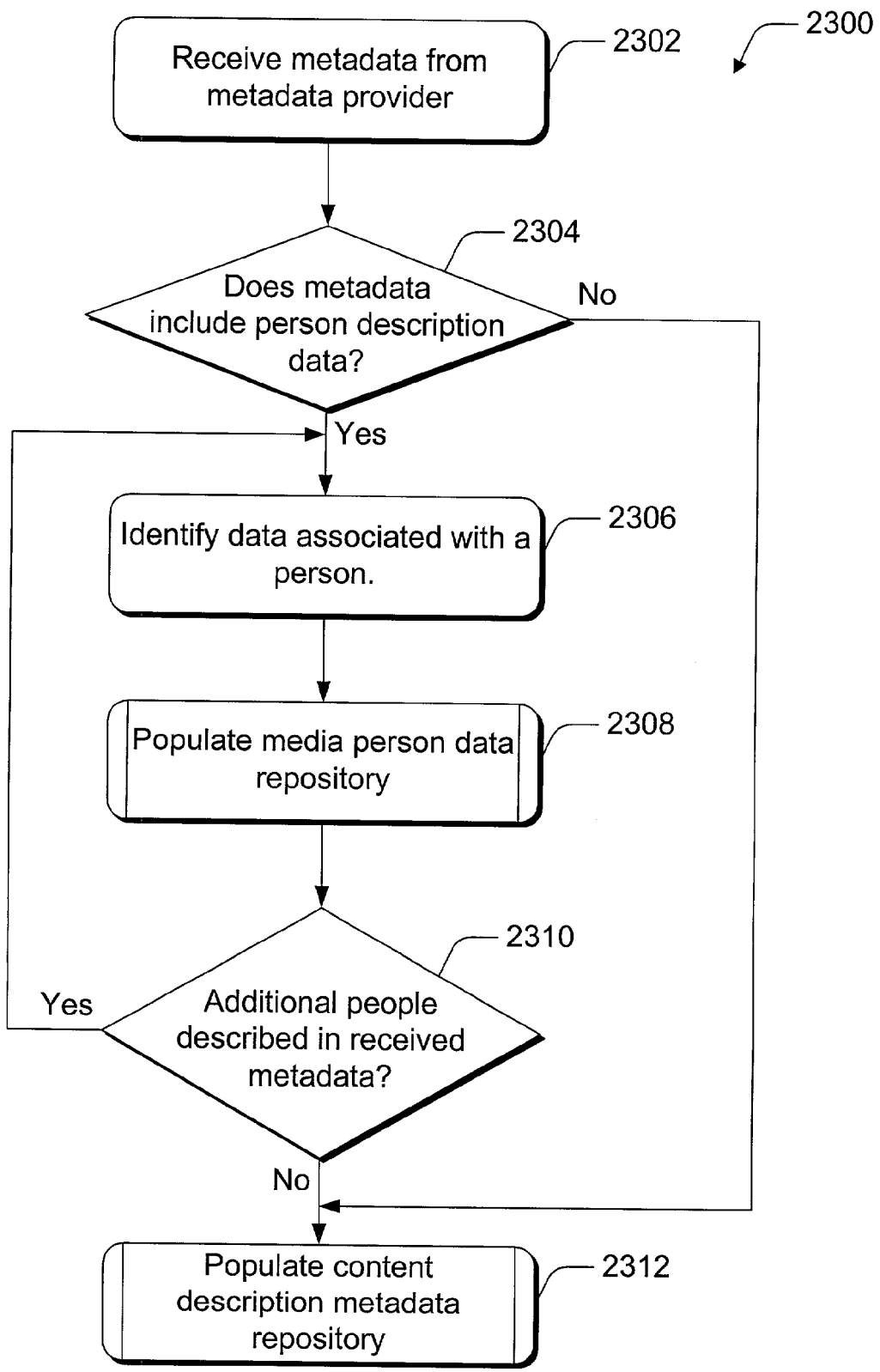
FIG. 23 is an example flow diagram that illustrates a process for storing media content description metadata.

FIG. 23 illustrates a process for storing media content description metadata. The process is illustrated as a set of operations shown as discrete blocks. The process may be implemented in any suitable hardware, software, firmware, or combination thereof. The order in which the operations are described is not to be construed as a limitation. For discussion purposes and where appropriate, the process will be described with reference to the architecture 300 of FIG. 3 and the system 304 of FIG. 4.

At block 2302, a media content description system 304 receives metadata from a metadata provider 302. For purposes of this discussion, it is assumed that the metadata received pertains to a particular media content, such as a movie. If the media content description system receives metadata describing a plurality of media content, then the process is repeated for the metadata associated with each media content described.

At block 2304, the media content description system 304 determines whether the received metadata includes metadata that describes one or more persons associated with the media content. Given a movie as the media content, persons that may be described who are associated with the media content may include actors, directors, producers, and screenwriters. If the received metadata does not include metadata describing one or more persons associated with the media content (e.g., the no branch from block 2304), the process continues at block 2312.

If the received metadata includes metadata describing one or more persons associated with the media content (e.g., the yes branch from block 2304), then, at block 2306, the media content description system 304 identifies data that was received that is descriptive of a person associated with the media content.

At block 2308, the media content description system 304 stores the data describing the person in a media person data repository 414. The process executed by the media content description system to store the data in the media person data repository is described below in more detail with reference to FIG. 24.

At block 2310, the media content description system 304 determines whether additional persons associated with the media content are described by the received metadata.

If additional persons are described by the received metadata (e.g., the "yes" branch from block 2310), then the process is repeated beginning at block 2306.

After all of the received data describing persons associated with the media content is stored in the media person data repository (e.g., the "no" branch from block 2310), or if none of the received metadata describes persons associated with the media content (e.g., the "no" branch from block 2304), the media content description system 304 populates a content description metadata repository 412 with the received media content description metadata (block 2312). The process executed by the media content description system to store the data in the content description metadata repository is described below in more detail with reference to FIG. 25.

Populating Media Person Data Repository

Figure 24:
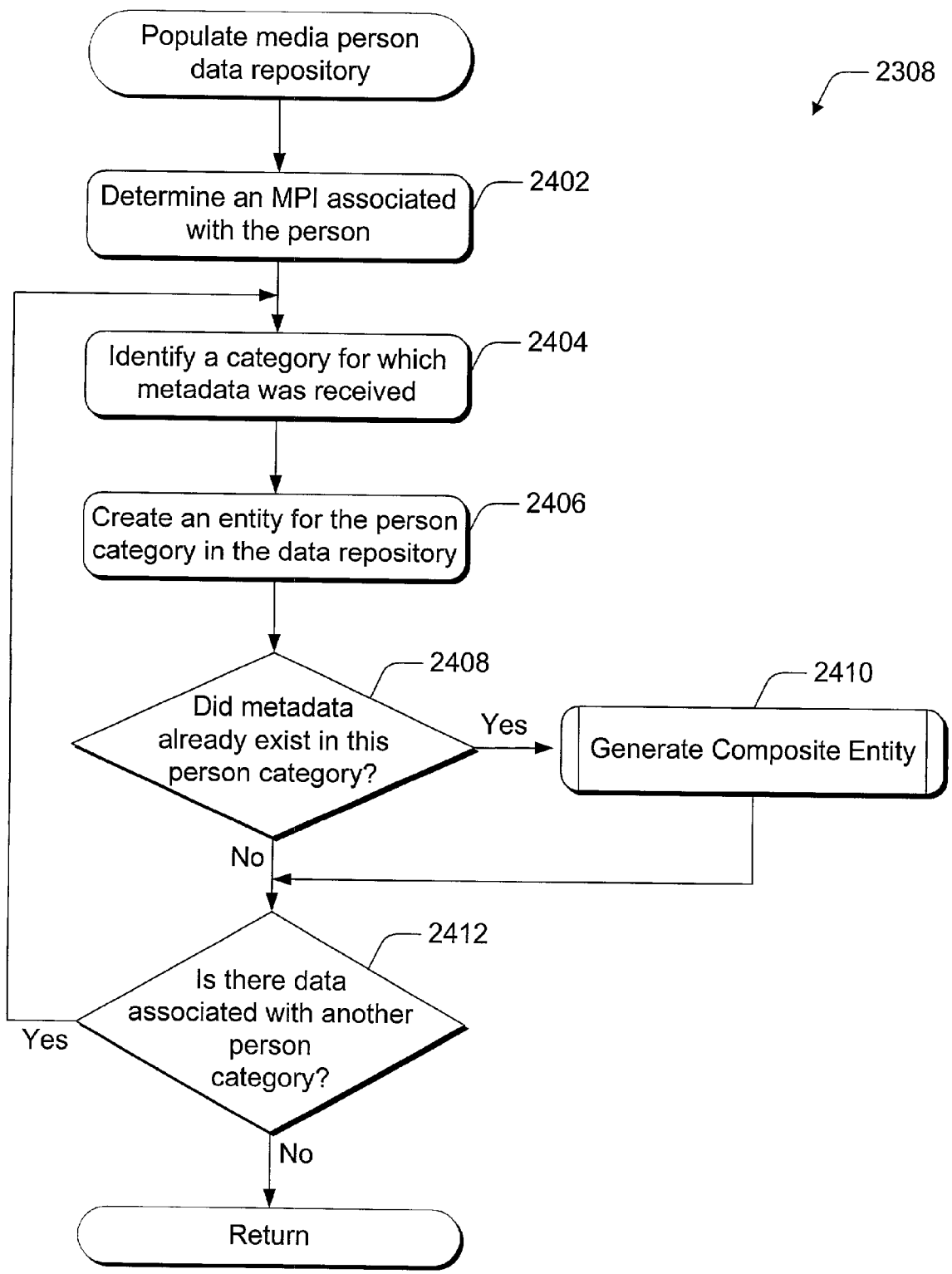
FIG. 24 is an example flow diagram that illustrates a process for storing metadata that describes a person associated with media content.

FIG. 24 illustrates a process for storing metadata that describes a person associated with media content. The process is illustrated as a set of operations shown as discrete blocks. The process may be implemented in any suitable hardware, software, firmware, or combination thereof. The order in which the operations are described is not to be construed as a limitation. For discussion purposes and where appropriate, the process will be described with reference to the architecture 300 of FIG. 3 and the system 304 of FIG. 4.

At block 2402, a media content description system 304 determines a unique identifier associated with the person described by the received metadata. For example, if the received metadata describes the director of a movie, media content description system 304 searches media person data repository 414 for data describing the same person described by the received metadata. The media person data repository 414 may already contain a description of the director of the movie. For example, a description of the movie may have already been received from another content description metadata provider 302 that included a description of the director. Alternatively, the director of the movie may have directed another movie that is described in the media content description system 304, or the director of the movie may also be an actor in another movie or television show described by data stored in the media content description system 304. If the person is already described by data in the media person data repository, then the media content description system determines the media person identifier (MPI) that is associated with the already stored data as the MPI associated with the person described by the received metadata. If the person is not already identified in the media person data repository, then media content description system generates a new MPI to identify the person described by the received metadata.

At block 2404, the media content description system 304 identifies a category associated with the received metadata that describes a person (e.g., a person category as described with reference to FIGS. 18 and 19). Person categories may include a name, gender, marital status, ethnic origin, or any of the other person categories listed in FIG. 19.

At block 2406, the media content description system 304 stores the received metadata that applies to the identified person category as a person category entity in media person data repository 414.

At block 2408, the media content description system 304 determines whether an entity in the identified person category was already stored in the media person data repository 414 and associated with the person described by the received metadata.

If there was already an entity in the identified person category stored in association with the described person (e.g., the "yes" branch from block 2408), then the media content description system 304 generates a composite entity based on all of the entities stored in the identified person category associated with the person (block 2410). The process for generating a composite entity is described below in more detail with reference to FIG. 26.

At block 2412, the media content description system 304 determines whether the received metadata that describes the person includes data that is associated with another person category.

If there is data associated with additional person categories, the process repeats, beginning at block 2404 (e.g., the "yes" branch from block 2412).

Populating Content Description Metadata Repository

Figure 25:
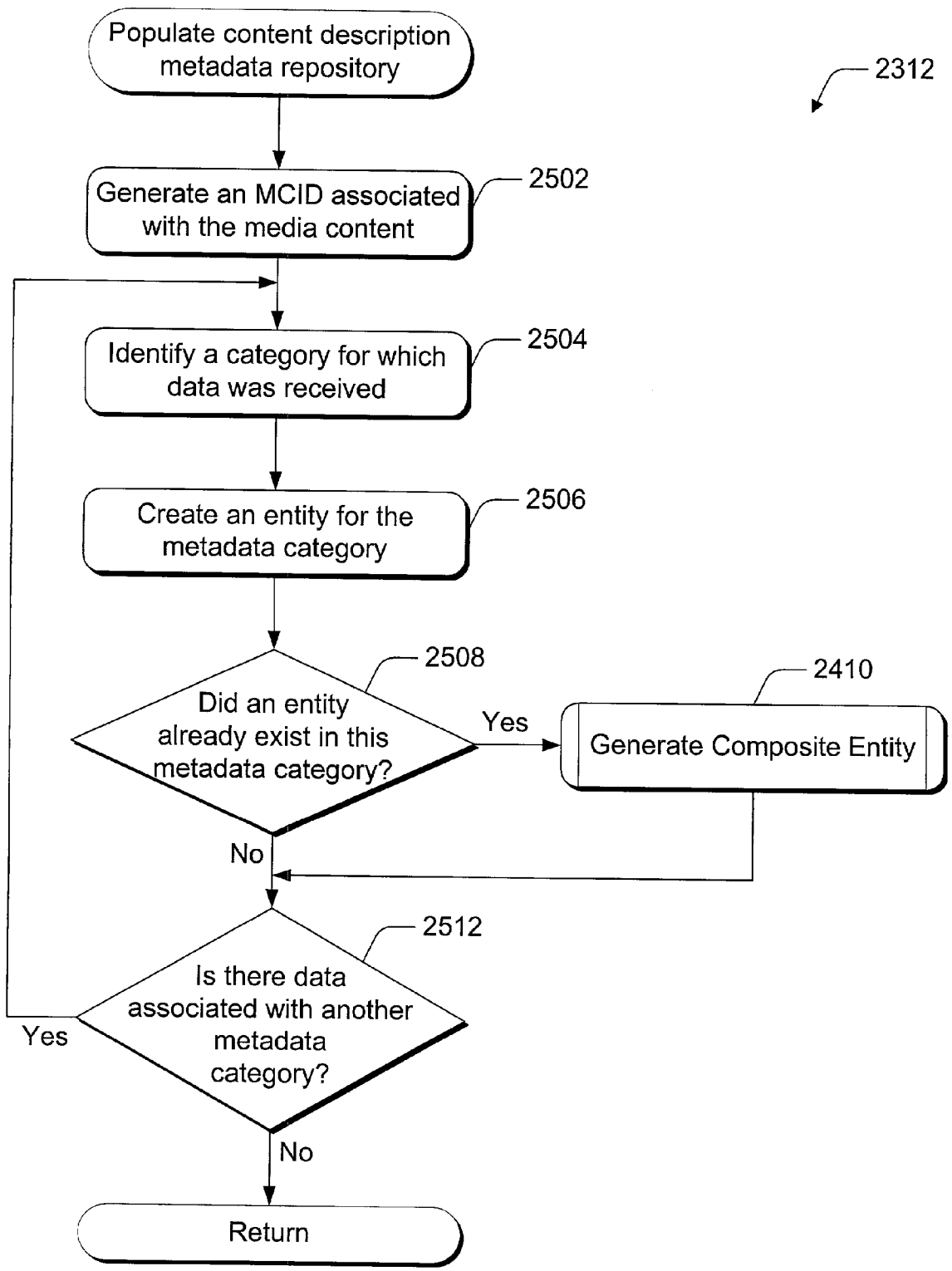
FIG. 25 is an example flow diagram that illustrates a process for storing metadata that describes the media content.

FIG. 25 illustrates a process for storing metadata that describes the media content. The process is illustrated as a set of operations shown as discrete blocks. The process may be implemented in any suitable hardware, software, firmware, or combination thereof. The order in which the operations are described is not to be construed as a limitation. For discussion purposes and where appropriate, the process will be described with reference to the architecture 300 of FIG. 3 and the system 304 of FIG. 4.

At block 2502, a media content description system 304 determines a unique identifier associated with the media content described by the received metadata. For example, media content description system 304 searches content description metadata repository 412 for data describing the same media content described by the received metadata (e.g., the movie described by the received metadata may already be described by data stored in the content description metadata repository 412). If the media content is already described by data in the content description metadata repository 412, then media content description system 304 determines the media content identifier (MCID) associated with the already stored data as the MCID associated with the media content described by the received metadata. If the media content is not already identified in the content description metadata repository 412, then media content description system 304 generates a new MCID to associate with the media content described by the received metadata.

At block 2504, the media content description system 304 identifies a metadata category associated with the received metadata (e.g., a metadata category as described with reference to FIGS. 5-17). Metadata categories may include categories that describe genre, descriptions, popularity, censor ratings, technical details, or any of the other metadata categories listed in FIGS. 6–17.

At block 2506, the media content description system 304 stores the received metadata that applies to the identified data category as a metadata category entity in content description metadata repository 412.

At block 2508, the media content description system 304 determines whether an entity in the identified metadata category was already stored in the content description metadata repository and associated with the media content described by the received metadata.

If there was already an entity in the identified metadata category stored in association with the described media content (e.g., the "yes" branch from block 2508), then the media content description system 304 generates a composite entity based on all of the entities stored in the identified metadata category associated with the media content (block 2510). The process for generating a composite entity is described below in more detail with reference to FIG. 26.

At block 2512, the media content description system 304 determines whether the received metadata that describes the media content includes data that is associated with another metadata category.

If there is data associated with additional metadata categories, the process repeats, beginning at block 2504 (e.g., the "yes" branch from block 2512).

Generating a Composite Entity

Figure 26:
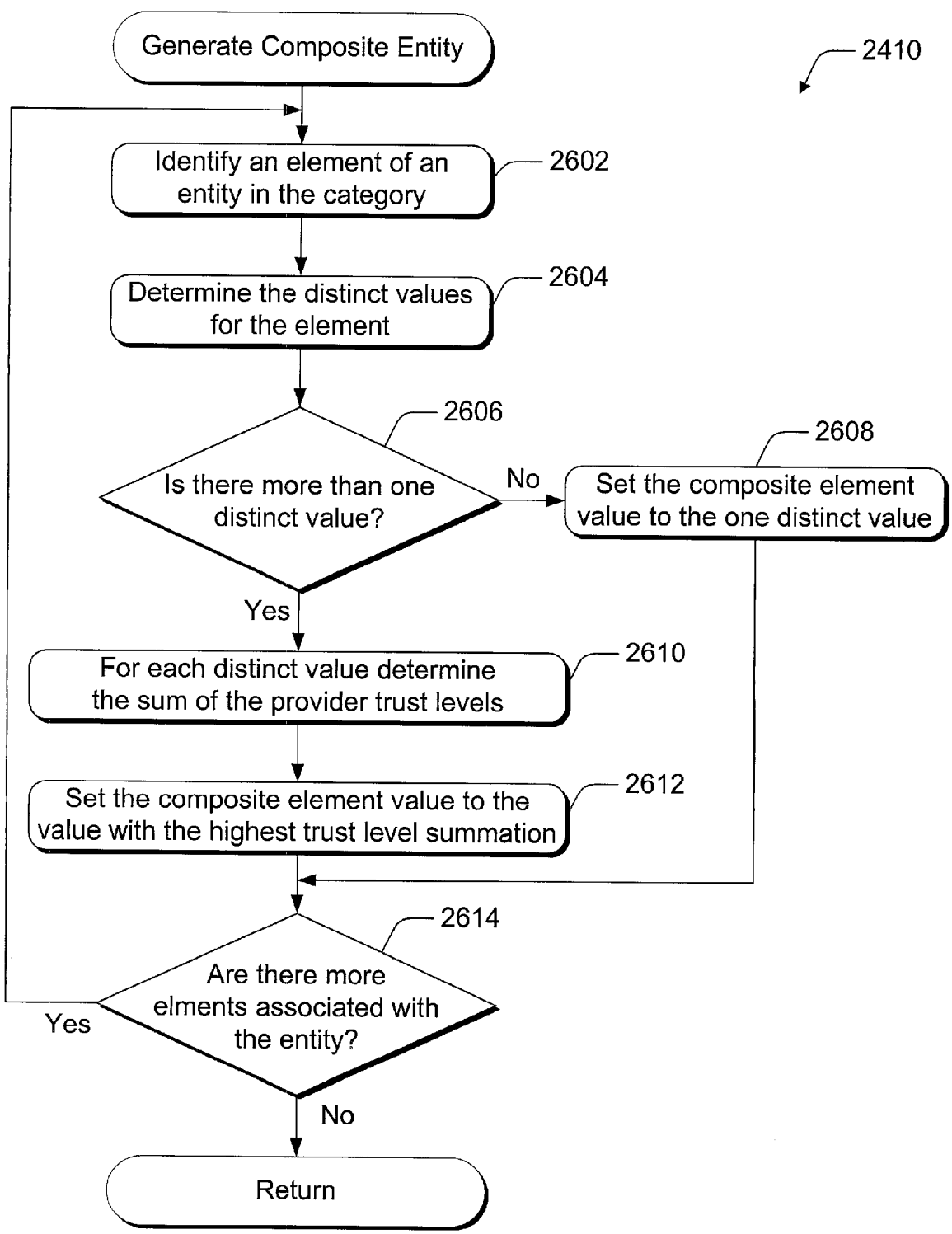
FIG. 26 is an example flow diagram that illustrates a process for generating a composite metadata entity.

FIG. 26 illustrates a process for generating a composite metadata entity. This process applies to generating composite entities in the content description metadata repository 412 or the media person data repository 414. The process is illustrated as a set of operations shown as discrete blocks. The process may be implemented in any suitable hardware, software, firmware, or combination thereof. The order in which the operations are described is not to be construed as a limitation. For discussion purposes and where appropriate, the process will be described with reference to the architecture 300 of FIG. 3 and the system 304 of FIG. 4.

At block 2602, a media content description system 304 determines an element of an entity within the metadata category for which a composite entity is being generated.

At block 2604, the media content description system 304 determines the distinct values of the element that are stored within the existing category entities.

At block 2606, the media content description system 304 determines whether there is more than one distinct value stored for the element.

If there is only one distinct value stored for the element (e.g., the "no" branch from block 2606), the media content description system 304 sets the value for the element within the composite entity to the one distinct value already stored for the element. The process then continues at block 2614.

However, if there is more than one distinct value stored for the element (e.g., the "yes" branch from block 2606), then for each distinct value, the media content description system 304 determines the sum of the trust levels associated with the providers of that value (block 2610).

At block 2612, the media content description system 304 sets the value for the element within the composite entity to the distinct value that has the highest associated trust level summation, as determined at block 2610.

At block 2614, the media content description system 304 determines whether there are additional elements associated with an entity of the metadata category.

If there are additional elements associated with an entity of the metadata category (e.g., the "yes" branch from block 2614), then the media content description system 304 continues the process at block 2602.

CONCLUSION

Although the systems and methods have been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A computer-implemented method comprising:
receiving a plurality of descriptions including element values of a media content from a plurality of metadata providers;
determining an element associated with the media content;
associating, in storage, individual descriptions with individual metadata providers that provided the descriptions;
associating individual trust levels with individual metadata providers; and
generating in the storage a composite description of the media content based on the descriptions provided by individual metadata providers and the trust levels associated with individual metadata providers, wherein the generating comprises:
for individual element values, determining a sum of trust levels associated with individual metadata providers of the individual element values;
setting a composite element value equal to the distinct element value that is associated with an individual metadata provider having a largest sum of trust levels.

2. The method as recited in claim 1, wherein the media content comprises at least one of a movie, a television program, a song, a talk radio show, a sound effect, a photograph, a digital image, an art image, or a home movie.

3. The method as recited in claim 1, wherein the descriptions comprise at least one of content identification data, an associated person, genre data, media content description data, a critic review, a popularity, a broadcast ubiquity, a censor parental rating, a censor rating associated with adult content, a censor rating associated with bad language, a censor rating associated with violence, a censor rating associated with nudity, a censor rating associated with drug abuse, technical details data, production details data, enhancement data, language data, or associated media.

4. The method as recited in claim 1, wherein the trust levels indicate a ranking of the metadata providers.

5. The method as recited in claim 1, wherein the trust levels indicate degrees to which metadata provided by metadata providers is trusted.

6. The method as recited in claim 1, wherein the descriptions comprise element values, and the generating comprises:
determining an element associated with the media content;

determining one or more distinct element values of one or more descriptions of the media content, wherein the element values describe the element;

for each distinct element value, determining a sum of trust levels associated with the metadata provider of the distinct element value; and setting a composite element value equal to the distinct element value that is associated with the metadata provider having the largest sum of trust levels.

7. The method as recited in claim 1, further comprising sending the composite description of the media content to end users for display through an electronic programming guide.

8. A computer-implemented method comprising:
modeling media content descriptions with a database schema;
representing an identity of media content by a media identification class in the database schema;
representing at least one media content attribute by an attribute class in the database schema; and
creating an association between the media identification class and the attribute class, the association representing media content descriptions.

9. The method as recited in claim 8, wherein the identity of media content is selected from a group of identifiers comprising a media content identifier, an alternate media content identifier, a title, an episode name, an album name, a version reason, a version description, a part number, and a total number of parts.

10. The method as recited in claim 8, wherein the at least one media content attribute is selected from a group of attributes comprising an associated person, genre data, media content description data, a critic review, a popularity, a broadcast ubiquity, a censor parental rating, a censor rating associated with adult content, a censor rating associated with bad language, a censor rating associated with violence, a censor rating associated with nudity, a censor rating associated with drug abuse, technical details data, production details data, enhancement data, language data, and associated media.

11. A computer-implemented method comprising:
modeling media content descriptions with a database schema;
representing an identity of media content by a media identification class in the database schema;
representing persons associated with media content by a person class in the database schema;
representing at least one media content attribute by an attribute class in the database schema;
creating an association between the media identification class and the attribute class, the association representing media content descriptions; and
creating an association between the attribute class and the person class, the association representing descriptions of persons associated with the media content.

12. The method as recited in claim 11, wherein the identity of media content is selected from a group of identifiers comprising a media content identifier, an alternate media content identifier, a title, an episode name, an album name, a version reason, a version description, a part number, and a total number of parts.

13. The method as recited in claim 11, wherein the person class comprises one or more person attributes selected from a group of person attributes comprising a person identifier, a name, a gender, a marital status, an ethnic origin, a religion, a height, a birth date, a birth place, an alive indicator, a death date, a death cause, a citizenship, a residence place, a related person, a short biography, a long biography an official home page URL, a fan site URL, a more information URL, an email address, an office phone number, a home phone number, a fax number, an associated artwork, and an associated video.

14. The method as recited in claim 11, wherein the attribute class comprises one or more media content attributes selected from a group of media content attributes comprising genre data, media content description data, a critic review, a popularity, a broadcast ubiquity, a censor parent rating, a censor rating associated with adult content, a censor rating associated with bad language, a censor rating associated with violence, a censor rating associated with nudity, a censor rating associated with drug abuse, technical details data, production details data, enhancement data, language data, and associated media.

15. A computer-implemented method comprising:
modeling media content descriptions with a database schema;
representing an identity of media content by a media identification class in the database schema;
representing at least one media content attribute by an attribute class in the database schema;
representing a plurality of metadata providers by a provider class in the database schema;
creating an association between the media identification class and the attribute class, the association representing descriptions of media content and
creating an association between the attribute class and the provider class, the association representing media content descriptions from the plurality of metadata providers.

16. The method as recited in claim 15, further comprising ranking the plurality of metadata providers.

17. The method as recited in claim 15, further comprising assigning a trust level to a metadata provider, the trust level indicating a degree to which metadata from the metadata provider is trusted.

18. The method as recited claim 17, wherein the trust level is associated with one of the media content attributes.

19. The method as recited in claim 17, wherein the trust level is associated with a plurality of media content attributes.

20. The method as recited in claim 17, wherein the trust level is associated with at least one of a title, an episode, a version, a part, an artist, a director, a producer, an editor, a script writer, a lyrics writer, a music composer, a location, a date, a duration, a format, a genre degree, a genre program type, a genre intent, a target audience description, a genre attribute, a review, a censor rating, an extended censor rating, an origination, a feature, a copyright, a textual description, or a link.

21. A computer-implemented method comprising:
modeling media content descriptions with a database schema;
representing an identity of media content by a media identification class in the database schema;
representing at least one media content attribute by an attribute class in the database schema;
representing people associated with media content by a person class in the database schema;
representing a plurality of metadata providers by a provider class in the database schema;
creating an association between the media identification class and the attribute class, the association representing media content descriptions;

creating an association between the attribute class and the person class, the association representing descriptions of persons associated with the media content;

creating an association between the attribute class and the provider class, the association representing media content descriptions from the plurality of metadata providers; and creating an association between the person class and the provider class, the association representing descriptions of persons associated with media content from the plurality of metadata providers.

22. The method as recited in claim 21, further comprising ranking the plurality of metadata providers.

23. The method as recited in claim 21, further comprising assigning a trust level to a metadata provider, the trust level indicating a degree to which metadata from the metadata provider is trusted.

24. The method as recited claim 23, wherein the trust level is associated with one of the media content attributes.

25. The method as recited in claim 23, wherein the trust level is associated with a plurality of media content attributes.

26. The method as recited in claim 23, wherein the trust level is associated with at least one of a title, an episode, a version, a part, an artist, a director, a producer, an editor, a script writer, a lyrics writer, a music composer, a location, a date, a duration, a format, a genre degree, a genre program type, a genre intent, a target audience description, a genre attribute, a review, a censor rating, an extended censor rating, an origination, a feature, a copyright, a textual description, or a link.

27. A computer-implemented method comprising:
receiving first metadata describing media content from a first metadata provider;
receiving second metadata describing the media content from a second metadata provider; and
storing the first and second metadata according to a data structure, such that the first metadata is associated with the first metadata provider and the second metadata is associated with the second metadata provider.

28. The method as recited in claim 27, further comprising creating composite metadata describing the media content, wherein the composite metadata is based on the first and second metadata.

29. The method as recited in claim 27, further comprising creating composite metadata describing the media content, wherein the composite metadata is based on one or mare trust levels associated with the first and second metadata providers.

30. The method as recited in claim 27, wherein the first and second metadata each comprises first and second categories, further comprising:
determining first category trust levels associated with the first and second metadata providers;
determining second category trust levels associated with the first and second metadata providers;
creating a composite first category that comprises metadata associated with the first category from the first metadata provider where the first category trust level associated with the first metadata provider is higher than the first category trust level associated with the second metadata provider; and
creating a composite second category that comprises metadata associated with the second category from the second metadata provider where the second category trust level associated with the second metadata provider is higher than the second category trust level associated with the first metadata provider.

31. The method as recited in claim 27, further comprising:
receiving a request for metadata associated with the media content; and
providing a composite metadata associated with the media content, the composite metadata comprising at least a portion of the first and second metadata.

32. A computer-implemented method comprising:
generating a media content identifier comprising a representation of a series, a representation of an episode, a representation of a version, and a representation of a part; and
associating significances with the representation of the series, the representation of the episode, the representation of the version, and the representation of the part.

33. The method as recited in claim 32, wherein the significance associated with the representation of the series is the greater than the significances associated with the representations of the episode, version, and part.

34. A computer-implemented method comprising:
receiving metadata describing media content;
determining whether the metadata comprises data that describes a person associated with the media content;
in an event that the metadata comprises data that describes a person associated with the media content, populating a first data structure that represents people associated with media content; and
populating a second data structure that represents descriptions of media content.

35. The method as recited in claim 34, wherein the populating a first data structure comprises:
storing the data that describes the person; and
generating a composite description of the person.

36. The method as recited in claim 34, wherein the populating a second data structure comprises:
storing the metadata;
generating a composite description of the media content.

37. The method as recited in claim 36, wherein the generating a composite description of the media content comprises:
determining an element associated with the data structure that represents descriptions of media content;
determining one or more distinct values stored in the data structure that are associated with the media content and are associated with the element;
for each distinct value, determining the sum of trust levels associated with providers of the distinct value; and
setting a composite element value to the distinct value that has the largest sum of trust levels.

38. A system comprising:
metadata provider interface configured to receive multiple descriptions of media content from different metadata providers;
content description data repository configured to store the descriptions in association with the metadata providers that provided the descriptions; and
a composite generator to generate a composite description of the media content using ones of the multiple descriptions.

39. The system as recited in claim 38, wherein the content description data repository is further configured to associate ranks with at least portions of the descriptions.

40. The system as recited in claim 39, wherein the ranks are based on one or more trust levels associated with ones of the metadata providers.

41. The system as recited in claim 39, wherein the composite generator selects portions of the multiple descriptions based on the ranks.

42. The system as recited in claim 38 further comprising:
a provider data repository configured to store one or more trust levels associated with the metadata providers.

43. The system as recited in claim 38 further comprising:
a media person data repository configured to store data describing a person associated with the media content.

44. The system as recited in claim 38 further comprising:
a program data provider interface configured to provide data that is stored in the content description data repository to a program data provider.

* * * * *